United States Patent
Park et al.

(10) Patent No.: US 10,469,866 B2
(45) Date of Patent: Nov. 5, 2019

(54) METHOD AND APPARATUS FOR ENCODING AND DECODING VIDEO WITH RESPECT TO POSITION OF INTEGER PIXEL

(71) Applicant: SAMSUNG ELECTRONICS CO., LTD., Suwon-si (KR)

(72) Inventors: Min-woo Park, Hwaseong-si (KR); Jin-young Lee, Hwaseong-si (KR); Jae-won Yoon, Seoul (KR); Byeong-doo Choi, Suwon-si (KR); Ho-cheon Wey, Seongnam-si (KR); Yong-jin Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 14/782,549

(22) PCT Filed: Apr. 7, 2014

(86) PCT No.: PCT/KR2014/003011
§ 371 (c)(1),
(2) Date: Oct. 5, 2015

(87) PCT Pub. No.: WO2014/163466
PCT Pub. Date: Oct. 9, 2014

(65) Prior Publication Data
US 2016/0044333 A1    Feb. 11, 2016

Related U.S. Application Data

(60) Provisional application No. 61/808,808, filed on Apr. 5, 2013.

(51) Int. Cl.
*H04N 19/513* (2014.01)
*H04N 19/187* (2014.01)
(Continued)

(52) U.S. Cl.
CPC ......... *H04N 19/521* (2014.11); *H04N 19/187* (2014.11); *H04N 19/188* (2014.11);
(Continued)

(58) Field of Classification Search
CPC .. H04N 19/176; H04N 19/182; H04N 19/105; H04N 19/44; H04N 19/186;
(Continued)

(56) References Cited

U.S. PATENT DOCUMENTS 8,594,193 B2    11/2013   He et al.
8,693,767 B2*    4/2014   Steglich ............... H04N 13/257
                                                           382/162
(Continued)

FOREIGN PATENT DOCUMENTS

CN       1694495 A      11/2005
CN     101056398 A      10/2007
(Continued)

OTHER PUBLICATIONS

Communication dated Jul. 8, 2014, issued by the International Searching Authority, in counterpart International Application No. PCT/KR2014/003011 (PCT/ISA/210 and PCT/ISA/237).

(Continued)

*Primary Examiner* — Dave Czekaj
*Assistant Examiner* — Kehinde Abimbola
(74) *Attorney, Agent, or Firm* — Sughrue Mion, PLLC

(57) ABSTRACT

Disclosed is a video decoding method including: obtaining a disparity vector having components in sub-pixel unit for interlayer prediction between images belonging to a current layer and a reference layer; determining a position of an integer pixel of the reference layer corresponding to a position indicated by the disparity vector obtained from the position of a current pixel of the current layer; and decoding the image of the current layer by using prediction informa- (Continued)

tion on a candidate area of the reference layer corresponding to the determined position of the integer pixel.

11 Claims, 39 Drawing Sheets

(51) Int. Cl.
|  |  |  |
|---|---|---|
| H04N 19/30 | (2014.01) |  |
| H04N 19/44 | (2014.01) |  |
| H04N 19/52 | (2014.01) |  |
| H04N 19/597 | (2014.01) |  |
| H04N 19/169 | (2014.01) |  |

(52) U.S. Cl.
CPC ............ *H04N 19/30* (2014.11); *H04N 19/44* (2014.11); *H04N 19/52* (2014.11); *H04N 19/597* (2014.11)

(58) Field of Classification Search
CPC .... H04N 19/593; H04N 19/117; H04N 19/52; H04N 19/523; H04N 19/513; H04N 19/124; H04N 19/597; H04N 13/0048; H04N 19/70; H04N 19/46; H04N 19/30; H04N 19/61; H04N 2013/0081; H04N 19/96; H04N 19/187; H04N 13/161; H04N 19/557; H04N 19/136; H04N 19/103; H04N 13/257; H04N 13/261; H04N 13/266; H04N 13/128; H04N 13/15; H04N 19/36; H04N 13/117; H04N 13/189; H04N 13/243; H04N 13/282
See application file for complete search history.

(56) References Cited

U.S. PATENT DOCUMENTS

| | | | |
|---|---|---|---|
| 8,737,481 B2 | 5/2014 | Lee et al. | |
| 8,761,249 B2* | 6/2014 | Gao | G06T 5/009 |
| | | | 375/240.08 |
| 9,277,210 B2* | 3/2016 | Yang | H04N 7/0102 |
| 9,357,214 B2* | 5/2016 | Zhang | H04N 19/597 |
| 9,460,488 B2* | 10/2016 | Jeon | H04N 19/82 |
| 9,661,332 B2* | 5/2017 | Jeon | H04N 19/159 |
| 2005/0243926 A1 | 11/2005 | Hubrich et al. | |
| 2009/0279608 A1 | 11/2009 | Jeon et al. | |
| 2009/0285283 A1* | 11/2009 | Gao | G06T 5/009 |
| | | | 375/240.08 |
| 2011/0012994 A1* | 1/2011 | Park | H04N 21/234327 |
| | | | 348/43 |
| 2011/0211638 A1 | 9/2011 | Sohn et al. | |
| 2011/0249746 A1* | 10/2011 | Yang | H04N 7/0102 |
| | | | 375/240.16 |
| 2011/0311147 A1 | 12/2011 | Pahalawatta et al. | |
| 2012/0170837 A1* | 7/2012 | Steglich | H04N 13/257 |
| | | | 382/162 |
| 2012/0189060 A1 | 7/2012 | Lee et al. | |
| 2012/0288013 A1* | 11/2012 | Pahalawatta | H04N 19/597 |
| | | | 375/240.25 |
| 2013/0106998 A1* | 5/2013 | Pahalawatta | H04N 21/2365 |
| | | | 348/43 |
| 2013/0114670 A1* | 5/2013 | Chen | H04N 19/597 |
| | | | 375/240.02 |
| 2013/0176390 A1* | 7/2013 | Chen | H04N 19/597 |
| | | | 348/43 |
| 2013/0194505 A1* | 8/2013 | Pahalawatta | H04N 5/21 |
| | | | 348/607 |
| 2013/0271565 A1* | 10/2013 | Chen | H04N 19/597 |
| | | | 348/43 |
| 2013/0287108 A1* | 10/2013 | Chen | H04N 19/597 |
| | | | 375/240.16 |
| 2014/0028793 A1* | 1/2014 | Wiegand | H04N 13/111 |
| | | | 348/42 |
| 2014/0050264 A1* | 2/2014 | He | H04N 19/70 |
| | | | 375/240.16 |
| 2014/0139627 A1* | 5/2014 | Chen | H04N 19/597 |
| | | | 348/43 |
| 2014/0153844 A1* | 6/2014 | Jeon | H04N 19/82 |
| | | | 382/300 |
| 2014/0161186 A1* | 6/2014 | Zhang | H04N 19/597 |
| | | | 375/240.16 |
| 2014/0253681 A1* | 9/2014 | Zhang | H04N 13/0048 |
| | | | 348/43 |
| 2014/0313291 A1 | 10/2014 | Fang | |
| 2014/0348242 A1 | 11/2014 | Ohtsu et al. | |
| 2015/0237376 A1* | 8/2015 | Alshina | H04N 19/65 |
| | | | 375/240.02 |
| 2015/0296211 A1* | 10/2015 | Chuang | H04N 19/187 |
| | | | 375/240.12 |
| 2016/0007032 A1* | 1/2016 | Alshina | H04N 19/59 |
| | | | 375/240.02 |
| 2016/0044333 A1* | 2/2016 | Park | H04N 19/52 |
| | | | 375/240.16 |
| 2016/0050423 A1* | 2/2016 | Alshina | H04N 19/503 |
| | | | 375/240.12 |
| 2016/0142709 A1* | 5/2016 | Pahalawatta | H04N 5/21 |
| | | | 375/240.29 |

FOREIGN PATENT DOCUMENTS

| | | |
|---|---|---|
| CN | 101420609 A | 4/2009 |
| CN | 101483770 A | 7/2009 |
| CN | 101641960 A | 2/2010 |
| CN | 102510500 A | 6/2012 |
| CN | 102685532 A | 9/2012 |
| EP | 2 207 352 A1 | 7/2010 |
| KR | 1020060108952 A | 10/2006 |
| KR | 1020080036910 A | 4/2008 |
| KR | 100941608 B1 | 2/2010 |
| KR | 1020120084629 A | 7/2012 |
| KR | 101227601 B1 | 1/2013 |
| WO | 2013/002450 A1 | 1/2013 |
| WO | 2013/039031 A1 | 3/2013 |

OTHER PUBLICATIONS

Communication dated Oct. 14, 2016 issued by European Patent Office in counterpart European Application No. 14778165.2.
Tech G et al., "3D-HEVC Test Model 2", Joint Collaborative Team on 3D Video Coding Extension Development of ITU-T SG 16 WP 3 and ISO/IEC JTC 1/SC 29/WG 11, October 13-19, 2012, 118 pages total, 2nd Meeting, Shanghai, CN, Document: JCT3V-B1005_d0.
Chang et al., "CE1.h: Depth-oriented Neighboring Block Disparity Vector (DoNBDV) with virtual depth retrieval", Joint Collaborative Team on 3D Video Coding Extension Development of ITU-T SG 16 WP 3 and ISO/IEC JTC 1/SC 29/WG 11, Jan. 17-23, 2013, 5 pages total, 3rd Meeting, MediatTek Inc., Geneva, CH, Document JCT3V-00131.
Nam et al., "3D-CE2.h related: Unification of disparity vector rounding", Joint Collaborative Team on 3D Video Coding Extension Development of ITU-T SG 16 WP 3 and ISO/IEC JTC 1/SC 29/WG 11, Apr. 20-26, 2013, 4 pages total, 4th Meeting, LG Electronics, Incheon, KR, Document: JCT3V-D0135.
Ikai et al., "AHG13: Disparity vector restrictions", Joint Collaborative Team on 3D Video Coding Extension Development of ITU-T SG 16 WP 3 and ISO/IEC JTC 1/SC 29/WG 11, Jan. 17-23, 2013, 6 pages total, 3rd Meeting, SHARP Corporation, Geneva, CH, Document: JCT3V-00083.
Communication dated Dec. 4, 2017, from the State Intellectual Property Office of People's Republic of China in counterpart Application No. 201480032642.8.
Communication dated Aug. 15, 2018, issued by the State Intellectual Property Office of P.R. China in counterpart Chinese Application No. 201480032642.8.
Communication dated Feb. 6, 2019, issued by the European Patent Office in counterpart European Application No. 14778165.2.

(56) References Cited

OTHER PUBLICATIONS

Park and Kim, "3D-CE5.h related: Cross check of Unification of disparity vector rounding (JCT3V-D0135)", 4.JCT-3V Meeting; Apr. 20, 2013-Apr. 26, 2013,No. JCT3V-D0128, Apr. 16, 2013 (2 pages total).

\* cited by examiner

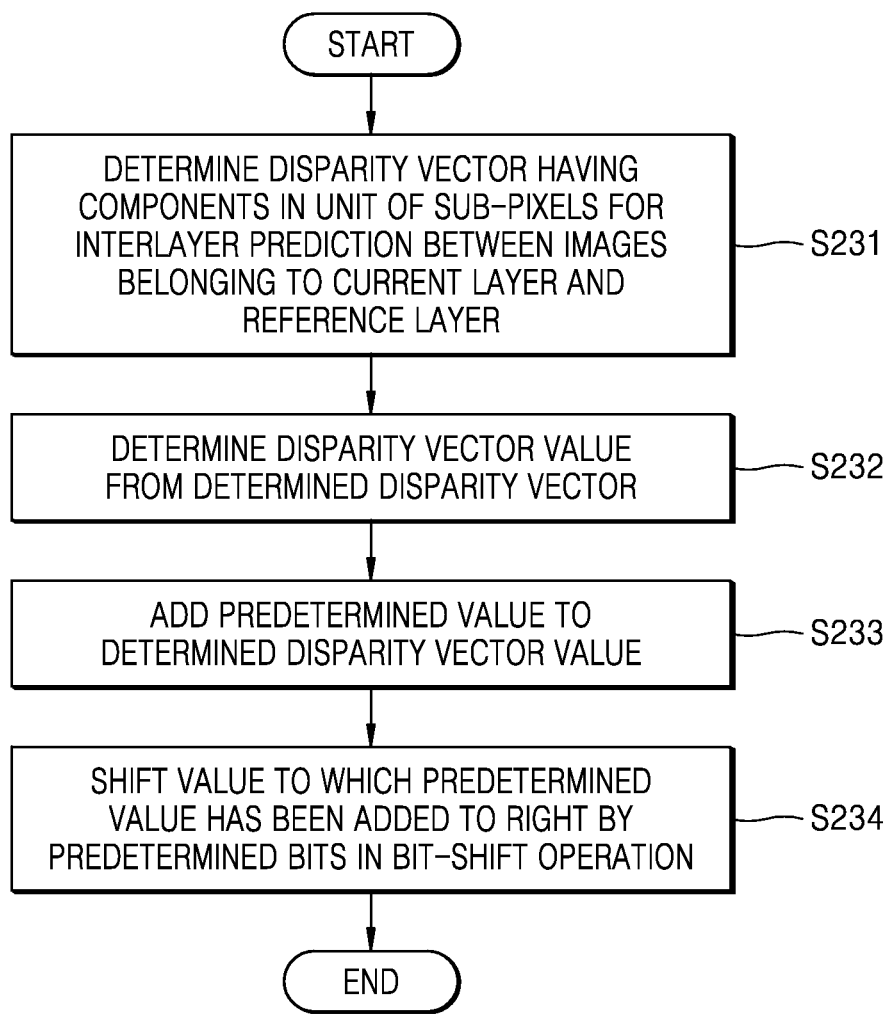

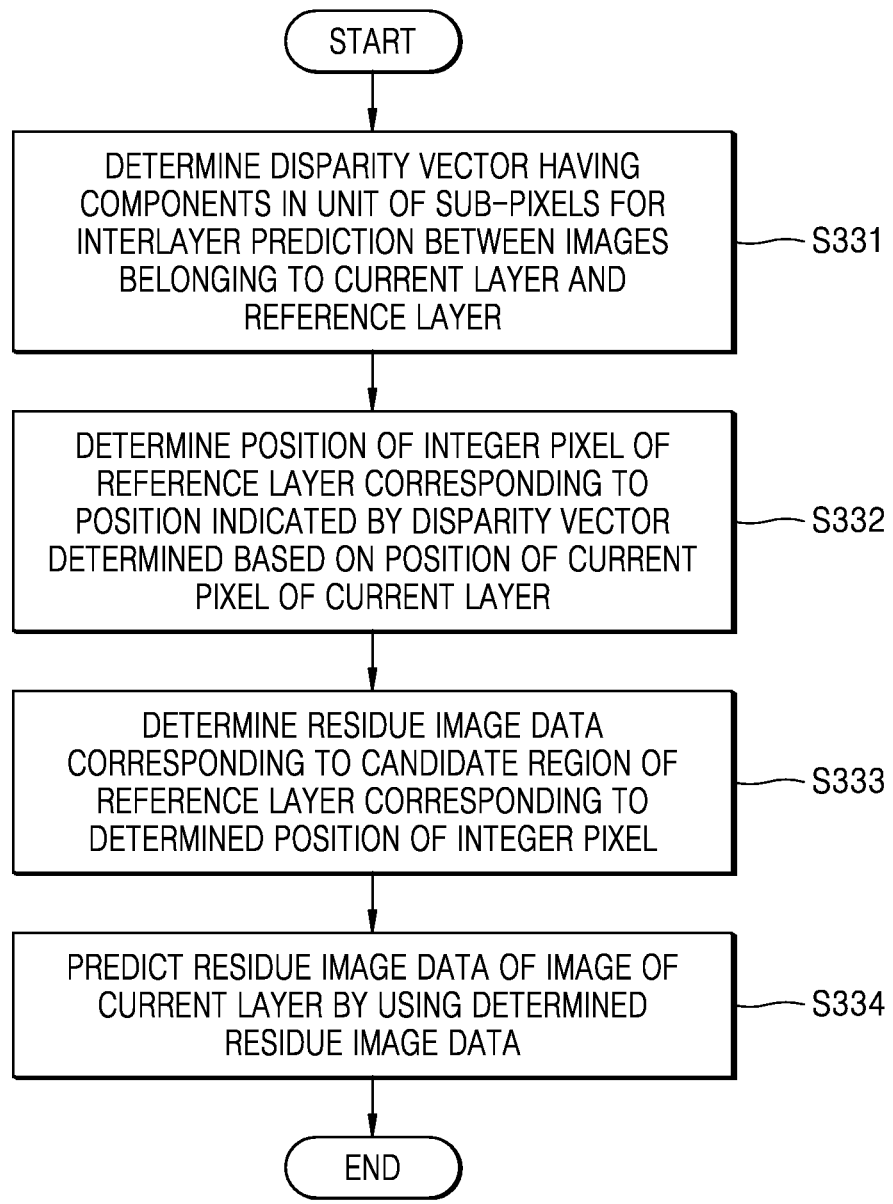

PARTITION MODE (800)

PREDICTION MODE (810)

TRANSFORMATION UNIT SIZE (820)

CODING UNIT (1010)

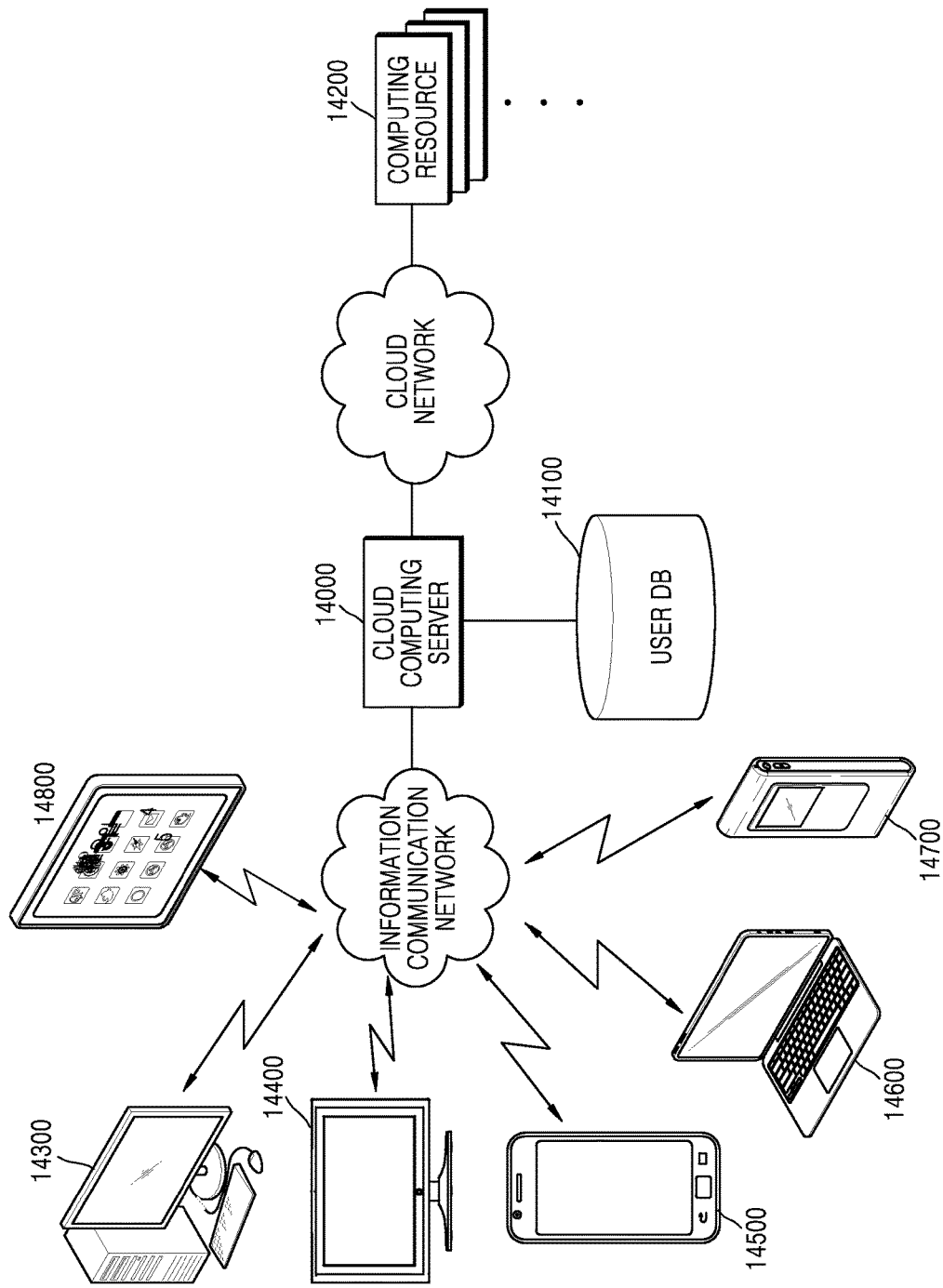

METHOD AND APPARATUS FOR ENCODING AND DECODING VIDEO WITH RESPECT TO POSITION OF INTEGER PIXEL

TECHNICAL FIELD

The present invention relates to a method and apparatus for encoding and decoding a video with respect to a position of an integer pixel.

BACKGROUND ART

As hardware for reproducing and storing high-resolution or high-quality video content is being developed and supplied, a need for a video codec for effectively encoding or decoding the high-resolution or high-quality video content is increasing. According to conventional video codecs, a video is encoded according to a limited encoding method based on a macroblock having a predetermined size.

A video codec reduces a data amount by using a prediction method using the characteristic that images in a video have a high mutual temporal or spatial correlation. According to the prediction method, to predict a current image by using adjacent images, image information is recorded using a temporal or spatial distance between images, a prediction error, and the like.

DETAILED DESCRIPTION OF THE INVENTION

Technical Problem

Proposed is a method of predicting an image by using a disparity vector when inter prediction or interlayer prediction is performed.

Technical Solution

According to one or more embodiments, a method of predicting an image by using a disparity vector may include: obtaining a disparity vector having components in sub-pixel unit for interlayer prediction between images belonging to a current layer and a reference layer; determining a position of an integer pixel of the reference layer corresponding to a position indicated by the disparity vector obtained from a current pixel of the current layer; and decoding the image of the current layer by using prediction information on a candidate area of the reference layer corresponding to the determined position of the integer pixel.

Advantageous Effects of the Invention

According to the one or more embodiments, a position of an integer pixel of a reference layer corresponding to a position indicated by a disparity vector obtained from a position of a current pixel of a current layer may be effectively determined.

DESCRIPTION OF THE DRAWINGS

FIG. 2C is a flowchart for describing a method of determining an integer disparity vector, according to one or more embodiments;

FIG. 3C is a flowchart for describing a method of predicting residue image data by using a position of a determined integer pixel, according to one or more embodiments;

FIG. 27 is a diagram illustrating a network structure of a cloud computing system using a video encoding apparatus and a video decoding apparatus, according to an embodiment of the present invention.

BEST MODE

Disclosed is a video decoding method including: obtaining a disparity vector having components in sub-pixel unit for interlayer prediction between images belonging to a current layer and a reference layer; determining a position of an integer pixel of the reference layer corresponding to a position indicated by the disparity vector obtained from the position of a current pixel of the current layer; and decoding the image of the current layer using prediction information on a candidate area of the reference corresponding to the determined position of the integer pixel.

MODE OF THE INVENTION

In the one or more embodiments described in the specification below, the term "image" may comprehensively indicate not only a still image but also a moving picture such as a video.

The term "sample" indicates data to be processed as data allocated to a sampling position of an image. For example, pixels in an image of a space domain may be samples.

In the specification below, a current block may include coding units and prediction units.

Methods and apparatuses for encoding and decoding a video with respect to a position of an integer pixel, according to one or more embodiments, will now be described with reference to FIGS. 1A to 7D. In addition, a video encoding method and a video decoding method based on coding units of a tree structure, according to one or more embodiments, which are applicable to the video encoding and decoding methods proposed above, are disclosed with reference to FIGS. 8 to 20. In addition, various embodiments to which the video encoding method and the video decoding method are applicable are disclosed with reference to FIGS. 21 to 27.

Figure 1A:
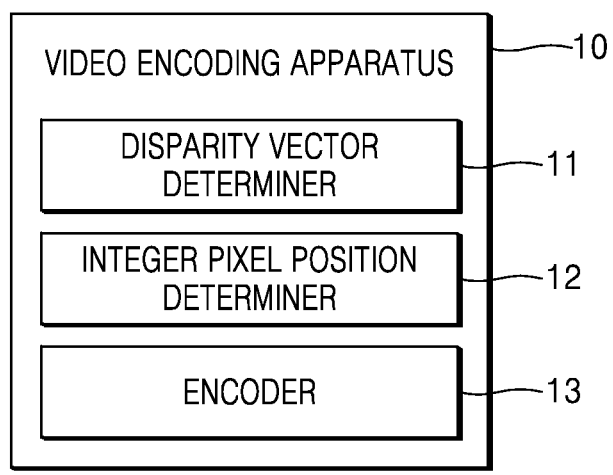
FIG. 1A is a block diagram for describing a configuration of a video encoding apparatus according to one or more embodiments.

FIG. 1A is a block diagram for describing a configuration of a video encoding apparatus 10 according to one or more embodiments.

As shown in FIG. 1A, the video encoding apparatus 10 may include a disparity vector determiner 11, an integer pixel position determiner 12, and an encoder 13. However, the video encoding apparatus 10 may be implemented by more or less components than the shown components.

According to one or more embodiments, the video encoding apparatus 10 may classify a plurality of image sequences for each layer and encode each of the plurality of image sequences classified for each layer, according to a scalable video coding method, and may output an individual stream including data encoded for each layer. The video encoding apparatus 10 may encode an image sequence of a current layer and an image sequence of a reference layer to different layers.

The encoder 13 may encode images of the current layer and output a current layer stream including encoded data of the images of the current layer.

The encoder 13 may encode images of the reference layer and output a reference layer stream including encoded data of the images of the reference layer.

For example, according to a scalable video coding method based on spatial scalability, low-resolution images may be encoded as images of a reference layer, and high-resolution images may be encoded as images of a current layer. An encoding result of the images of the reference layer may be output as a reference layer stream, and an encoding result of the images of the current layer may be output as a current layer stream.

As another example, a multi-view video may be encoded according to a scalable video coding method. Left-view images may be encoded as images of a reference layer, and right-view images may be encoded as images of a current layer. Alternatively, center-view images, left-view images, and right-view images may be separately encoded, wherein the center-view images may be encoded as images of a current layer, the left-view images may be encoded as images of a reference layer, and the right-view images may be encoded as images of another reference layer.

As another example, a scalable video coding method may be performed according to temporal hierarchical prediction based on temporal scalability. A reference layer stream including encoding information generated by encoding images of a basic frame rate may be output. Temporal levels may be classified for each frame rate, and each temporal level may be encoded to each layer. A current layer stream including encoding information of a high-speed frame rate may be output by further encoding images of the high-speed frame rate with reference to images of the basic frame rate.

In addition, scalable video coding on a reference layer and a plurality of current layers may be performed. When the number of current layers is three or more, images of the reference layer, images of a first current layer, images of a second current layer, . . . , and images of a kth current layer may be encoded. Accordingly, an encoding result of the images of the reference layer may be output as a reference layer stream, and encoding results of the images of the first, second, . . . , and kth current layer may be encoded as first, second, . . . , and kth current layer streams, respectively.

According to one or more embodiments, the video encoding apparatus 10 may perform inter prediction for predicting a current image with reference to images of a single layer. A motion vector indicating motion information between the current image and a reference image and a residual component between the current image and the reference image may be generated through the inter prediction.

In addition, the video encoding apparatus 10 may perform interlayer prediction for predicting images of a current layer with reference to images of a reference layer.

In addition, according to an embodiment, when the video encoding apparatus 10 allows three or more layers such as a reference layer, a current layer, and a reference layer, the video encoding apparatus 10 may perform interlayer prediction between an image of one reference layer and an image of a reference layer and interlayer prediction between an image of the current layer and an image of one reference layer according to a multi-layer prediction structure.

A position difference component between a current layer and a reference image of another layer and a residual component between the current layer and the reference image of another layer may be generated through interlayer prediction.

According to one or more embodiments, the video encoding apparatus 10 may encode each block in each image of a video for each layer. A block type may be a square, a quadrilateral or an arbitrary geometric shape. However, the block type is not limited to a data unit having a predetermined size. A block may be a largest coding unit (LCU), a coding unit, a prediction unit, a transformation unit, or the like from among coding units according to a tree structure. The LCU including coding units of a tree structure may be variously named as a coding tree unit, a coding block tree, a root block tree, a coding tree, a coding root, a tree trunk, or the like. Video encoding and decoding methods based on coding units according to a tree structure will be described below with reference to FIGS. 8 to 20.

Inter prediction and interlayer prediction may be performed based on data units such as coding units, prediction units, or transformation units.

According to one or more embodiments, the video encoding apparatus 10 may generate symbol data by performing source coding operations including inter prediction or intra prediction with respect to images of a reference layer. The symbol data indicates a sample value of each coding parameter and a sample value of a residual.

For example, the encoder 13 may generate symbol data by inter/intra predicting, transforming, and quantizing samples in data units with respect to images of a reference layer and generate a reference layer stream by entropy-encoding the symbol data.

The encoder 13 may encode images of a current layer based on coding units of a tree structure. The encoder 13 may generate symbol data by inter/intra-predicting, transforming, and quantizing samples in data units with respect to an image of the current layer and generate a current layer stream by entropy-encoding the symbol data.

According to one or more embodiments, the encoder 13 may perform interlayer prediction for predicting an image of a current layer, by using a reconstructed sample of an image of a reference layer. The encoder 13 may generate a predicted image of the current layer by using a reconstructed image of the reference layer and encode a prediction error between an original image and the predicted image of the current layer, in order to encode the original image of the current layer in an image sequence of the current layer through an interlayer prediction structure.

The encoder 13 may interlayer-predict an image of a current layer for each block such as a coding unit or a prediction unit. A block of an image of a reference layer to which the image of the current layer refers may be determined. For example, a reconstructed block of the image of the reference layer, which is located in correspondence with a position of a current block in the image of the current layer, may be determined. The encoder 13 may determine a predicted block of the current layer by using a reconstructed block of the reference layer corresponding to a block of the current layer.

The encoder 13 may use a predicted block of a current layer, which is determined using a reconstructed block of a reference layer according to an interlayer prediction structure, as a reference image for interlayer prediction on an original block of the current layer. The encoder 13 may entropy-encode, through transformation and quantization, an error between a sample value of the predicted block of the current layer and a sample value of the original block of the current layer, i.e., a residual component according to interlayer prediction, by using a reconstructed image of the reference layer.

As described above, the encoder 13 may encode an image sequence of a current layer with reference to restored images of a reference layer through an interlayer prediction structure. However, according to one or more embodiments, the encoder 13 may encode an image sequence of a current layer according to a single layer prediction structure without referring to samples of another layer. Therefore, it should be regarded not to restrictively analyze that the encoder 13 performs only interlayer prediction to encode an image sequence of a current layer.

According to an embodiment, to induce a brightness compensation parameter, a value of an adjacent pixel of a reconstructed block of a reference layer corresponding to a current block of a current layer should be obtained. In this case, a disparity vector may be used to search for the reconstructed block of the reference layer corresponding to the current block of the current layer. Herein, the disparity vector may be transmitted by being included in a bitstream or induced from other encoding information.

The disparity vector may have an accuracy of a fractional unit such as quarter-pel or half-pel, and thus, a position indicated by the disparity vector at a position of the current block of the current layer may be a position of a sub-pixel. However, since a current block of a second layer and a reference block of a first layer are compared with each other in a unit of integer pixels, a position of the reference block should be determined as a position of an integer pixel. Therefore, the position of the sub-pixel indicated by the disparity vector cannot be used as it is. The video encoding apparatus 10 may perform a video encoding operation including transformation by interworking with an internal or external video encoding processor to output a video encoding result. The internal video encoding processor of the video encoding apparatus 10 is a separate processor and may realize a video encoding operation. In addition, the video encoding apparatus 10, a central processing unit, or a graphic processing unit may realize a basic video encoding operation by including a video encoding processing module.

The disparity determiner 11 may determine a disparity vector having components in a unit of sub-pixels for interlayer prediction between images belonging to a current layer and a reference layer.

The integer pixel position determiner 12 may determine a position of an integer pixel of the reference layer corresponding to a position indicated by the disparity vector determined based on a position of a current pixel of the current layer.

The encoder 13 may encode an image of the current layer by using prediction information of a candidate region of the reference layer which corresponds to the determined position of the integer pixel.

An operation of the video encoding apparatus 10 will now be described in detail with reference to FIGS. 1B to 3C.

Figure 1B:
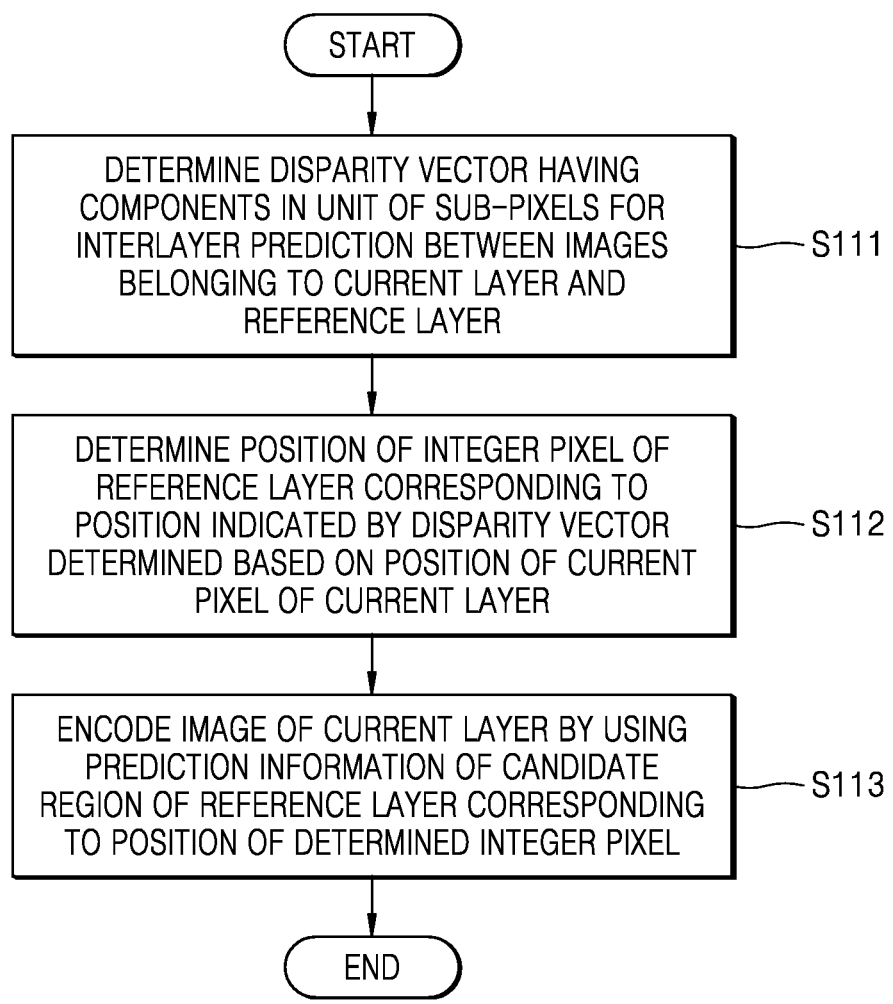
FIG. 1B is a flowchart for describing a method of performing encoding by determining a disparity vector, according to one or more embodiments.

FIG. 1B is a flowchart for describing a method of performing encoding by determining a disparity vector, according to one or more embodiments.

In operation S111, the video encoding apparatus 10 may determine a disparity vector having components in a unit of sub-pixels for interlayer prediction between images belonging to a current layer and a reference layer. The reference layer may indicate a layer that is different from the current layer. For example, the current layer may be a layer related to a color image, and the reference layer may be an enhanced layer related to a depth image. As another example, an image of the current layer and an image of the reference layer may have different points of view.

The disparity vector may represent a difference between positions corresponding to each other with respect to a plurality of layers. In addition, the disparity vector may be used to perform interlayer prediction.

The disparity vector may be used for interlayer prediction between images belonging to different layers. Alternatively, the disparity vector may be used for interlayer prediction between images belonging to the current layer and the reference layer. The video encoding apparatus 10 may use the disparity vector to predict motion information, depth-related information, or residue image data of a current block of the current layer.

The disparity vector may be a vector of a plurality of dimensions. For example, the disparity vector may be a vector of two dimensions. As another example, the disparity vector may be a vector of three dimensions. The disparity vector may have components in a unit of sub-pixels.

Since the disparity vector may have an accuracy of a fractional unit such as quarter-pel or half-pel, a position indicated by the disparity vector at a position of the current block of the current layer may be a position of a sub-pixel. However, since a current block of a second layer and a reference block of a first layer are compared with each other in a unit of integer pixels, a position of the reference block should be determined as a position of an integer pixel. Therefore, the position of the sub-pixel indicated by the disparity vector cannot be used as it is.

The video encoding apparatus 10 may encode an image belonging to the current layer by using an image belonging to the second layer. The video encoding apparatus 10 may predict the image belonging to the current layer by using an image belonging to the reference layer. When the video encoding apparatus 10 encodes the image belonging to the current layer by using the image belonging to the reference layer, the disparity vector may be used. When the video encoding apparatus 10 predicts the image belonging to the current layer by using the image belonging to the reference layer, the disparity vector may be used.

A block to be currently encoded may be referred to as a current block.

The video encoding apparatus 10 may use information related to a candidate region of the reference layer corresponding to a current block of the current layer when the current block of the current layer is encoded.

The video encoding apparatus 10 may use the information related to the candidate region of the reference layer corresponding to the current block of the current layer when the current block of the current layer is predicted.

For example, the video encoding apparatus 10 may use motion information corresponding to the candidate region of the reference layer corresponding to the current block of the current layer when the current block of the current layer is predicted.

As another example, the video encoding apparatus 10 may use depth-related information corresponding to the candidate region of the reference layer corresponding to the current block of the current layer when the current block of the current layer is predicted.

As another example, the video encoding apparatus 10 may use residue image data corresponding to the candidate region of the reference layer corresponding to the current block of the current layer when the current block of the current layer is predicted.

In operation S112, the video encoding apparatus 10 may determine a position of an integer pixel of the reference layer corresponding to a position indicated by the disparity vector determined in operation S111 from a current pixel of the current layer.

The video encoding apparatus 10 may use the disparity vector in order for the current block of the current layer and the candidate region of the reference layer to correspond to each other when the current block of the current layer is encoded.

The video encoding apparatus 10 may determine a region of the reference layer corresponding to the current block of the current layer as the candidate region of the reference layer corresponding to the current block of the current layer through the disparity vector.

The current block of the current layer may include a plurality of pixels. Therefore, the video encoding apparatus 10 may determine a position of a predetermined one of the plurality of pixels belonging to the current block of the current layer as a reference position of the current block. The predetermined pixel as a reference may be the current pixel of the current layer. The video encoding apparatus 10 may determine the position indicted by the disparity vector determined in operation S411 based on the position of the current pixel of the current layer. The video encoding apparatus 10 may determine a position of an integer pixel corresponding to the position indicted by the disparity vector determined in operation S411 based on the position of the current pixel of the current layer. The integer pixel may be located in the reference layer.

The position of the current pixel of the current layer may be located in the current block of the current layer. Also, the position of the current pixel of the current layer may be a predetermined position in the current block of the current layer. For example, the position of the current pixel of the current layer may be located at an upper left end of the current block of the current layer. As another example, the position of the current pixel of the current layer may be located at a lower left end of the current block of the current layer. As another example, the position of the current pixel of the current layer may be located at an upper right end of the current block of the current layer. As another example, the position of the current pixel of the current layer may be located at a lower right end of the current block of the current layer. As another example, the position of the current pixel of the current layer may be located at the center of the current block of the current layer.

The disparity vector may have components in a unit of sub-pixels. Alternatively, the disparity vector may have real number components. Alternatively, the disparity vector may have an accuracy of a fractional unit such as quarter-pel or half-pel. Therefore, the position indicated by the disparity vector at the position of the current block of the current layer may be a position of a sub-pixel. However, since a current block of the second layer and a reference block of the first layer are compared with each other in a unit of integer pixels, a position of the reference block should be determined as a position of an integer pixel. Therefore, the video encoding apparatus 10 cannot use the position of the sub-pixel indicated by the disparity vector as it is. Accordingly, the video encoding apparatus 10 may determine a position of an integer pixel corresponding to the position of the sub-pixel indicated by the disparity vector.

The video encoding apparatus 10 may use a rounding operation when the video encoding apparatus 10 determines the position of the integer pixel corresponding to the position of the sub-pixel indicated by the disparity vector.

Alternatively, the video encoding apparatus 10 may use a bit-shift operation when the video encoding apparatus 10 determines the position of the integer pixel corresponding to the position of the sub-pixel indicated by the disparity vector.

A method by which the video encoding apparatus 10 determines the position of the integer pixel corresponding to the position of the sub-pixel indicated by the disparity vector will be described below in detail.

In operation S113, the video encoding apparatus 10 may encode an image of the current layer by using prediction information of the candidate region of the reference layer corresponding to the position of the integer pixel determined in operation S112.

The video encoding apparatus 10 may determine the candidate region of the reference layer corresponding to the position of the integer pixel determined in operation S412. Thereafter, the video encoding apparatus 10 may obtain prediction information corresponding to the determined candidate region of the reference layer.

The prediction information may include at least one of motion information, depth-related information, and residue image data.

For example, the video encoding apparatus 10 may obtain motion information of the candidate region of the reference layer corresponding to the position of the integer pixel determined in operation S112. The motion information may include a motion vector. Thereafter, the video encoding apparatus 10 may predict motion information of the current block of the current layer by using the determined motion information.

As another example, the video encoding apparatus 10 may obtain depth-related information of the candidate region of the reference layer corresponding to the position of the integer pixel determined in operation S412. The reference layer may be a depth layer. Thereafter, the video encoding apparatus 10 may encode the current block of the current layer by using the determined depth-related information. Alternatively, the video encoding apparatus 10 may predict depth-related information of the current block of the current layer by using the determined depth-related information.

As another example, the video encoding apparatus 10 may obtain residue image data of the candidate region of the reference layer corresponding to the position of the integer pixel determined in operation S112. Thereafter, the video encoding apparatus 10 may predict residue image data of the current block of the current layer by using the determined residue image data.

The integer pixel determined in operation S412 may be located in the determined candidate region of the reference layer. Also, the integer pixel determined in operation S412 may be located at a predetermined position in the determined candidate region of the reference layer. For example, the integer pixel determined in operation S412 may be located at an upper left end of the determined candidate region of the reference layer. As another example, the integer pixel determined in operation S412 may be located at a lower left end of the determined candidate region of the reference layer. As another example, the integer pixel determined in operation S412 may be located at an upper right end of the determined candidate region of the reference layer. As another example, the integer pixel determined in operation S412 may be located at a lower right end of the determined candidate region of the reference layer. As another example, the integer pixel determined in operation S412 may be located at the center of the determined candidate region of the reference layer.

Figure 2A:
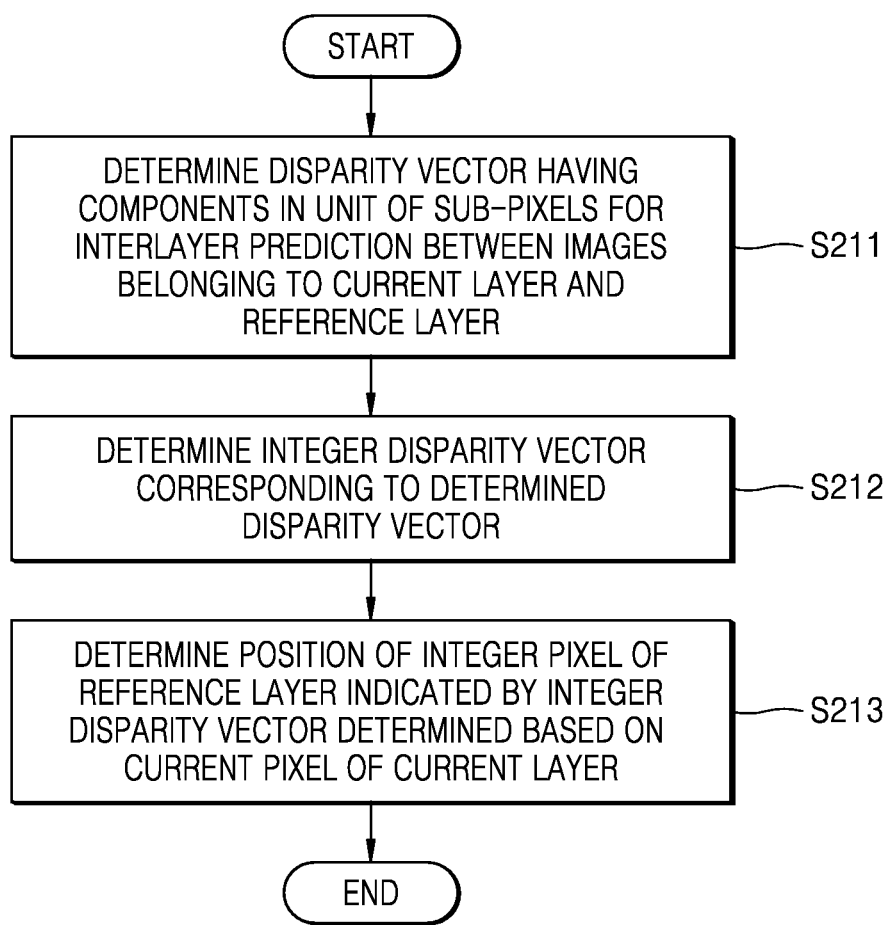
FIG. 2A is a flowchart for describing a method of determining a position of an integer pixel by determining an integer disparity vector corresponding to a disparity vector, according to one or more embodiments.

FIG. 2A is a flowchart for describing a method of determining a position of an integer pixel by determining an integer disparity vector corresponding to a disparity vector, according to one or more embodiments.

Operation S211 corresponds to operation S111, and thus, a detailed description thereof is omitted for conciseness of the overall description.

In operation S212, the video encoding apparatus 10 may determine an integer disparity vector corresponding to the disparity vector determined in operation S211.

The integer disparity vector may have integers as components thereof. However, the video encoding apparatus 10 may have the disparity vector determined in operation S211 with components in a unit of sub-pixels. For example, the disparity vector may have an accuracy of a fractional unit such as quarter-pel or half-pel.

Therefore, when the components of the disparity vector determined in operation S211 are integers, the integer disparity vector corresponding to the disparity vector determined in operation S211 may be identical to the disparity vector determined in operation S211.

However, when the components of the disparity vector determined in operation S211 are not integers, the integer disparity vector corresponding to the disparity vector determined in operation S211 may not be identical to the disparity vector determined in operation S211.

The video encoding apparatus 10 may determine an integer disparity vector corresponding to the disparity vector determined in operation S211 when the components of the disparity vector determined in operation S211 are not integers.

A method by which the video encoding apparatus 10 determines an integer disparity vector will be described below in detail with reference to FIGS. 2B and 2C.

In operation S213, the video encoding apparatus 10 may determine a position of an integer pixel of a reference layer indicated by the integer disparity vector determined in operation S212 from a current pixel of a current layer.

The current pixel of the current layer may be an integer pixel. Therefore, the position of a pixel of the reference layer indicated by the integer disparity vector determined in operation S212 from the current pixel of the current layer may be a position of an integer pixel.

The video encoding apparatus 10 may determine the position of the pixel of the reference layer indicated by the integer disparity vector determined in operation S212 from the current pixel of the current layer. The position of the pixel of the reference layer indicated by the disparity vector may be a position of an integer pixel when the current pixel is an integer pixel.

Figure 2B:
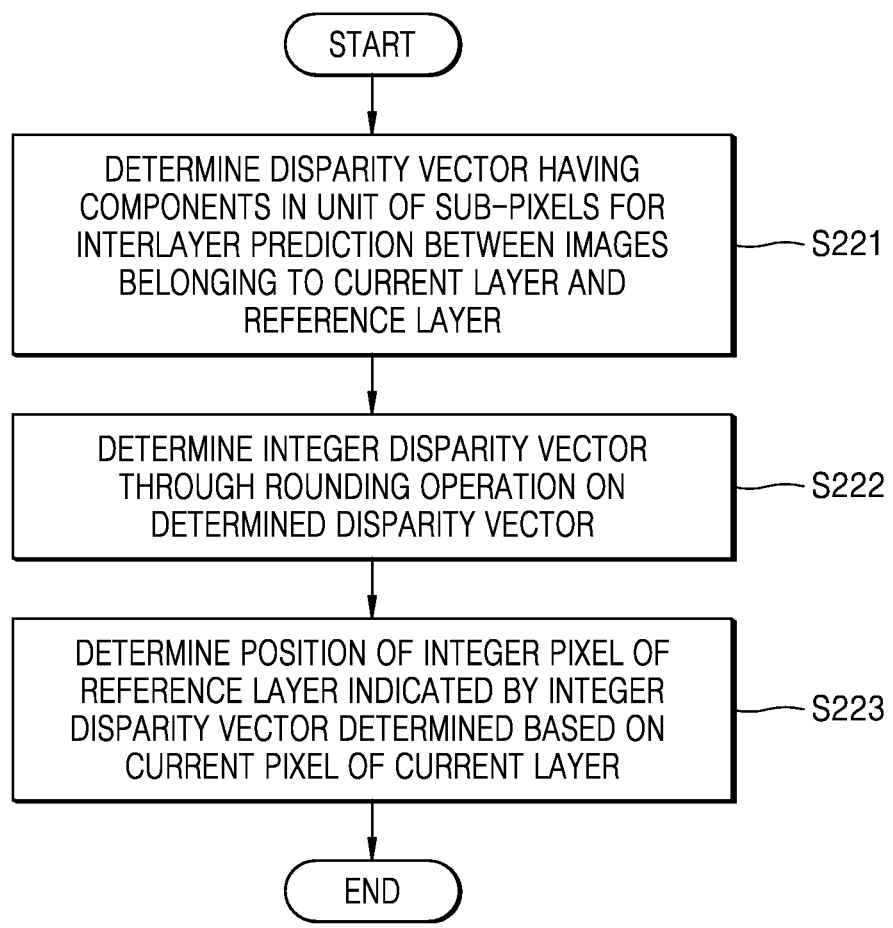
FIG. 2B is a flowchart for describing a method of determining an integer disparity vector through a rounding operation on a sub-pixel unit of x and y components of a disparity vector, according to one or more embodiments.

FIG. 2B is a flowchart for describing a method of determining an integer disparity vector through a rounding operation on a sub-pixel unit of x and y components of a disparity vector, according to one or more embodiments.

Operation S221 corresponds to operation S111, and operation S223 corresponds to operation S213, and thus, a detailed description thereof is omitted for conciseness of the overall description.

In operation S222, the video encoding apparatus 10 may determine an integer disparity vector through a rounding operation on a sub-pixel unit of x and y components of the disparity vector determined in operation S221.

The video encoding apparatus 10 may determine a vector value corresponding to the disparity vector determined in operation S221. Thereafter, the video encoding apparatus 10 may perform a rounding operation on a value of each component of the determined vector value. Thereafter, the video encoding apparatus 10 may determine an integer disparity vector having, as components, values for which the rounding operation has been performed.

FIG. 2C is a flowchart for describing a method of determining an integer disparity vector, according to one or more embodiments.

Operation S231 corresponds to operation S111, and thus, a detailed description thereof is omitted for conciseness of the overall description.

In operation S232, the video encoding apparatus 10 may determine a disparity vector value from the disparity vector determined in operation S232.

Alternatively, the video encoding apparatus 10 may determine values of components of the disparity vector determined in operation S231. The number of components of the disparity vector determined in operation S231 may be 2 or more.

In operation S233, the video encoding apparatus 10 may add a predetermined value to the disparity vector value determined in operation S232.

For example, the video encoding apparatus 10 may add 1 to the disparity vector value determined in operation S232. As another example, the video encoding apparatus 10 may add 2 to the disparity vector value determined in operation S232.

The predetermined value to be added to the disparity vector value determined in operation S232 may be 1 or nth power of 2 (n is an integer).

Alternatively, the predetermined value to be added to the disparity vector value determined in operation S232 may be 1 or nth power of 2 (n is a positive integer).

The predetermined value to be added to the disparity vector value determined in operation S232 may be related to the number of bits shifted in operation S233.

For example, when the number of bits shifted in operation S233 is k, the predetermined value to be added to the disparity vector value determined in operation S232 may be (k−1)th power of 2. As another example, when the number of bits shifted in operation S233 is 1, the predetermined value to be added to the disparity vector value determined in operation S232 may be 1. As another example, when the number of bits shifted in operation S233 is 2, the predetermined value to be added to the disparity vector value determined in operation S232 may be 2. As another example, when the number of bits shifted in operation S233 is 3, the predetermined value to be added to the disparity vector value determined in operation S232 may be 4.

As another example, when the number of bits shifted in operation S233 is k, the predetermined value to be added to the disparity vector value determined in operation S232 may be a value obtained by adding 1 to (k−1)th power of 2.

As another example, when the number of bits shifted in operation S233 is k, the predetermined value to be added to the disparity vector value determined in operation S232 may be a value obtained by adding 2 to (k−1)th power of 2.

In operation S234, the video encoding apparatus 10 may shift a value to which the predetermined value has been added in operation S233 to the right by predetermined bits in a bit-shift operation.

Alternatively, the video encoding apparatus 10 may shift the value to which the predetermined value has been added in operation S233 to the left by predetermined bits in a bit-shift operation.

How the video encoding apparatus 10 determines the predetermined value to be added to the disparity vector value determined in operation S232 has been described in detail.

Figure 3A:
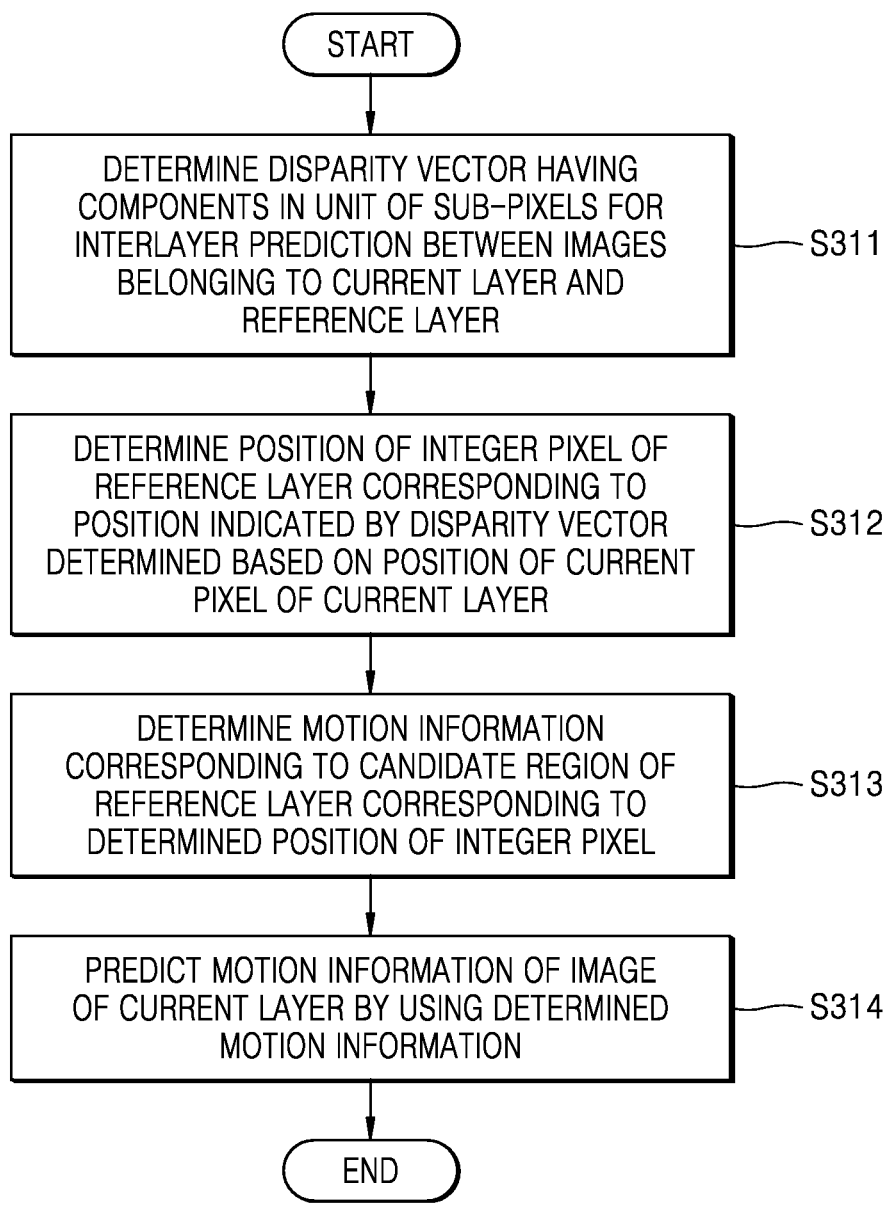
FIG. 3A is a flowchart for describing a method of predicting motion information by using a position of a determined integer pixel, according to one or more embodiments.

FIG. 3A is a flowchart for describing a method of predicting motion information by using a position of a determined integer pixel, according to one or more embodiments.

Operations S311 and S312 correspond to operations S111 and S112, respectively, and thus, a detailed description thereof is omitted for conciseness of the overall description.

In operation S313, the video encoding apparatus 10 may determine motion information corresponding to a candidate region of a reference layer corresponding to a position of an integer pixel determined in operation S312.

The motion information may include a motion vector. The motion information, the motion vector, and motion prediction have been described above.

The video encoding apparatus 10 may determine the candidate region of the reference layer corresponding to the position of the integer pixel determined in operation S312. Thereafter, the video encoding apparatus 10 may obtain motion information corresponding to the determined candidate region of the reference layer. Alternatively, the video encoding apparatus 10 may obtain motion information allocated to the determined candidate region of the reference layer.

An embodiment of predicting motion information by using a position of an integer pixel determined according to one or more embodiments may be represented by pseudo codes as described below.

xRefFull=xPb+(nPbW>>1)+((mvDisp[0]+2)>>2),
yRefFull=yPb+(nPbH>>1)+((mvDisp[1]+2)>>2).

A block to be currently encoded may be referred to as a current block. The current block may be an overall or partial region of an image of a current layer. The video encoding apparatus 10 may use information related to a candidate region of the reference layer corresponding to the current block of the current layer when the video encoding apparatus 10 encodes the current block of the current layer. The current block may be a luma block.

The video encoding apparatus 10 may determine a position of an integer pixel of the reference layer corresponding to a position indicated by a disparity vector from a current pixel of the current layer.

xPb may indicate a horizontal axis position of the current pixel located at a predetermined position in the current block of the current layer.

yPb may indicate a vertical axis position of the current pixel located at the predetermined position in the current block of the current layer.

nPbW may indicate a width of the current block of the current layer.

nPbH may indicate a height of the current block of the current layer.

$>>$ may indicate movement of bits to the right.

$<<$ may indicate movement of bits to the left.

mvDisp may indicate a disparity vector.

$((\text{mvDisp}[0]+2)>>2)$ may indicate a value of a horizontal axis component of an integer disparity vector.

$((\text{mvDisp}[1]+2)>>2)$ may indicate a value of a vertical axis component of the integer disparity vector.

Therefore, an operation of obtaining the integer disparity vector from the disparity vector by adding 2 and performing a shift operation by 2 to the right is performed.

xRefFull may indicate a horizontal axis position of the integer pixel of the reference layer.

yRefFull may indicate a vertical axis position of the integer pixel of the reference layer.

In addition, through an operation such as the pseudo codes, the video encoding apparatus 10 may determine the position of the integer pixel located in an image of the reference layer based on the position of the current pixel and a value of the disparity vector. In addition, the video encoding apparatus 10 may determine the integer disparity vector by performing an addition and shift operation on the disparity vector.

In operation S314, the video encoding apparatus 10 may predict motion information of an image of the current layer by using the motion information determined in operation S313.

The video encoding apparatus 10 may encode the image of the current layer by using the motion information determined in operation S313.

Figure 3B:
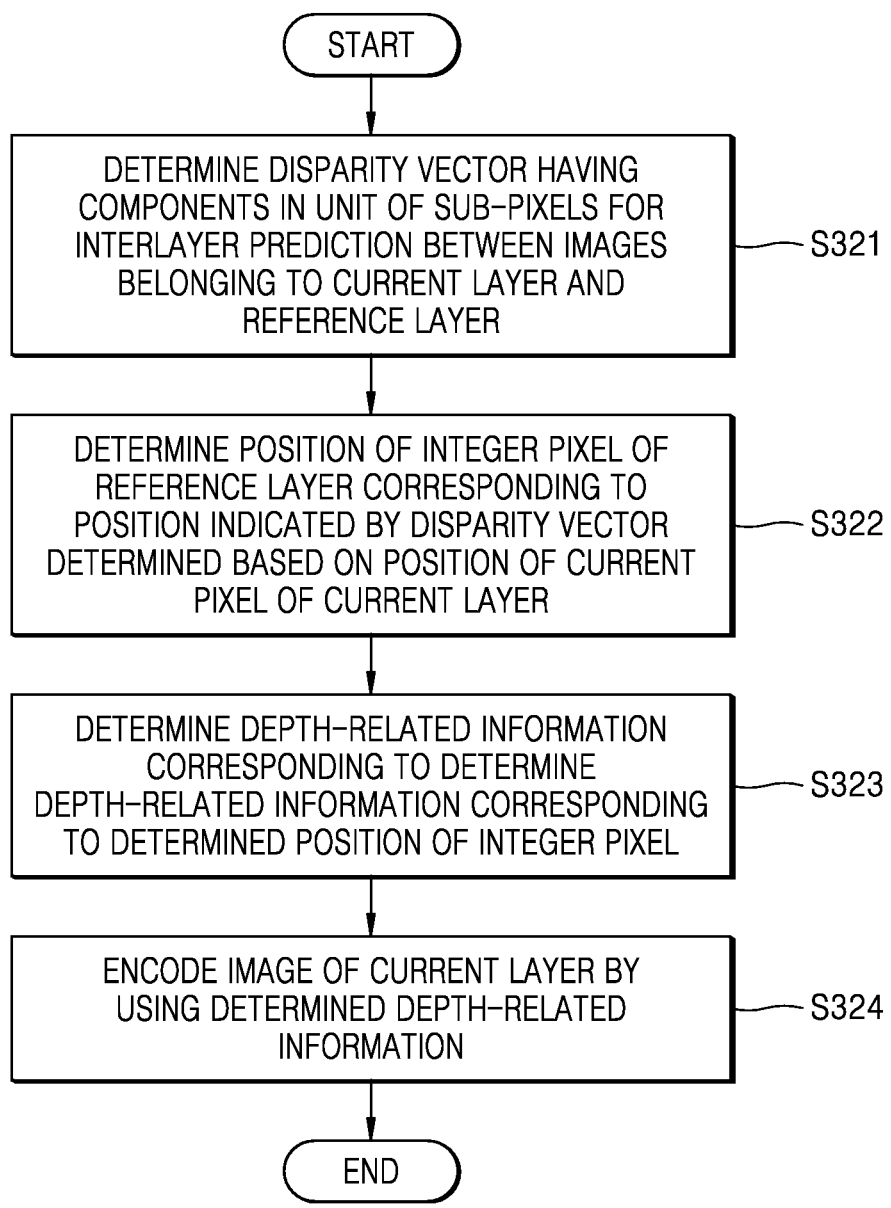
FIG. 3B is a flowchart for describing a method of determining depth-related information by using a position of a determined integer pixel and of performing encoding, according to one or more embodiments.

FIG. 3B is a flowchart for describing a method of determining depth-related information by using a position of a determined integer pixel and of performing encoding, according to one or more embodiments.

Operations S321 and S322 correspond to operations S111 and S112, respectively, and thus, a detailed description thereof is omitted for conciseness of the overall description.

According to one or more embodiments, the video encoding apparatus 10 may obtain depth information from a depth image and determine a disparity vector by using the obtained depth information. Thereafter, the video encoding apparatus 10 may determine a candidate region of a reference layer by using the determined disparity vector.

In operation S323, the video encoding apparatus 10 may determine depth-related information corresponding to the candidate region of the reference layer corresponding to a position of an integer pixel determined in operation S322. The reference layer may be a depth layer.

The depth-related information may include depth information of an image.

The video encoding apparatus 10 may determine the candidate region of the reference layer corresponding to the position of the integer pixel determined in operation S322. Thereafter, the video encoding apparatus 10 may obtain depth-related information corresponding to the determined candidate region of the reference layer.

In operation S324, the video encoding apparatus 10 may encode an image of a current layer by using the depth-related information determined in operation S323.

Alternatively, the video encoding apparatus 10 may predict depth-related information of a current block of the current layer by using the determined depth-related information.

An embodiment of predicting depth-related information by using a position of an integer pixel determined according to one or more embodiments may be represented by pseudo codes as described below.

$\text{xTL}=\text{xP}+((\text{mvDisp}[0]+2)>>2)$,
$\text{yTL}=\text{yP}+((\text{mvDisp}[1]+2)>>2)$.

A block to be currently encoded may be referred to as a current block. The current block may be an overall or partial region of a color image. The video encoding apparatus 10 may use information related to a candidate region of the depth image corresponding to the current block of the color image when the video encoding apparatus 10 encodes the current block of the color image.

The video encoding apparatus 10 may determine a position of an integer pixel of the depth image corresponding to a position indicated by a disparity vector from a current pixel of the color image.

xP may indicate a horizontal axis position of the current pixel located at a predetermined position in the current block of the color image.

yP may indicate a vertical axis position of the current pixel located at the predetermined position in the current block of the color image.

$>>$ may indicate movement of bits to the right.

$<<$ may indicate movement of bits to the left.

mvDisp may indicate a disparity vector.

$((\text{mvDisp}[0]+2)>>2)$ may indicate a value of a horizontal axis component of an integer disparity vector.

$((\text{mvDisp}[1]+2)>>2)$ may indicate a value of a vertical axis component of the integer disparity vector.

Therefore, an operation of obtaining the integer disparity vector from the disparity vector by adding 2 and performing a shift operation by 2 to the right is performed.

xTL may indicate a horizontal axis position of the integer pixel located in the depth image.

yTL may indicate a vertical axis position of the integer pixel located in the depth image.

In addition, through an operation such as the pseudo codes, the video encoding apparatus 10 may determine the position of the integer pixel located in the depth image based on the position of the current pixel and a value of the disparity vector. In addition, the video encoding apparatus 10 may determine the integer disparity vector by performing an addition and shift operation on the disparity vector.

FIG. 3C is a flowchart for describing a method of predicting residue image data by using a position of a determined integer pixel, according to one or more embodiments.

Operations S331 and S332 correspond to operations S111 and S112, respectively, and thus, a detailed description thereof is omitted for conciseness of the overall description.

In operation S333, the video encoding apparatus 10 may determine residue image data corresponding to a candidate region of a reference layer corresponding to a position of an integer pixel determined in operation S332.

The video encoding apparatus 10 may determine the candidate region of the reference layer corresponding to the position of the integer pixel determined in operation S332. Thereafter, the video encoding apparatus 10 may obtain residue image data corresponding to the determined candidate region of the reference layer.

In operation S334, the video encoding apparatus 10 may predict residue image data of an image of a current layer by using the residue image data determined in operation S333.

Alternatively, the video encoding apparatus 10 may encode the image of the current layer by using the determined motion information.

An embodiment of determining a position of the candidate region of the reference region to predict residue image data by using a position of an integer pixel determined according to one or more embodiments may be represented by pseudo codes as described below.

xRef=Clip3(0, PicWidthInSamplesL−1, xP+(nPSW>>1)+((mvDisp[0]+2)>>2))

yRef=Clip3(0, PicHeightInSamplesL−1, yP+(nPSH>>1)+((mvDisp[1]+2)>>2)).

A block to be currently encoded may be referred to as a current block. The current block may be an overall or partial region of the image of the current layer. The video encoding apparatus 10 may use information related to a candidate region of the reference layer corresponding to the current block of the current layer when the video encoding apparatus 10 encodes the current block of the current layer.

The video encoding apparatus 10 may determine a position of an integer pixel of the reference layer corresponding to a position indicated by a disparity vector from a current pixel of the current layer.

xP may indicate a horizontal axis position of the current pixel located at a predetermined position in the current block of the color image.

yP may indicate a vertical axis position of the current pixel located at the predetermined position in the current block of the color image.

>> may indicate movement of bits to the right.

<< may indicate movement of bits to the left.

mvDisp may indicate a disparity vector.

((mvDisp[0]+2)>>2) may indicate a value of a horizontal axis component of an integer disparity vector.

((mvDisp[1]+2)>>2) may indicate a value of a vertical axis component of the integer disparity vector.

Therefore, it may be determined that an operation of obtaining the integer disparity vector from the disparity vector by adding 2 and performing a shift operation by 2 to the right is performed.

xRef may indicate a horizontal axis position of an integer pixel of the reference layer.

yRef may indicate a vertical axis position of the integer pixel of the reference layer.

The video encoding apparatus 10 may search for a position of the reference layer corresponding to the current block of the current layer based on the disparity vector. The video encoding apparatus 10 may use the integer disparity vector when the video encoding apparatus 10 searches for the position of the reference layer corresponding to the current block of the current layer. The integer disparity vector may be determined through an addition and shift operation on the disparity vector. The video encoding apparatus 10 may obtain residue image data from a candidate region corresponding to the position of the reference layer corresponding to the current block of the current layer. The video encoding apparatus 10 may predict residue image data of the current block by using the obtained residue image data.

Figure 4A:
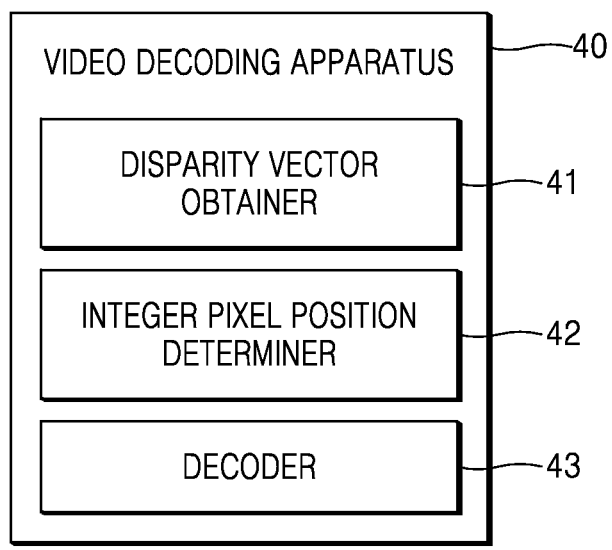
FIG. 4A is a block diagram for describing a configuration of a video decoding apparatus according to one or more embodiments.

FIG. 4A is a block diagram for describing a configuration of a video decoding apparatus 40 according to one or more embodiments.

As shown in FIG. 4A, the video decoding apparatus 40 may include a disparity vector obtainer 11, an integer pixel position determiner 12, and a decoder 13. However, the video decoding apparatus 40 may be implemented by more or less components than the shown components.

According to one or more embodiments, the video decoding apparatus 40 may receive bitstreams for each layer according to a scalable coding method. The number of layers of the bitstreams received by the video decoding apparatus 40 is not limited.

The video decoding apparatus 40 based on spatial scalability may receive a stream in which image sequences of different resolutions are encoded to different layers. A low-resolution image sequence may be reconstructed by decoding a reference layer stream, and a high-resolution image sequence may be reconstructed by decoding a current layer stream.

A multi-view video may be decoded according to a scalable video coding method. When a stereoscopic video stream is received as a plurality of layers, left-view images may be reconstructed by decoding a reference layer stream. Right-view images may be reconstructed by further decoding a current layer stream in addition to the reference layer stream.

Alternatively, when a multi-view video stream is received as a plurality of layers, center-view images may be reconstructed by decoding a reference layer stream. Left-view images may be reconstructed by decoding a current layer stream in addition to the reference layer stream. Right-view images may be reconstructed by further decoding the reference layer stream in addition to the reference layer stream.

A scalable video coding method based on temporal scalability may be performed. Images of a basic frame rate may be reconstructed by decoding a reference layer stream. Images of a high-speed frame rate may be reconstructed by further decoding a current layer stream in addition to the reference layer stream.

In addition, when the number of current layers is 3 or more, images of a reference layer may be reconstructed from a reference layer stream, and images of a current layer may be further reconstructed by further decoding a current layer stream with reference to the reconstructed images of the reference layer. Images of a kth layer may be further reconstructed by further decoding a kth layer stream with reference to the reconstructed images of the current layer.

The video decoding apparatus 40 may obtain encoded data of images of a reference layer and images of a current layer from a reference layer stream and a current layer stream and further obtain a motion vector generated by inter prediction and prediction information generated by inter-layer prediction.

For example, the video decoding apparatus 40 may decode data inter-predicted for each layer and decode data interlayer-predicted between a plurality of layers. Reconstruction through motion compensation and interlayer decoding may be performed based on coding units or prediction units.

For each layer stream, images may be reconstructed by performing motion compensation for a current image with reference to reconstructed images predicted through inter prediction of a same layer. The motion compensation indicates an operation of reconfiguring a reconstructed image of a current image by synthesizing a reference image determined using a motion vector of the current image and a residual component of the current image.

In addition, the video decoding apparatus 40 may perform interlayer decoding by referring to images of a reference layer to reconstruct an image of a current layer which is predicted through interlayer prediction. The interlayer decoding indicates an operation of reconfiguring a reconstructed image of a current image by synthesizing a reference image of another layer determined to predict the current image and a residual component of the current image.

According to an embodiment, the video decoding apparatus 40 may perform interlayer decoding for reconstructing images of a reference layer predicted by referring to images of a current layer.

However, according to one or more embodiments, the decoder 43 may decode a current layer stream even without referring to an image sequence of a reference layer. Therefore, it should be regarded not to restrictively analyze that the decoder 43 performs interlayer prediction to decode an image sequence of a current layer.

The video decoding apparatus 40 decodes each image of a video for each block. A block may be a LCU, a coding unit, a prediction unit, a transformation unit, or the like from among coding units according to a tree structure.

The decoder 43 may decode an image of a reference layer by using encoding symbols of a parsed image of the reference layer. If the video decoding apparatus 40 receives encoded streams based on coding units of a tree structure, the decoder 43 may perform decoding based on the coding units of the tree structure for each LCU of a reference layer stream.

The decoder 43 may obtain encoding information and encoded data by performing entropy decoding for each LCU. The decoder 43 may reconstruct a residual component by performing inverse quantization and inverse transformation on encoded data obtained from a stream. According to another embodiment, the decoder 43 may directly receive a bitstream of quantized transformation coefficients. As a result of inverse quantization and inverse transformation on the quantized transformation coefficients, a residual component of images may be reconstructed.

The decoder 43 may reconstruct images of a reference layer by combining a predicted image and a residual component through motion compensation between images in a same layer.

The decoder 43 may generate a predicted image of a current layer by using samples of a reconstructed image of a reference layer according to an interlayer prediction structure. The decoder 43 may obtain a prediction error according to interlayer prediction by decoding a current layer stream. The decoder 43 may generate a reconstructed image of the current layer by combining the prediction error with the predicted image of the current layer.

The decoder 43 may determine a predicted image of a current layer by using a decoded reconstructed image of a reference layer. The decoder 43 may determine a block of an image of the reference layer to which a block such as a coding unit or a prediction unit of an image of the current layer refers, according to an interlayer prediction structure. For example, a reconstructed block of the image of the reference layer which is located in correspondence with a position of a current block of the image of the current layer may be determined. The decoder 43 may determine the predicted image of the current layer by using the reconstructed block of the reference layer corresponding to the block of the current layer.

The decoder 43 may use a predicted block of a current layer which is determined using a reconstructed block of a reference layer according to an interlayer prediction structure, as a reference image for interlayer prediction of an original block of the current layer. In this case, the decoder 43 may reconstruct a block of the current layer by synthesizing a sample value of a predicted block of the current layer, which is determined using the reconstructed block of the reference layer, and a residual component according to the interlayer prediction.

According to a spatial scalable video coding method, when the decoder 43 reconstructs an image of a reference layer having a resolution that is different from that of an image of a current layer, the decoder 43 may interpolate the reconstructed image of the reference layer to adjust a size of the reconstructed image of the reference layer such that the reconstructed image of the reference layer has the same resolution as an original image of the current layer. The interpolated reconstructed image of the reference layer may be determined as a predicted image of the current layer for interlayer prediction.

The video decoding apparatus 40 may receive a data stream. The data stream received by the video decoding apparatus 40 may include network abstraction layer (NAL) units.

A NAL unit may indicate a basic unit forming a bitstream. In addition, one or more NAL units may form a data stream. The video decoding apparatus 40 may receive a data stream including one or more NAL units from the outside.

The video decoding apparatus 40 may receive a data stream, separate the data stream into NAL units, and decode each separated NAL unit.

Each NAL unit may include two-byte header information. In addition, the video decoding apparatus 40 may determine brief information about data inside each NAL unit by decoding the two-byte header information included in each NAL unit.

The disparity vector obtainer 41 may obtain a disparity vector having components in a unit of sub-pixels for interlayer prediction between images belonging to a current layer and a reference layer.

The integer pixel position determiner 12 may determine a position of an integer pixel of the reference layer corresponding to a position indicated by the disparity vector obtained from a current pixel of the current layer.

The decoder 13 may decode an image of the current layer by using prediction information of a candidate region of the reference layer corresponding to the determined position of the integer pixel.

The video decoding apparatus 40 may decode an image in relation to interlayer prediction.

An operation of the video decoding apparatus 40 will now be described in detail with reference to FIGS. 4B to 6C.

Figure 4B:
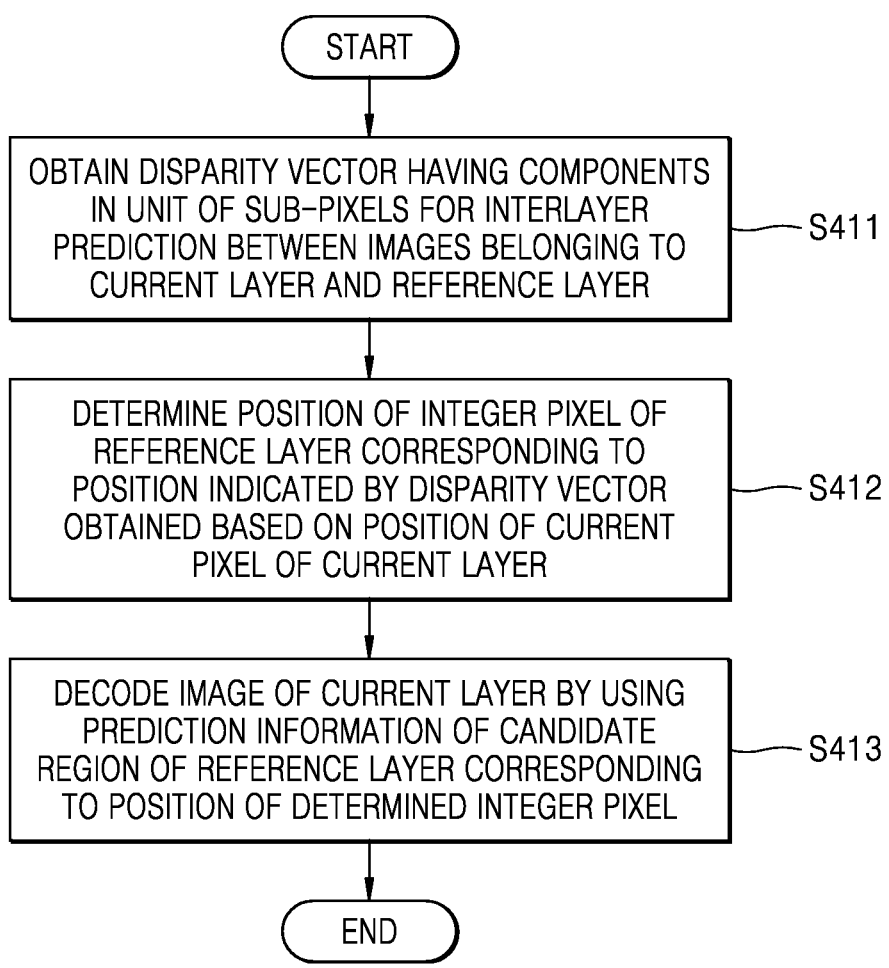
FIG. 4B is a flowchart for describing a method of performing decoding by obtaining a disparity vector, according to one or more embodiments.

FIG. 4B is a flowchart for describing a method of performing decoding by obtaining a disparity vector, according to one or more embodiments.

In operation S411, the video decoding apparatus 40 may obtain a disparity vector having components in a unit of sub-pixels for interlayer prediction between images belonging to a current layer and a reference layer.

The reference layer may indicate a layer that is different from the current layer. For example, the current layer may be a layer related to a color image, and the reference layer may be a layer related to a depth image. As another example, an image of the current layer and an image of the reference layer may have different points of view.

The disparity vector may represent a difference between positions corresponding to each other with respect to a plurality of layers. In addition, the disparity vector may be used to perform interlayer prediction.

The disparity vector may be used for interlayer prediction between images belonging to different layers. Alternatively, the disparity vector may be used for interlayer prediction between images belonging to the current layer and the reference layer.

The disparity vector may be a vector of a plurality of dimensions. For example, the disparity vector may be a vector of two dimensions. As another example, the disparity vector may be a vector of three dimensions. The disparity vector may have components in a unit of sub-pixels.

Since the disparity vector may have an accuracy of a fractional unit such as quarter-pel or half-pel, a position indicated by the disparity vector at a position of a current block of the current layer may be a position of a sub-pixel. However, since a current block of a second layer and a reference block of a first layer are compared with each other in a unit of integer pixels, a position of the reference block should be determined as a position of an integer pixel. Therefore, the position of the sub-pixel indicated by the disparity vector cannot be used as it is.

The video decoding apparatus 40 may decode an image belonging to the current layer by using an image belonging to the second layer. The video decoding apparatus 40 may predict the image belonging to the current layer by using an image belonging to the reference layer. When the video decoding apparatus 40 decodes the image belonging to the current layer by using the image belonging to the reference layer, the disparity vector may be used. When the video decoding apparatus 40 predicts the image belonging to the current layer by using the image belonging to the reference layer, the disparity vector may be used.

A block to be currently decoded may be referred to as a current block.

The video decoding apparatus 40 may use information related to a candidate region of the reference layer corresponding to a current block of the current layer when the current block of the current layer is decoded.

For example, the video decoding apparatus 40 may use motion information corresponding to the candidate region of the reference layer corresponding to the current block of the current layer when the current block of the current layer is decoded.

As another example, the video decoding apparatus 40 may use depth-related information corresponding to the candidate region of the reference layer corresponding to the current block of the current layer when the current block of the current layer is decoded.

As another example, the video decoding apparatus 40 may use residue image data corresponding to the candidate region of the reference layer corresponding to the current block of the current layer when the current block of the current layer is decoded.

The video decoding apparatus 40 may use information related to the candidate region of the reference layer corresponding to the current block of the current layer when the current block of the current layer is predicted.

For example, the video decoding apparatus 40 may use motion information corresponding to the candidate region of the reference layer corresponding to the current block of the current layer when the current block of the current layer is predicted.

As another example, the video decoding apparatus 40 may use depth-related information corresponding to the candidate region of the reference layer corresponding to the current block of the current layer when the current block of the current layer is predicted.

As another example, the video decoding apparatus 40 may use residue image data corresponding to the candidate region of the reference layer corresponding to the current block of the current layer when the current block of the current layer is predicted.

In operation S412, the video decoding apparatus 40 may determine a position of an integer pixel of the reference layer corresponding to a position indicated by the disparity vector obtained in operation S411 from a current pixel of the current layer.

The video decoding apparatus 40 may use the disparity vector in order for the current block of the current layer and the candidate region of the reference layer to correspond to each other when the current block of the current layer is decoded.

The video decoding apparatus 40 may determine a region of the reference layer corresponding to the current block of the current layer as the candidate region of the reference layer corresponding to the current block of the current layer through the disparity vector.

The current block of the current layer may include a plurality of pixels. Therefore, the video decoding apparatus 40 may determine a position of a predetermined one of the plurality of pixels belonging to the current block of the current layer as a reference position of the current block. The predetermined pixel as a reference may be the current pixel of the current layer. The video encoding apparatus 10 may determine the position indicted by the disparity vector obtained in operation S411 based on the position of the current pixel of the current layer. The video decoding apparatus 40 may determine a position of an integer pixel corresponding to the position indicted by the disparity vector obtained in operation S411 based on the position of the current pixel of the current layer. The integer pixel may be located in the reference layer.

The position of the current pixel of the current layer may be located in the current block of the current layer. Also, the position of the current pixel of the current layer may be a predetermined position in the current block of the current layer. For example, the position of the current pixel of the current layer may be located at an upper left end of the current block of the current layer. As another example, the position of the current pixel of the current layer may be located at a lower left end of the current block of the current layer. As another example, the position of the current pixel of the current layer may be located at an upper right end of the current block of the current layer. As another example, the position of the current pixel of the current layer may be located at a lower right end of the current block of the current layer. As another example, the position of the current pixel of the current layer may be located at the center of the current block of the current layer.

The disparity vector may have components in a unit of sub-pixels. Alternatively, the disparity vector may have real number components. Alternatively, the disparity vector may have an accuracy of a fractional unit such as quarter-pel or half-pel. Therefore, the position indicated by the disparity vector at the position of the current block of the current layer may be a position of a sub-pixel. However, since a current block of the second layer and a reference block of the first layer are compared with each other in a unit of integer pixels, a position of the reference block should be determined as a position of an integer pixel. Therefore, the video decoding apparatus 40 cannot use the position of the sub-pixel indicated by the disparity vector as it is. Accordingly, the video decoding apparatus 40 may determine a position of an integer pixel corresponding to the position of the sub-pixel indicated by the disparity vector.

The video decoding apparatus 40 may use a rounding operation when the video decoding apparatus 40 determines the position of the integer pixel corresponding to the position of the sub-pixel indicated by the disparity vector.

Alternatively, the video decoding apparatus 40 may use a bit-shift operation when the video decoding apparatus 40 determines the position of the integer pixel corresponding to the position of the sub-pixel indicated by the disparity vector.

A method by which the video decoding apparatus 40 determines the position of the integer pixel corresponding to the position of the sub-pixel indicated by the disparity vector will be described below in detail.

In operation S413, the video decoding apparatus 40 may decode an image of the current layer by using prediction information of the candidate region of the reference layer corresponding to the position of the integer pixel determined in operation S412.

The video decoding apparatus 40 may determine the candidate region of the reference layer corresponding to the position of the integer pixel determined in operation S412. Thereafter, the video decoding apparatus 40 may obtain prediction information corresponding to the determined candidate region of the reference layer.

The prediction information may include at least one of motion information, depth-related information, and residue image data.

For example, the video decoding apparatus 40 may obtain motion information of the candidate region of the reference layer corresponding to the position of the integer pixel determined in operation S412. The motion information may include a motion vector. Thereafter, the video decoding apparatus 40 may predict motion information of the current block of the current layer by using the obtained motion information.

As another example, the video decoding apparatus 40 may obtain depth-related information of the candidate region of the reference layer corresponding to the position of the integer pixel determined in operation S412. The reference layer may be a depth layer. Thereafter, the video decoding apparatus 40 may encode the current block of the current layer by using the obtained depth-related information. Alternatively, the video decoding apparatus 40 may predict depth-related information of the current block of the current layer by using the obtained depth-related information.

As another example, the video decoding apparatus 40 may obtain residue image data of the candidate region of the reference layer corresponding to the position of the integer pixel determined in operation S412. Thereafter, the video decoding apparatus 40 may predict residue image data of the current block of the current layer by using the obtained residue image data.

The integer pixel determined in operation S412 may be located in the determined candidate region of the reference layer. Also, the integer pixel determined in operation S412 may be located at a predetermined position in the determined candidate region of the reference layer. For example, the integer pixel determined in operation S412 may be located at an upper left end of the determined candidate region of the reference layer. As another example, the integer pixel determined in operation S412 may be located at a lower left end of the determined candidate region of the reference layer. As another example, the integer pixel determined in operation S412 may be located at an upper right end of the determined candidate region of the reference layer. As another example, the integer pixel determined in operation S412 may be located at a lower right end of the determined candidate region of the reference layer. As another example, the integer pixel determined in operation S412 may be located at the center of the determined candidate region of the reference layer.

Figure 5A:
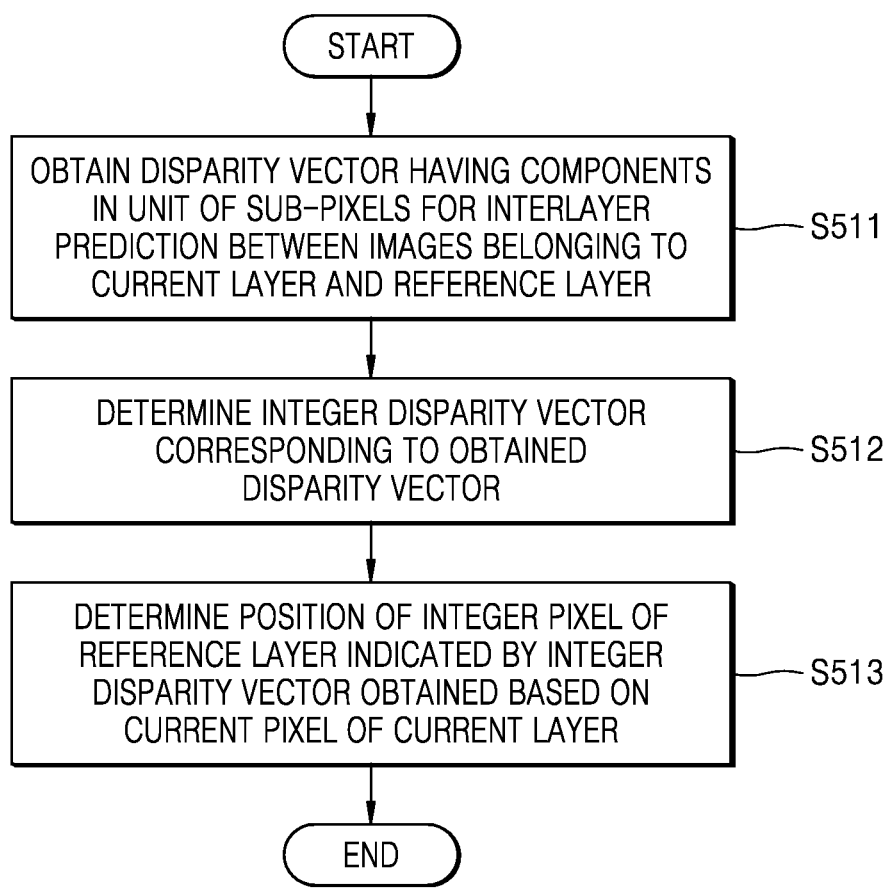
FIG. 5A is a flowchart for describing a method of determining a position of an integer pixel by determining an integer disparity vector corresponding to a disparity vector, according to one or more embodiments.

FIG. 5A is a flowchart for describing a method of determining a position of an integer pixel by determining an integer disparity vector corresponding to a disparity vector, according to one or more embodiments.

Operation S511 corresponds to operation S411, and thus, a detailed description thereof is omitted for conciseness of the overall description.

In operation S512, the video decoding apparatus 40 may determine an integer disparity vector corresponding to the disparity vector determined in operation S511.

The integer disparity vector may have integers as components thereof. However, the video decoding apparatus 40 may have the disparity vector obtained in operation S511 with components in a unit of sub-pixels. For example, the disparity vector may have an accuracy of a fractional unit such as quarter-pel or half-pel.

Therefore, when the components of the disparity vector obtained in operation S511 are integers, the integer disparity vector corresponding to the disparity vector obtained in operation S511 may be identical to the disparity vector obtained in operation S511.

However, when the components of the disparity vector obtained in operation S511 are not integers, the integer disparity vector corresponding to the disparity vector obtained in operation S511 may not be identical to the disparity vector obtained in operation S511.

The video decoding apparatus 40 may determine an integer disparity vector corresponding to the disparity vector obtained in operation S511 when the components of the disparity vector obtained in operation S511 are not integers.

A method by which the video decoding apparatus 40 determines an integer disparity vector will be described below in detail with reference to FIGS. 5B and 5C.

In operation S513, the video decoding apparatus 40 may determine a position of an integer pixel of a reference layer indicated by the integer disparity vector obtained in operation S512 from a current pixel of a current layer.

The current pixel of the current layer may be an integer pixel. Therefore, the position of a pixel of the reference layer indicated by the integer disparity vector obtained in operation S512 from the current pixel of the current layer may be a position of an integer pixel.

The video decoding apparatus 40 may determine the position of the pixel of the reference layer indicated by the integer disparity vector obtained in operation S512 from the current pixel of the current layer. The position of the pixel of the reference layer indicated by the disparity vector may be a position of an integer pixel when the current pixel is an integer pixel.

Figure 5B:
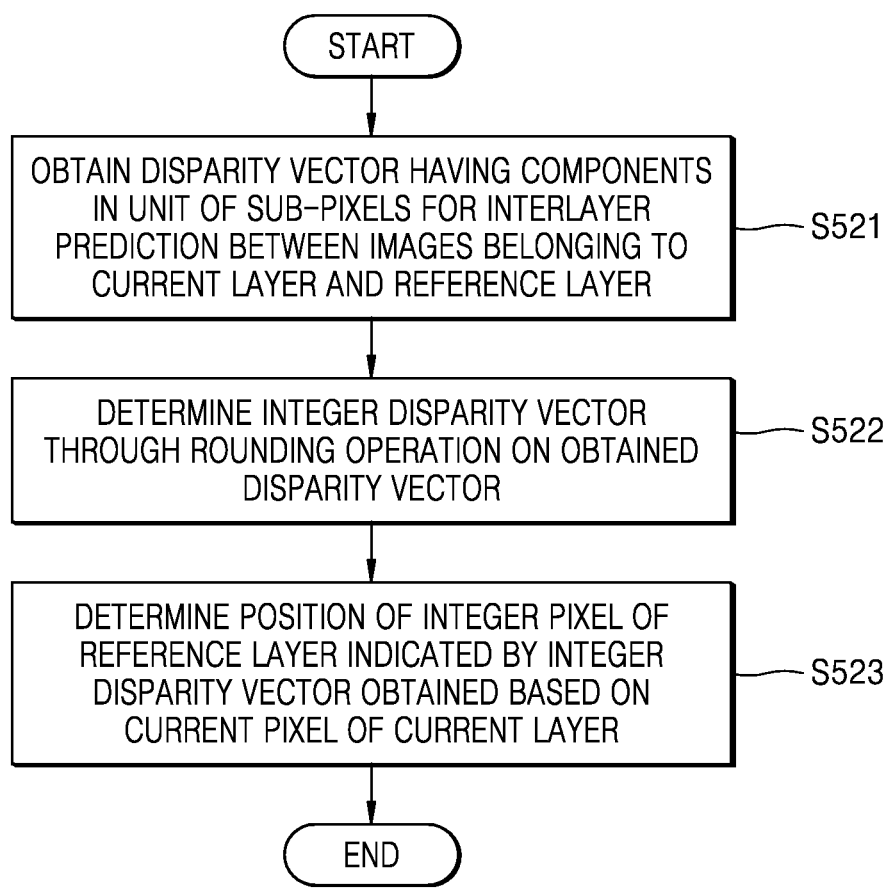
FIG. 5B is a flowchart for describing a method of determining an integer disparity vector through a rounding operation on a sub-pixel unit of x and y components of a disparity vector, according to one or more embodiments.

FIG. 5B is a flowchart for describing a method of determining an integer disparity vector through a rounding operation on a sub-pixel unit of x and y components of a disparity vector, according to one or more embodiments.

Operation S521 corresponds to operation S411, and operation S523 corresponds to operation S513, and thus, a detailed description thereof is omitted for conciseness of the overall description.

In operation S522, the video decoding apparatus 40 may determine an integer disparity vector through a rounding operation on a sub-pixel unit of x and y components of the disparity vector obtained in operation S521.

The video decoding apparatus 40 may determine a vector value corresponding to the disparity vector obtained in operation S521. Thereafter, the video decoding apparatus 40 may perform a rounding operation on a value of each component of the determined vector value. Thereafter, the video decoding apparatus 40 may determine an integer disparity vector having, as components, values for which the rounding operation has been performed.

Figure 5C:
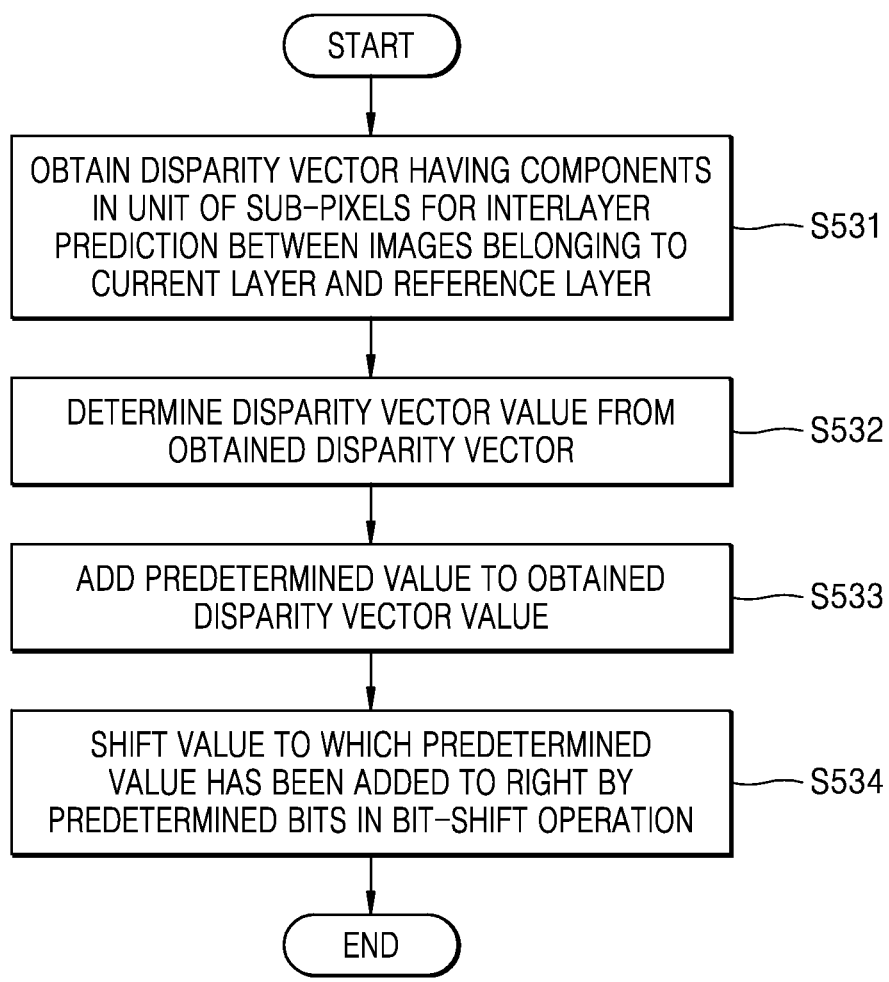
FIG. 5C is a flowchart for describing a method of determining an integer disparity vector, according to one or more embodiments.

FIG. 5C is a flowchart for describing a method of determining an integer disparity vector, according to one or more embodiments.

Operation S531 corresponds to operation S411, and thus, a detailed description thereof is omitted for conciseness of the overall description.

In operation S532, the video decoding apparatus 40 may determine a disparity vector value from the disparity vector obtained in operation S531.

Alternatively, the video decoding apparatus 40 may determine values of components of the disparity vector obtained in operation S531. The number of components of the disparity vector obtained in operation S531 may be 2 or more.

In operation S533, the video decoding apparatus 40 may add a predetermined value to the disparity vector value obtained in operation S532.

For example, the video decoding apparatus 40 may add 1 to the disparity vector value obtained in operation S532. As another example, the video decoding apparatus 40 may add 2 to the disparity vector value obtained in operation S532.

The predetermined value to be added to the disparity vector value obtained in operation S532 may be 1 or nth power of 2 (n is an integer).

Alternatively, the predetermined value to be added to the disparity vector value obtained in operation S532 may be 1 or nth power of 2 (n is a positive integer).

The predetermined value to be added to the disparity vector value obtained in operation S532 may be related to the number of bits shifted in operation S533.

For example, when the number of bits shifted in operation S533 is k, the predetermined value to be added to the disparity vector value obtained in operation S532 may be (k−1)th power of 2. As another example, when the number of bits shifted in operation S533 is 1, the predetermined value to be added to the disparity vector value obtained in operation S532 may be 1. As another example, when the number of bits shifted in operation S533 is 2, the predetermined value to be added to the disparity vector value obtained in operation S532 may be 2. As another example, when the number of bits shifted in operation S533 is 3, the predetermined value to be added to the disparity vector value obtained in operation S532 may be 4.

As another example, when the number of bits shifted in operation S533 is k, the predetermined value to be added to the disparity vector value obtained in operation S532 may be a value obtained by adding 1 to (k−1)th power of 2.

As another example, when the number of bits shifted in operation S533 is k, the predetermined value to be added to the disparity vector value obtained in operation S532 may be a value obtained by adding 2 to (k−1)th power of 2.

In operation S534, the video decoding apparatus 40 may shift a value to which the predetermined value has been added in operation S533 to the right by predetermined bits in a bit-shift operation.

Alternatively, the video decoding apparatus 40 may shift the value to which the predetermined value has been added in operation S533 to the left by predetermined bits in a bit-shift operation.

How the video decoding apparatus 40 determines the predetermined value to be added to the disparity vector value obtained in operation S532 has been described in detail.

Figure 6A:
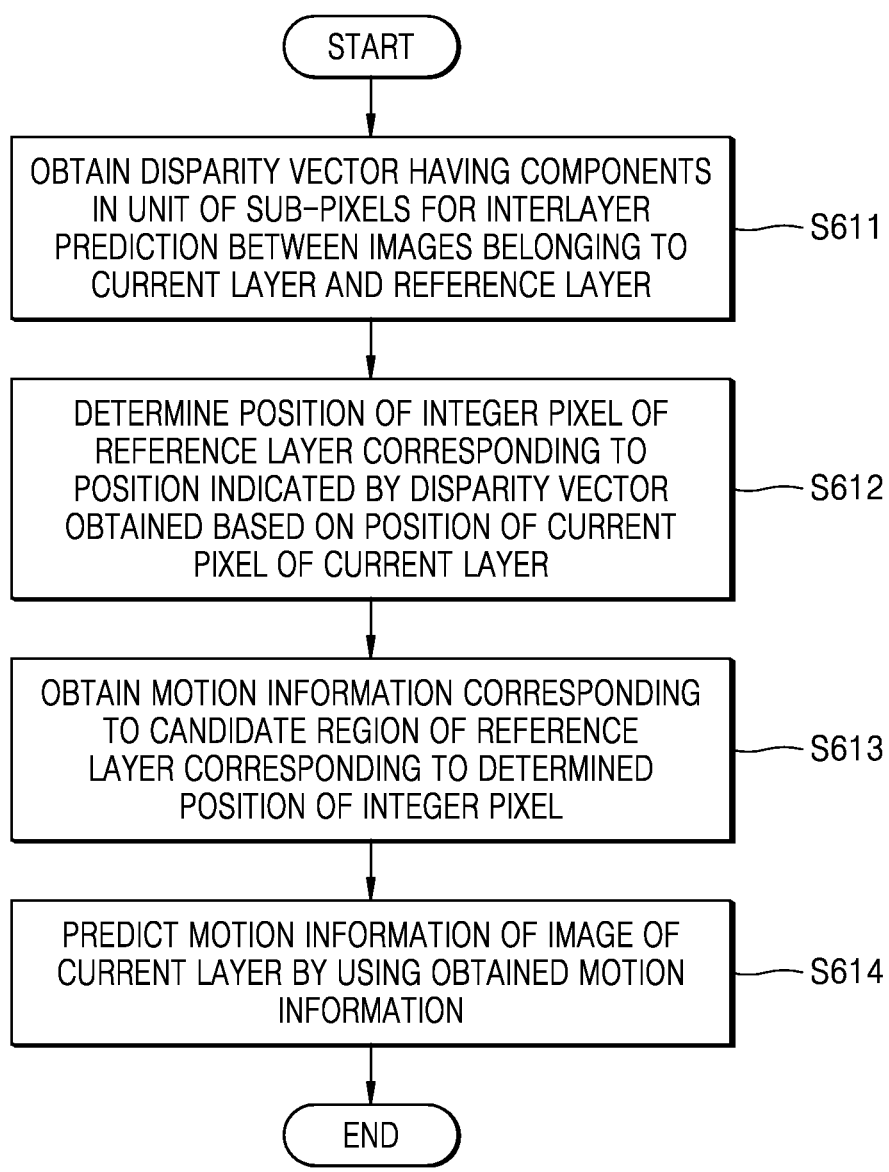
FIG. 6A is a flowchart for describing a method of predicting motion information by using a position of a determined integer pixel, according to one or more embodiments.

FIG. 6A is a flowchart for describing a method of predicting motion information by using a position of a determined integer pixel, according to one or more embodiments.

Operations S611 and S612 correspond to operations S411 and S412, respectively, and thus, a detailed description thereof is omitted for conciseness of the overall description.

In operation S613, the video decoding apparatus 40 may obtain motion information corresponding to a candidate region of a reference layer corresponding to a position of an integer pixel determined in operation S612.

The motion information may include a motion vector. The motion information, the motion vector, and motion prediction have been described above.

The video decoding apparatus 40 may determine the candidate region of the reference layer corresponding to the position of the integer pixel determined in operation S612. Thereafter, the video decoding apparatus 40 may obtain motion information corresponding to the determined candidate region of the reference layer. Alternatively, the video decoding apparatus 40 may obtain motion information allocated to the determined candidate region of the reference layer.

In operation S614, the video decoding apparatus 40 may predict motion information of an image of the current layer by using the motion information obtained in operation S613.

The video decoding apparatus 40 may encode the image of the current layer by using the motion information obtained in operation S613.

An embodiment of predicting motion information by using a position of an integer pixel determined according to one or more embodiments may be represented by pseudo codes as described below.

xRefFull=xPb+(nPbW>>1)+((mvDisp[0]+2)>>2),
yRefFull=yPb+(nPbH>>1)+((mvDisp[1]+2)>>2).

A block to be currently encoded may be referred to as a current block. The current block may be an overall or partial region of an image of a current layer. The video decoding apparatus 40 may use information related to a candidate region of the reference layer corresponding to the current block of the current layer when the video decoding apparatus 40 decodes the current block of the current layer. The current block may be a luma block.

The video decoding apparatus 40 may determine a position of an integer pixel of the reference layer corresponding to a position indicated by a disparity vector from a current pixel of the current layer.

xPb may indicate a horizontal axis position of the current pixel located at a predetermined position in the current block of the current layer.

yPb may indicate a vertical axis position of the current pixel located at the predetermined position in the current block of the current layer.

nPbW may indicate a width of the current block of the current layer.

nPbH may indicate a height of the current block of the current layer.

>> may indicate movement of bits to the right.

<< may indicate movement of bits to the left.

mvDisp may indicate a disparity vector.

((mvDisp[0]+2)>>2) may indicate a value of a horizontal axis component of an integer disparity vector.

((mvDisp[1]+2)>>2) may indicate a value of a vertical axis component of the integer disparity vector.

Therefore, an operation of obtaining the integer disparity vector from the disparity vector by adding 2 and performing a shift operation by 2 to the right is performed.

xRefFull may indicate a horizontal axis position of the integer pixel of the reference layer.

yRefFull may indicate a vertical axis position of the integer pixel of the reference layer.

In addition, through an operation such as the pseudo codes, the video decoding apparatus 40 may determine the position of the integer pixel located in an image of the reference layer based on the position of the current pixel and a value of the disparity vector. In addition, the video decoding apparatus 40 may determine the integer disparity vector by performing an addition and shift operation on the disparity vector.

Figure 6B:
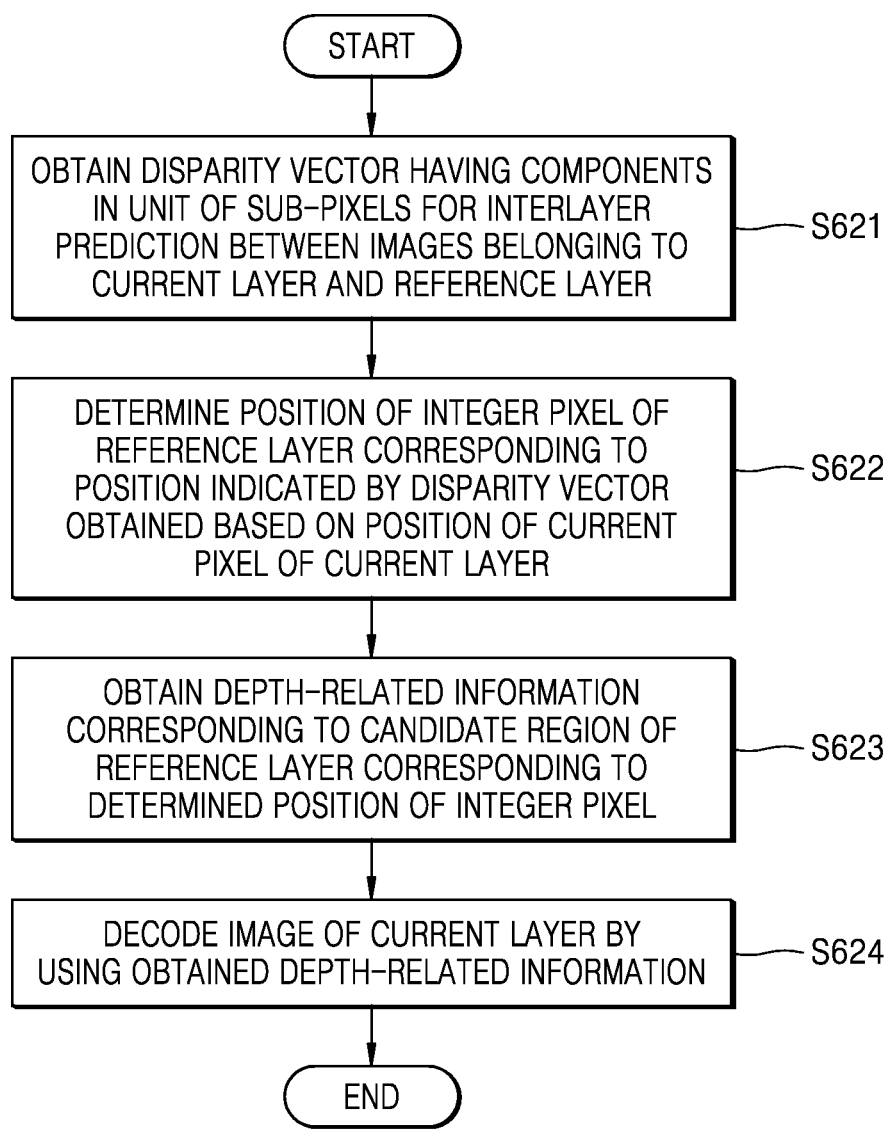
FIG. 6B is a flowchart for describing a method of determining information related to a depth by using a position of a determined integer pixel and of performing encoding, according to one or more embodiments.

FIG. 6B is a flowchart for describing a method of determining information related to a depth by using a position of a determined integer pixel and of performing encoding, according to one or more embodiments.

Operations S621 and S622 correspond to operations S411 and S412, respectively, and thus, a detailed description thereof is omitted for conciseness of the overall description.

According to one or more embodiments, the video decoding apparatus 40 may obtain depth information from a depth image and determine a disparity vector by using the obtained depth information. Thereafter, the video decoding apparatus 40 may determine a candidate region of a reference layer by using the determined disparity vector.

In operation S623, the video decoding apparatus 40 may obtain depth-related information corresponding to the candidate region of the reference layer corresponding to a position of an integer pixel determined in operation S622. The reference layer may be a depth layer.

The depth-related information may include depth information of an image.

The video decoding apparatus 40 may determine the candidate region of the reference layer corresponding to the position of the integer pixel determined in operation S622. Thereafter, the video decoding apparatus 40 may obtain depth-related information corresponding to the determined candidate region of the reference layer.

In operation S624, the video decoding apparatus 40 may decode an image of a current layer by using the depth-related information obtained in operation S613.

Alternatively, the video decoding apparatus 40 may predict depth-related information of a current block of the current layer by using the obtained depth-related information.

An embodiment of predicting depth-related information by using a position of an integer pixel determined according to one or more embodiments may be represented by pseudo codes as described below.

xTL=xP+((mvDisp[0]+2)>>2),
yTL=yP+((mvDisp[1]+2)>>2).

A block to be currently encoded may be referred to as a current block. The current block may be an overall or partial region of a color image. The video decoding apparatus 40 may use information related to a candidate region of the depth image corresponding to the current block of the color image when the video decoding apparatus 40 decodes the current block of the color image.

The video decoding apparatus 40 may determine a position of an integer pixel of the depth image corresponding to a position indicated by a disparity vector from a current pixel of the color image.

xP may indicate a horizontal axis position of the current pixel located at a predetermined position in the current block of the color image.

yP may indicate a vertical axis position of the current pixel located at the predetermined position in the current block of the color image.

>> may indicate movement of bits to the right.

<< may indicate movement of bits to the left.

mvDisp may indicate a disparity vector.

((mvDisp[0]+2)>>2) may indicate a value of a horizontal axis component of an integer disparity vector.

((mvDisp[1]+2)>>2) may indicate a value of a vertical axis component of the integer disparity vector.

Therefore, an operation of obtaining the integer disparity vector from the disparity vector by adding 2 and performing a shift operation by 2 to the right is performed.

xTL may indicate a horizontal axis position of the integer pixel located in the depth image.

yTL may indicate a vertical axis position of the integer pixel located in the depth image.

In addition, through an operation such as the pseudo codes, the video decoding apparatus 40 may determine the position of the integer pixel located in the depth image based on the position of the current pixel and a value of the disparity vector. In addition, the video decoding apparatus 40 may determine the integer disparity vector by performing an addition and shift operation on the disparity vector.

Figure 6C:
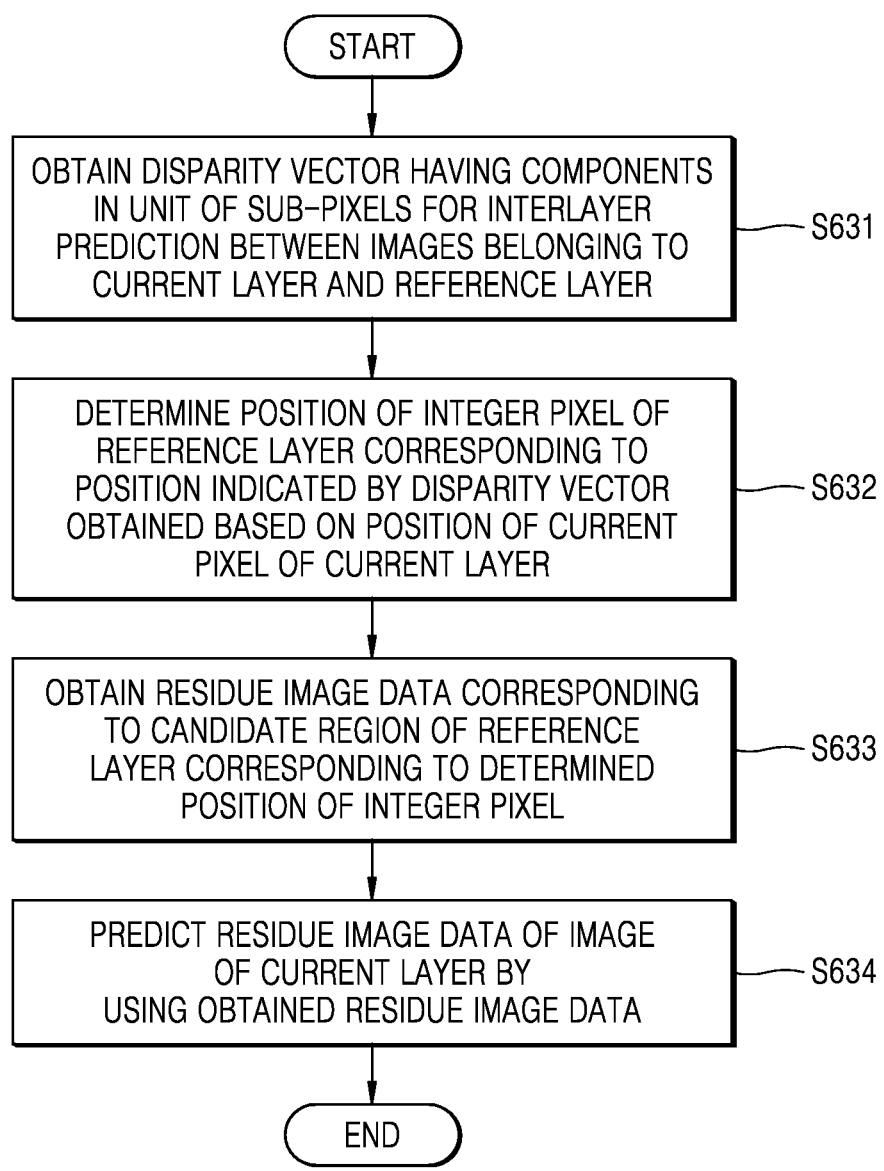
FIG. 6C is a flowchart for describing a method of predicting residue image data by using a position of a determined integer pixel, according to one or more embodiments.

FIG. 6C is a flowchart for describing a method of predicting residue image data by using a position of a determined integer pixel, according to one or more embodiments.

Operations S631 and S632 correspond to operations S411 and S412, respectively, and thus, a detailed description thereof is omitted for conciseness of the overall description.

In operation S633, the video decoding apparatus 40 may obtain residue image data corresponding to a candidate region of a reference layer corresponding to a position of an integer pixel determined in operation S632.

The video decoding apparatus 40 may determine the candidate region of the reference layer corresponding to the position of the integer pixel determined in operation S632. Thereafter, the video decoding apparatus 40 may obtain residue image data corresponding to the determined candidate region of the reference layer.

In operation S634, the video decoding apparatus 40 may predict residue image data of an image of a current layer by using the residue image data obtained in operation S633.

Alternatively, the video decoding apparatus 40 may decode the image of the current layer by using the obtained motion information.

An embodiment of determining a position of the candidate region of the reference region to predict residue image data by using a position of an integer pixel determined according to one or more embodiments may be represented by pseudo codes as described below.

xRef=Clip3(0, PicWidthInSamplesL−1, xP+(nPSW>>1)+((mvDisp[0]+2)>>2))
yRef=Clip3(0, PicHeightInSamplesL−1, yP+(nPSH>>1)+((mvDisp[1]+2)>>2)).

A block to be currently encoded may be referred to as a current block. The current block may be an overall or partial region of the image of the current layer. The video decoding apparatus 40 may use information related to a candidate region of the reference layer corresponding to the current block of the current layer when the video decoding apparatus 40 decodes the current block of the current layer.

The video decoding apparatus 40 may determine a position of an integer pixel of the reference layer corresponding to a position indicated by a disparity vector from a current pixel of the current layer.

xP may indicate a horizontal axis position of the current pixel located at a predetermined position in the current block of the color image.

yP may indicate a vertical axis position of the current pixel located at the predetermined position in the current block of the color image.

>> may indicate movement of bits to the right.

<< may indicate movement of bits to the left.

mvDisp may indicate a disparity vector.

((mvDisp[0]+2)>>2) may indicate a value of a horizontal axis component of an integer disparity vector.

((mvDisp[1]+2)>>2) may indicate a value of a vertical axis component of the integer disparity vector.

Therefore, it may be determined that an operation of obtaining the integer disparity vector from the disparity vector by adding 2 and performing a shift operation by 2 to the right is performed.

xRef may indicate a horizontal axis position of an integer pixel of the reference layer.

yRef may indicate a vertical axis position of the integer pixel of the reference layer.

The video decoding apparatus 40 may search for a position of the reference layer corresponding to the current block of the current layer based on the disparity vector. The video decoding apparatus 40 may use the integer disparity vector when the video decoding apparatus 40 searches for the position of the reference layer corresponding to the current block of the current layer. The integer disparity vector may be determined through an addition and shift operation on the disparity vector. The video decoding apparatus 40 may obtain residue image data from a candidate region corresponding to the position of the reference layer corresponding to the current block of the current layer. The video decoding apparatus 40 may predict residue image data of the current block by using the obtained residue image data.

Figure 7A:
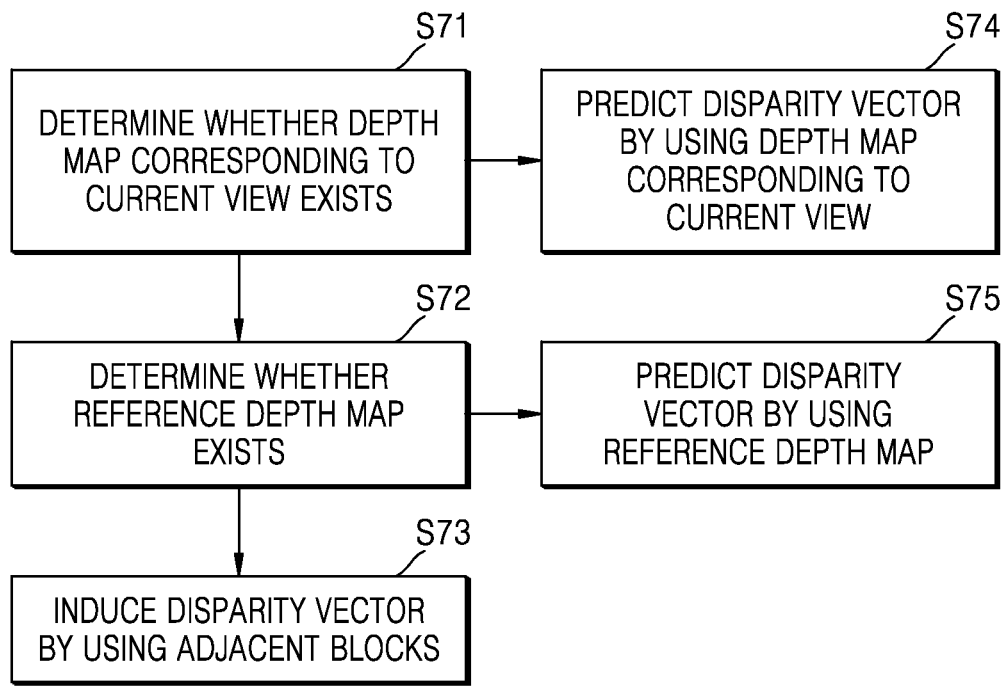
FIG. 7A is a block diagram for describing a method by which a video decoding apparatus 40 predicts a disparity vector, according to one or more embodiments.

FIG. 7A is a block diagram for describing a method by which the video decoding apparatus 40 predicts a disparity vector, according to one or more embodiments.

In operation S71, according to an embodiment, the video decoding apparatus 40 determines whether a depth map corresponding to a current view exists.

In operation S74, if the depth map corresponding to the current view exists, the video decoding apparatus 40 according to an embodiment obtains a depth value of a position corresponding to a current block from a depth map of a reference view corresponding to the current view and transforms the obtained depth value to a disparity vector. The video decoding apparatus 40 determines the transformed disparity vector as a disparity vector corresponding to the current view.

In operation S75, if the depth map corresponding to the current view exists, the video decoding apparatus 40 searches for a disparity vector according to a predetermined scan order (e.g., z-scan or raster scan) from adjacent blocks in a temporal or spatial direction and predicts a disparity vector corresponding to the current view by using the retrieved disparity vector.

In operation S75, if the disparity vector is predicted, the video decoding apparatus 40 obtains a depth value of a position corresponding to the current block from the depth map by using the disparity vector predicted from the depth map of the reference view corresponding to the current view and transforms the obtained depth value to a disparity vector. The video decoding apparatus 40 determines the transformed disparity vector as a disparity vector corresponding to the current view.

If no disparity vector is retrieved from the adjacent blocks, the disparity vector is set to (0, 0).

In operation S73, if the depth map corresponding to the current view does not exist, the video decoding apparatus 40 searches for a disparity vector according to a predetermined scan order (e.g., z-scan or raster scan) from adjacent blocks in a temporal or spatial direction and predicts a disparity vector corresponding to the current view by using the retrieved disparity vector.

According to the method of predicting a disparity vector, which has been described with reference to FIG. 7A, a case where a depth map corresponding to a current view does not exist although the depth map can be used is dealt with as well as a case where no depth map is used. In this case, since a considerably complicated operation is necessary, a method of simply detecting a disparity vector is needed.

Therefore, according to an embodiment, the video decoding apparatus 40 may induce a disparity vector by simply using only a depth map existing in a reference view without using information about adjacent blocks if the depth map of the reference view exists. Accordingly, an operation of inducing a disparity vector may have low complexity and improved coding efficiency.

Figure 7B:
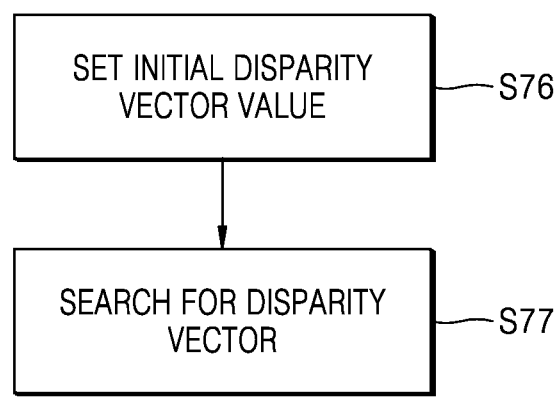
FIG. 7B is a block diagram for describing a method by which the video decoding apparatus 40 predicts a disparity vector by using a depth map of a reference view, according to one or more embodiments.

FIG. 7B is a block diagram for describing a method by which the video decoding apparatus 40 predicts a disparity vector by using a depth map of a reference view, according to one or more embodiments.

In operation S76, if the depth map of the reference view exists, the video decoding apparatus 40 may set an initial value to (0, 0) as an example corresponding to a current view.

As another example, the video decoding apparatus 40 may use, as the initial value, a value of a disparity vector converted from an intermediate value (for example, when BitDepth indicates a bit depth of a current depth map, a value of (1<<(BitDepth−1))) of a bit depth of the depth map of the reference view.

As another example, the video decoding apparatus 40 may use an initial value transmitted by being included in a header of a bitstream.

As another example, the video decoding apparatus 40 may calculate a global disparity vector and use the calculated global disparity vector as an initial value.

In operation S76, according to an embodiment, the video decoding apparatus 40 may set a representative depth value in a depth region of the reference view corresponding to a current block.

For example, the video decoding apparatus 40 may compare values of all pixels in a region of a depth map corresponding to the current block and set a depth value having a maximum value as the representative depth value. As another example, if a weight of the maximum value is less than M, a next maximum value may be selected as the representative depth value.

In operation S77, according to an embodiment, the video decoding apparatus 40 may determine a disparity vector by using the representative depth value in the depth region corresponding to the current block.

For example, the video decoding apparatus 40 may obtain a representative depth value in a region of a depth map corresponding to a position set by the initial value, converts the representative depth value to a disparity vector, and determine a disparity vector of the current block.

Figure 7C:
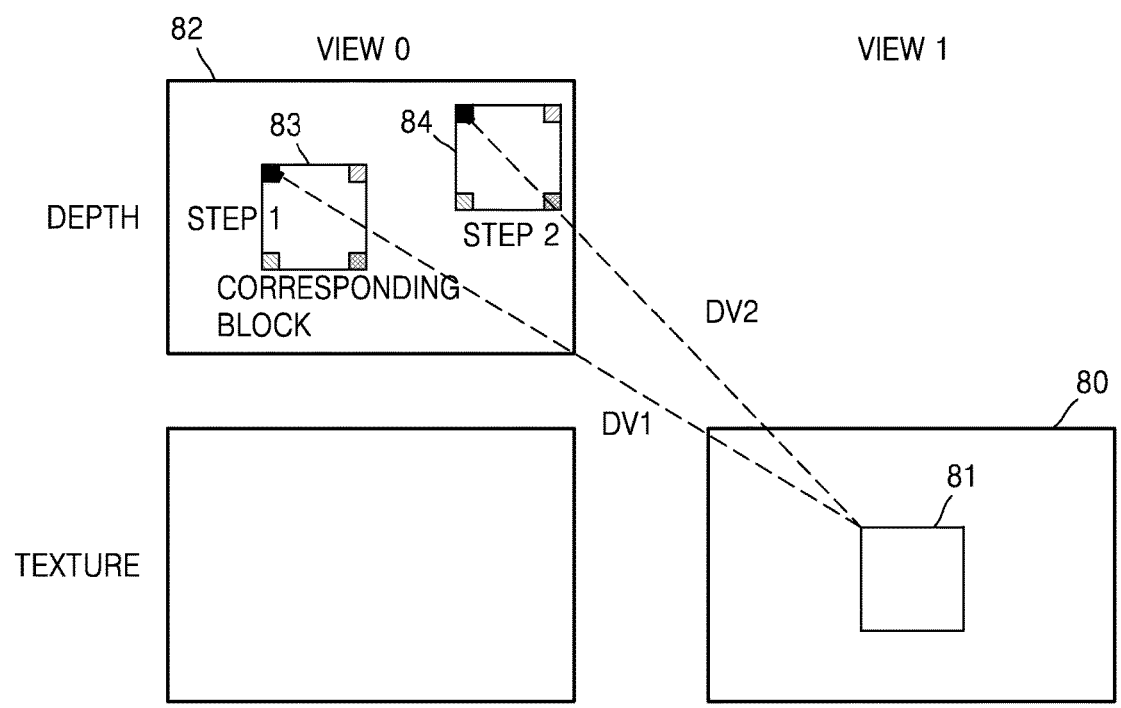
FIG. 7C is a block diagram for describing a method by which the video decoding apparatus 40 predicts a disparity vector by using a reference depth map, according to one or more embodiments.

As another example, FIG. 7C is a block diagram for describing a method by which the video decoding apparatus 40 predicts a disparity vector by using a reference depth map, according to one or more embodiments.

Referring to FIG. 7C, the video decoding apparatus 40 may obtain a representative depth value in a depth map region 83 corresponding to a position of a disparity vector DV1 set by an initial value and convert the representative depth value to a first disparity vector DV2.

The video decoding apparatus 40 may obtain a representative depth value again based on a depth map region 84 indicated by the first disparity vector DV2 and convert the obtained representative depth value to a second disparity vector. Therefore, the video decoding apparatus 40 may determine the second disparity vector as a disparity vector of a current block.

As described above, the video decoding apparatus 40 according to an embodiment may induce a disparity vector by simply using only a depth map existing in a reference view without using information about adjacent blocks when the depth map of the reference view does not exist. Accordingly, an operation of inducing a disparity vector may have low complexity and improved coding efficiency.

Figure 8:
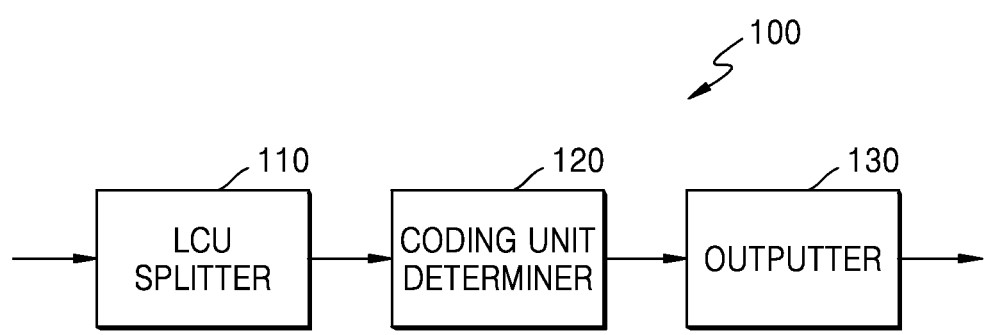
FIG. 8 is a block diagram of a video encoding apparatus based on coding units according to a tree structure, according to an embodiment.

FIG. 8 is a block diagram of a video encoding apparatus 100 based on coding units according to a tree structure, according to an embodiment.

The video encoding apparatus 100 involving video prediction based on coding units according to a tree structure includes a coding unit determiner 120 and an outputter 130. Hereinafter, for convenience of description, the video encoding apparatus 100 involving video prediction based on coding units according to a tree structure according to an embodiment is referred to as "the video encoding apparatus 100".

The coding unit determiner 120 may split a current picture based on a LCU that is a coding unit having a maximum size for a current picture of an image. If the current picture is larger than the LCU, image data of the current picture may be split into the at least one LCU. The LCU according to one or more embodiments may be a data unit having a size of 32×32, 64×64, 128×128, 256×256, etc., wherein a shape of the data unit is a square having a width and length in squares of 2.

A coding unit according to one or more embodiments may be characterized by a maximum size and a depth. The depth denotes the number of times the coding unit is spatially split from the LCU, and as the depth deepens, deeper coding units according to depths may be split from the LCU to a smallest coding unit (SCU). A depth of the LCU is an uppermost depth and a depth of the SCU is a lowermost depth. Since a size of a coding unit corresponding to each depth decreases as the depth of the LCU deepens, a coding unit corresponding to an upper depth may include a plurality of coding units corresponding to lower depths.

As described above, the image data of the current picture is split into the LCUs according to a maximum size of the coding unit, and each of the LCUs may include deeper coding units that are split according to depths. Since the LCU according to one or more embodiments is split according to depths, the image data of the space domain included in the LCU may be hierarchically classified according to depths.

A maximum depth and a maximum size of a coding unit, which limit the total number of times a height and a width of the LCU are hierarchically split, may be predetermined.

The coding unit determiner 120 encodes at least one split region obtained by splitting a region of the LCU according to depths, and determines a depth to output a finally encoded image data according to the at least one split region. In other words, the coding unit determiner 120 determines a final depth by encoding the image data in the deeper coding units according to depths, according to the LCU of the current picture, and selecting a depth having the least encoding error. The determined final depth and the encoded image data according to the determined depth are output to the outputter 130.

The image data in the LCU is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one final depth may be selected for each LCU.

The size of the LCU is split as a coding unit is hierarchically split according to depths, and as the number of coding units increases. Also, even if coding units correspond to the same depth in one LCU, it is determined whether to split each of the coding units corresponding to the same depth to a lower depth by measuring an encoding error of the image data of the each coding unit, separately. Accordingly, even when image data is included in one LCU, the encoding errors may differ according to regions in the one LCU, and thus the final depths may differ according to regions in the image data. Thus, one or more final depths may be determined in one LCU, and the image data of the LCU may be divided according to coding units of at least one final depth.

Accordingly, the coding unit determiner 120 may determine coding units having a tree structure included in the LCU. The 'coding units having a tree structure' according to one or more embodiments include coding units corresponding to a depth determined to be the final depth, from among all deeper coding units included in the LCU. A coding unit of a final depth may be hierarchically determined according to depths in the same region of the LCU, and may be independently determined in different regions. Similarly, a final depth in a current region may be independently determined from a final depth in another region.

A maximum depth according to one or more embodiments is an index related to the number of splitting times from a LCU to an SCU. A first maximum depth according to one or more embodiments may denote the total number of splitting times from the LCU to the SCU. A second maximum depth according to one or more embodiments may denote the total number of depth levels from the LCU to the SCU. For example, when a depth of the LCU is 0, a depth of a coding unit, in which the LCU is split once, may be set to 1, and a depth of a coding unit, in which the LCU is split twice, may be set to 2. Here, if the SCU is a coding unit in which the LCU is split four times, 5 depth levels of depths 0, 1, 2, 3, and 4 exist, and thus the first maximum depth may be set to 4, and the second maximum depth may be set to 5.

Prediction encoding and transformation may be performed according to the LCU. The prediction encoding and the transformation are also performed based on the deeper coding units according to a depth equal to or depths less than the maximum depth, according to the LCU.

Since the number of deeper coding units increases whenever the LCU is split according to depths, encoding, including the prediction encoding and the transformation, is performed on all of the deeper coding units generated as the depth deepens. For convenience of description, the prediction encoding and the transformation will now be described based on a coding unit of a current depth, in a LCU.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the LCU, the prediction encoding may be performed based on a coding unit corresponding to a final depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residues in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Splitting information according to coding units corresponding to a depth requires not only information about the depth, but also about information related to prediction encoding and transformation. Accordingly, the coding unit determiner 120 not only determines a depth having a least encoding error, but also determines a partition mode in a prediction unit, a prediction mode according to prediction units, and a size of a transformation unit for transformation.

Coding units according to a tree structure in a LCU and methods of determining a prediction unit/partition, and a transformation unit, according to one or more embodiments, will be described in detail below with reference to FIGS. 9 through 19.

The coding unit determiner 120 may measure an encoding error of deeper coding units according to depths by using Rate-Distortion Optimization based on Lagrangian multipliers.

The outputter 130 outputs the image data of the LCU, which is encoded based on the at least one depth determined by the coding unit determiner 120, and information about the splitting information according to the depth, in bitstreams.

The encoded image data may be obtained by encoding residues of an image.

The splitting information according to depth may include information about the depth, about the partition mode in the prediction unit, the prediction mode, and the size of the transformation unit.

The information about the final depth may be defined by using splitting information according to depths, which indicates whether encoding is performed on coding units of a lower depth instead of a current depth. If the current depth of the current coding unit is the depth, image data in the current coding unit is encoded and output, and thus the splitting information may be defined not to split the current coding unit to a lower depth. Alternatively, if the current depth of the current coding unit is not the depth, the encoding is performed on the coding unit of the lower depth, and thus the splitting information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one LCU, and at least one piece of splitting information is determined for a coding unit of a depth, at least one piece of splitting information may be determined for one LCU. Also, a depth of the image data of the LCU may be different according to locations since the image data is hierarchically split according to depths, and thus depth and splitting information may be set for the image data.

Accordingly, the outputter 130 may assign corresponding encoding information of a corresponding depth and encoding mode to at least one of the coding unit, the prediction unit, and a minimum unit included in the LCU.

The minimum unit according to one or more embodiments is a square data unit obtained by splitting the SCU constituting the lowermost depth by 4. Alternatively, the minimum unit according to an embodiment may be a maximum square data unit that may be included in all of the coding units, prediction units, partition units, and transformation units included in the LCU.

For example, the encoding information output by the outputter 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The outputter 130 may encode and output reference information, prediction information, slice type information, and the like related to prediction.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each LCU, based on the size of the LCU and the maximum depth determined considering characteristics of the current picture. Also, since encoding may be performed on each LCU by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The video encoding apparatus 40 described above with reference to FIG. 4 may include the video encoding apparatuses 100 corresponding to the number of layers to encode single-layer images for each layer of a multi-layer video.

When the video encoding apparatus 100 encodes images of a reference layer, the coding unit determiner 120 may determine a prediction unit for prediction between images for each coding unit according to a tree structure for each LCU and perform prediction between images for each prediction unit.

Even when the video encoding apparatus 100 encodes images of a current layer, the coding unit determiner 120 may determine a coding unit and a prediction unit according to a tree structure for each LCU and perform inter prediction for each prediction unit.

The video encoding apparatus 100 may encode a brightness difference between an image of a reference layer and an image of a current layer to compensate for the brightness difference. However, the encoding of the brightness difference may be determined according to am encoding mode of a coding unit. For example, brightness compensation may be performed only for prediction units having a size of 2N×2N.

Figure 9:
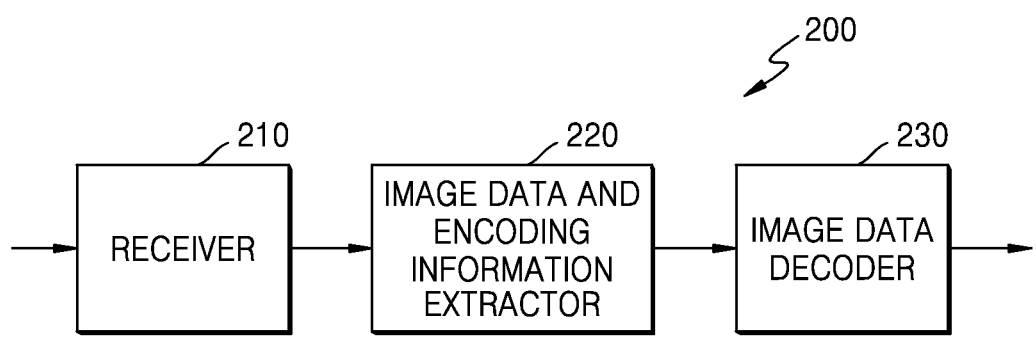
FIG. 9 is a block diagram of a video decoding apparatus based on coding units according to a tree structure, according to an embodiment.

FIG. 9 is a block diagram of a video decoding apparatus 200 based on coding units having a tree structure, according to one or more embodiments.

The video decoding apparatus 200 that involves video prediction based on coding units having a tree structure includes a receiver 210, an image data and encoding information extractor 220, and an image data decoder 230. Hereinafter, for convenience of description, the video decoding apparatus 200 involving video prediction based on coding units according to a tree structure according to an embodiment is referred to as "the video decoding apparatus 200".

Definitions of various terms, such as a coding unit, a depth, a prediction unit, a transformation unit, and information about various encoding modes, for decoding operations of the video decoding apparatus 200 are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each LCU, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and splitting information for the coding units having a tree structure according to each LCU, from the parsed bitstream. The extracted final depth and splitting information are output to the image data decoder 230. In other words, the image data in a bit stream is split into the LCU so that the image data decoder 230 decodes the image data for each LCU.

The depth and the splitting information according to the LCU may be set for at least one piece of information about the depth, and splitting information according to the depth may include information about a partition mode of a corresponding coding unit corresponding to the depth, information about a prediction mode, and splitting information of a transformation unit. Also, splitting information according to depths may be extracted as the information about a depth.

The depth and the splitting information according to each LCU extracted by the image data and encoding information extractor 220 is a depth and splitting information determined to generate a minimum encoding error when an encoder, such as the video encoding apparatus 100, repeatedly performs encoding for each deeper coding unit according to depths according to each LCU. Accordingly, the video decoding apparatus 200 may reconstruct an image by decoding the image data according to a depth and an encoding mode that generates the minimum encoding error.

Since the depth and the encoding information according to the encoding mode may be assigned to a predetermined data unit from among a corresponding coding unit, a prediction unit, and a minimum unit, the image data and encoding information extractor 220 may extract the depth and the splitting information according to the predetermined data units. If a depth and splitting information of a corresponding LCU are recorded according to predetermined data units, the predetermined data units to which the same depth and splitting information are assigned may be inferred to be the data units included in the same LCU.

The image data decoder 230 reconstructs the current picture by decoding the image data in each LCU based on the depth and the splitting information according to the LCUs. In other words, the image data decoder 230 may decode the encoded image data based on the extracted information about the partition mode, the prediction mode, and the transformation unit for each coding unit from among the coding units having the tree structure included in each LCU. A decoding process may include a prediction including intra prediction and motion compensation, and an inverse transformation.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each LCU. Via the inverse transformation, a pixel value of the space domain of the coding unit may be reconstructed.

The image data decoder 230 may determine a depth of a current LCU by using splitting information according to depths. If the splitting information indicates that image data is no longer split in the current depth, the current depth is the depth. Accordingly, the image data decoder 230 may decode encoded data in the current LCU by using the information about the partition mode of the prediction unit, the information about the prediction mode, and the size information of the transformation unit for each coding unit corresponding to the current depth.

In other words, data units containing the encoding information including the same splitting information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The video decoding apparatus 10 described above with reference to FIG. 10 may include the video decoding apparatuses 200 corresponding to the number of points of view to reconstruct images of a reference layer and images of a current layer by decoding a received reference layer image stream and a received current layer image stream.

When a reference layer image stream is received, the image data decoder 230 of the video decoding apparatus 200 may split samples of the images of the reference layer, which are extracted by the image data and encoding information extractor 220 from the reference layer image stream, into coding units according to a tree structure of an LCU. The image data decoder 230 may reconstruct the images of the reference layer by performing motion compensation according to prediction units for prediction between images for each coding unit according to a tree structure of the samples of the images of the reference layer.

When a current layer image stream is received, the image data decoder 230 of the video decoding apparatus 200 may split samples of the images of the current layer, which are extracted by the image data and encoding information extractor 220 from the current layer image stream, into coding units according to a tree structure of an LCU. The image data decoder 230 may reconstruct the images of the current layer by performing motion compensation according to prediction units for prediction between images for each coding unit of the samples of the images of the reference layer.

The image data and encoding information extractor 220 may obtain information related to a brightness error from a bitstream to compensate for a brightness difference between an image of a reference layer and an image of a current layer. However, the brightness compensation may be performed according to an encoding mode of a coding unit.

As a result, the video decoding apparatus 200 may obtain information about a coding unit of which a minimum encoding error has occurred by recursively performing encoding for each LCU in an encoding operation and use the obtained information to decode a current picture. In other words, decoding encoded image data of coding units according to a tree structure determined in an optimal coding unit for each LCU is possible.

Therefore, even a high-resolution image or an image having an excessive data amount may be reconstructed by efficiently decoding image data according a coding unit size and an encoding mode adaptively determined according to a characteristic of the image.

Figure 10:
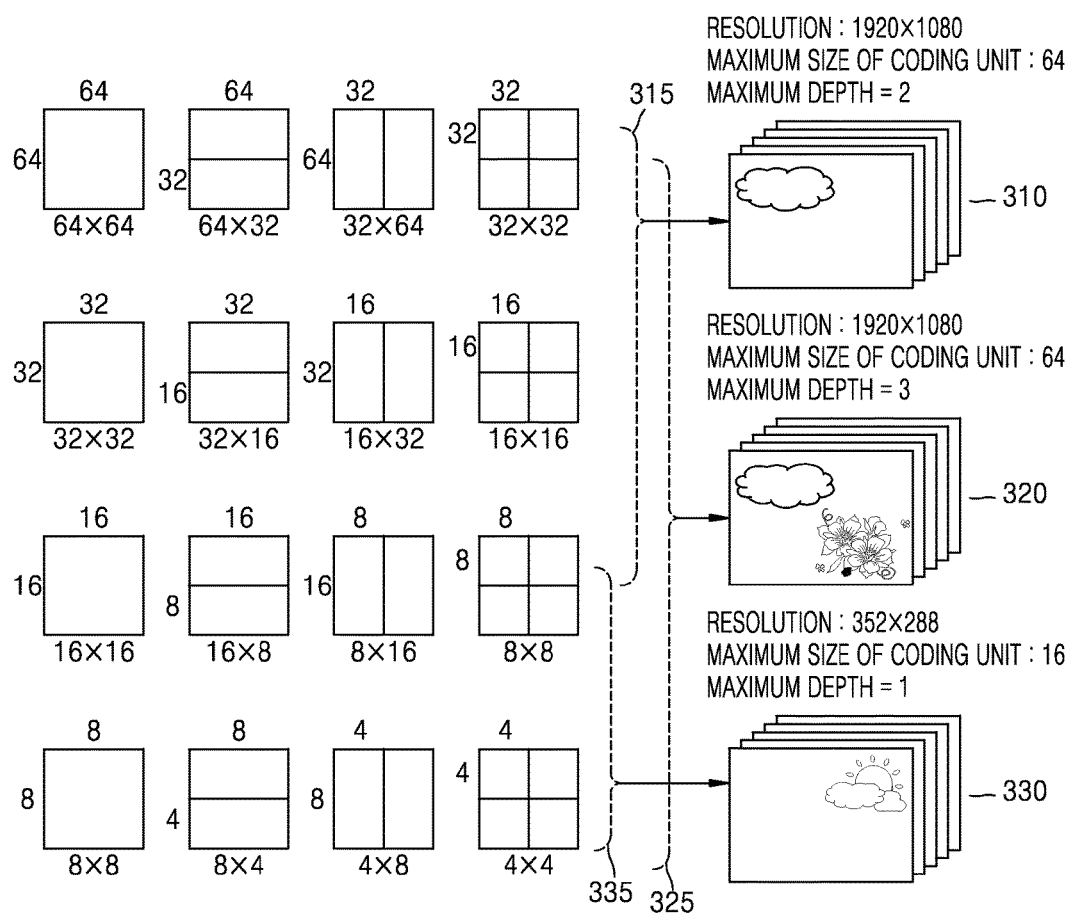
FIG. 10 is a diagram for describing a concept of coding units according to an embodiment of the present invention.

FIG. 10 is a diagram for describing a concept of coding units according to one or more embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a LCU to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a LCU having a long axis size of 64, and coding units having long axis sizes of 32 and 16 since depths are deepened to two layers by splitting the LCU twice. Since the maximum depth of the video data 330 is 1, coding units 335 of the video data 330 may include a LCU having a long axis size of 16, and coding units having a long axis size of 8 since depths are deepened to one layer by splitting the LCU once.

Since the maximum depth of the video data 320 is 3, coding units 325 of the video data 320 may include a LCU having a long axis size of 64, and coding units having long axis sizes of 32, 16, and 8 since the depths are deepened to 3 layers by splitting the LCU three times. As a depth deepens, detailed information may be precisely expressed.

Figure 11:
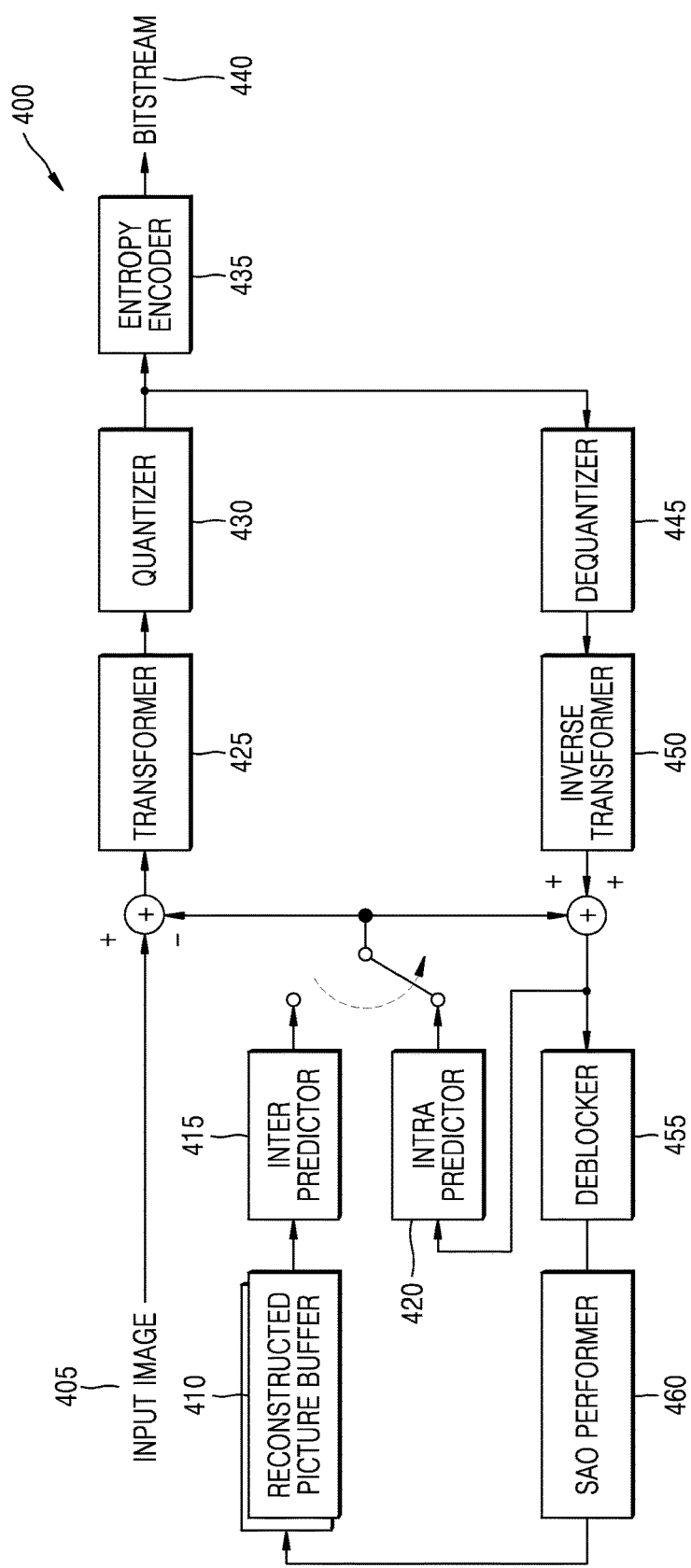
FIG. 11 is a block diagram of an image encoder based on coding units, according to an embodiment of the present invention.

FIG. 11 is a block diagram of an image encoder 400 based on coding units, according to one or more embodiments.

The image encoder 400 performs operations necessary for encoding image data in the coding unit determiner 120 of the video encoding apparatus 100. In other words, an intra predictor 420 performs intra prediction on coding units in an intra mode according to prediction units, from among a current frame 405, and an inter predictor 415 performs inter prediction on coding units in an inter mode by using a current image 405 and a reference image obtained from a reconstructed picture buffer 410 according to prediction units. The current image 405 may be split into LCUs and then the LCUs may be sequentially encoded. In this regard, the LCUs that are to be split into coding units having a tree structure may be encoded.

Residue image data is generated by removing prediction data regarding coding units of each mode that is output from the intra predictor 420 or the inter predictor 415 from data regarding encoded coding units of the current image 405, and is output as a quantized transformation coefficient according to transformation units through a transformer 425 and a quantizer 430. The quantized transformation coefficient is reconstructed as the residue image data in a space domain through a dequantizer 445 and an inverse transformer 450. The reconstructed residue image data in the space domain is added to prediction data for coding units of each mode that is output from the intra predictor 420 or the inter predictor and thus is reconstructed as data in a space domain for coding units of the current image 405. The reconstructed data in the space domain is generated as reconstructed images through a de-blocker 455 and a sample adaptive offset (SAO) performer 460 and the reconstructed images are stored in the reconstructed picture buffer 410. The reconstructed images stored in the reconstructed picture buffer 410 may be used as reference images for inter prediction of another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the dequantizer 445, the inverse transformer 450, the de-blocker 455, and the SAO performer 460, perform operations based on each coding unit among coding units having a tree structure according to each LCU.

In particular, the intra predictor 410, the motion estimator 420, and the motion compensator 425 determines partitions and a prediction mode of each coding unit from among the coding units having a tree structure while considering the maximum size and the maximum depth of a current LCU, and the transformer 430 determines the size of the transformation unit in each coding unit from among the coding units having a tree structure.

Specifically, the intra predictor 420 and the inter predictor 415 may determine a partition mode and a prediction mode of each coding unit among the coding units having a tree structure in consideration of a maximum size and a maximum depth of a current LCU, and the transformer 425 may determine whether to split a transformation unit having a quad tree structure in each coding unit among the coding units having a tree structure.

Figure 12:
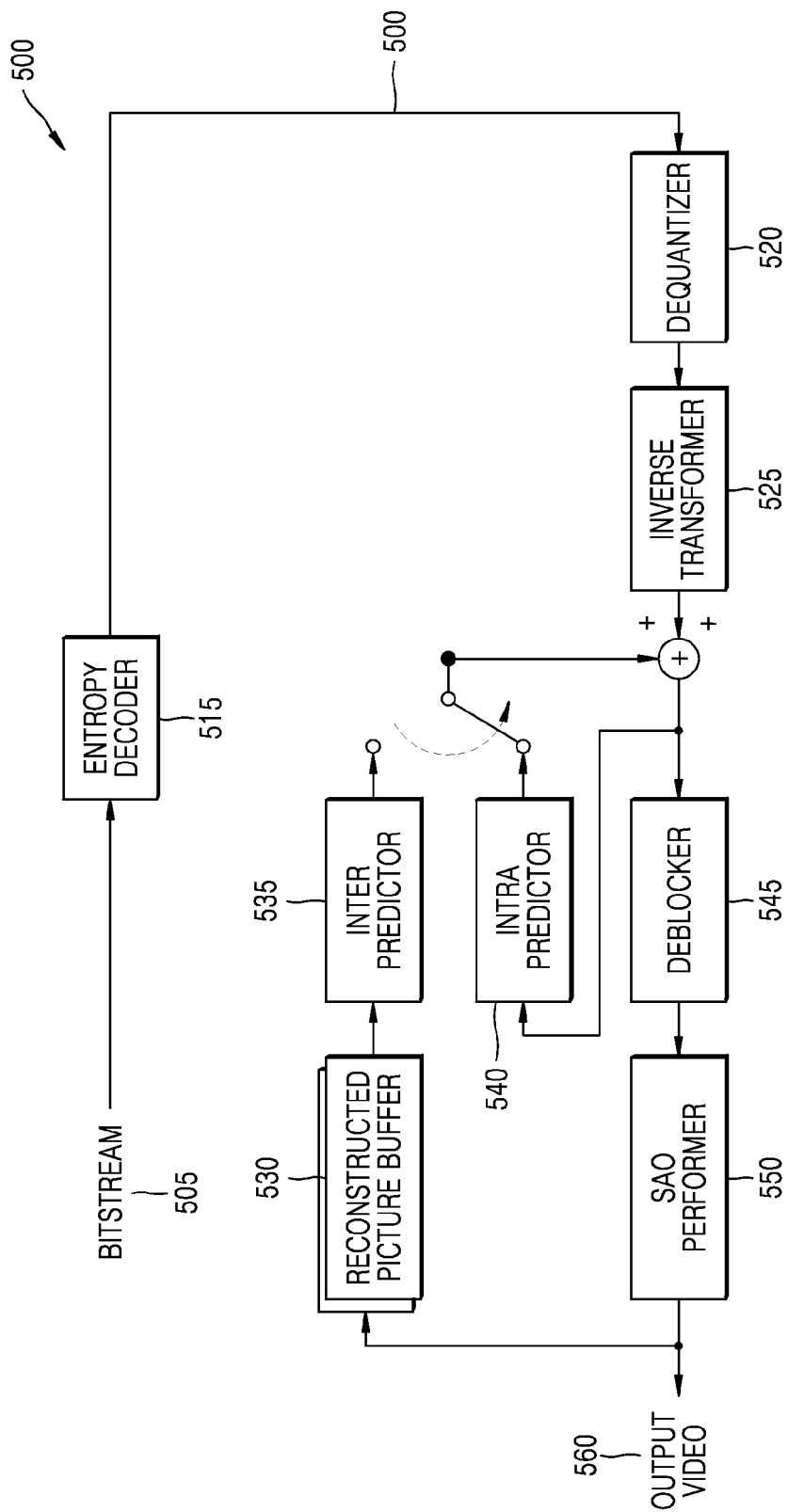
FIG. 12 is a block diagram of an image decoder based on coding units, according to an embodiment of the present invention.

FIG. 12 is a block diagram of an image decoder 500 based on coding units, according to one or more embodiments.

An entropy decoder 515 parses encoded image data to be decoded and information about encoding required for decoding from a bitstream 505. The encoded image data is a quantized transformation coefficient from which residue image data is reconstructed by a dequantizer 520 and an inverse transformer 525.

An intra predictor 540 performs intra prediction on coding units in an intra mode according to each prediction unit. An inter predictor 535 performs inter prediction on coding units in an inter mode from among the current image 405 for each prediction unit by using a reference image obtained from a reconstructed picture buffer 530.

Prediction data and residue image data regarding coding units of each mode, which passed through the intra predictor 540 or the inter predictor 535, are summed, and thus data in a space domain regarding coding units of the current image 405 may be reconstructed, and the reconstructed data in the space domain may be output as a reconstructed image 560 through a de-blocker 545 and an SAO performer 550. Reconstructed images stored in the reconstructed picture buffer 530 may be output as reference images.

In order to decode the image data in the image data decoder 230 of the video decoding apparatus 200, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the dequantizer 520, the inverse transformer 525, the inter predictor 535, the de-blocker 545, and the SAO performer 550 may perform operations based on coding units having a tree structure for each LCU.

In particular, the intra predictor 540 and the inter predictor 535 may determine a partition mode and a prediction mode for each of the coding units having a tree structure, and the inverse transformer 525 may determine whether to split a transformation unit having a quad tree structure for each of the coding units.

The encoding operation of FIG. 10 and the decoding operation of FIG. 11 are respectively described in detail about a video stream encoding operation and a video stream decoding operation in a single layer. Therefore, if the encoder 12 of FIG. 4 encodes a video stream of two or more layers, the image encoder 400 may be included for each layer. Similarly, if the decoder 26 of FIG. 10 decodes a video stream of two or more layers, the image decoder 500 may be included for each layer.

Figure 13:
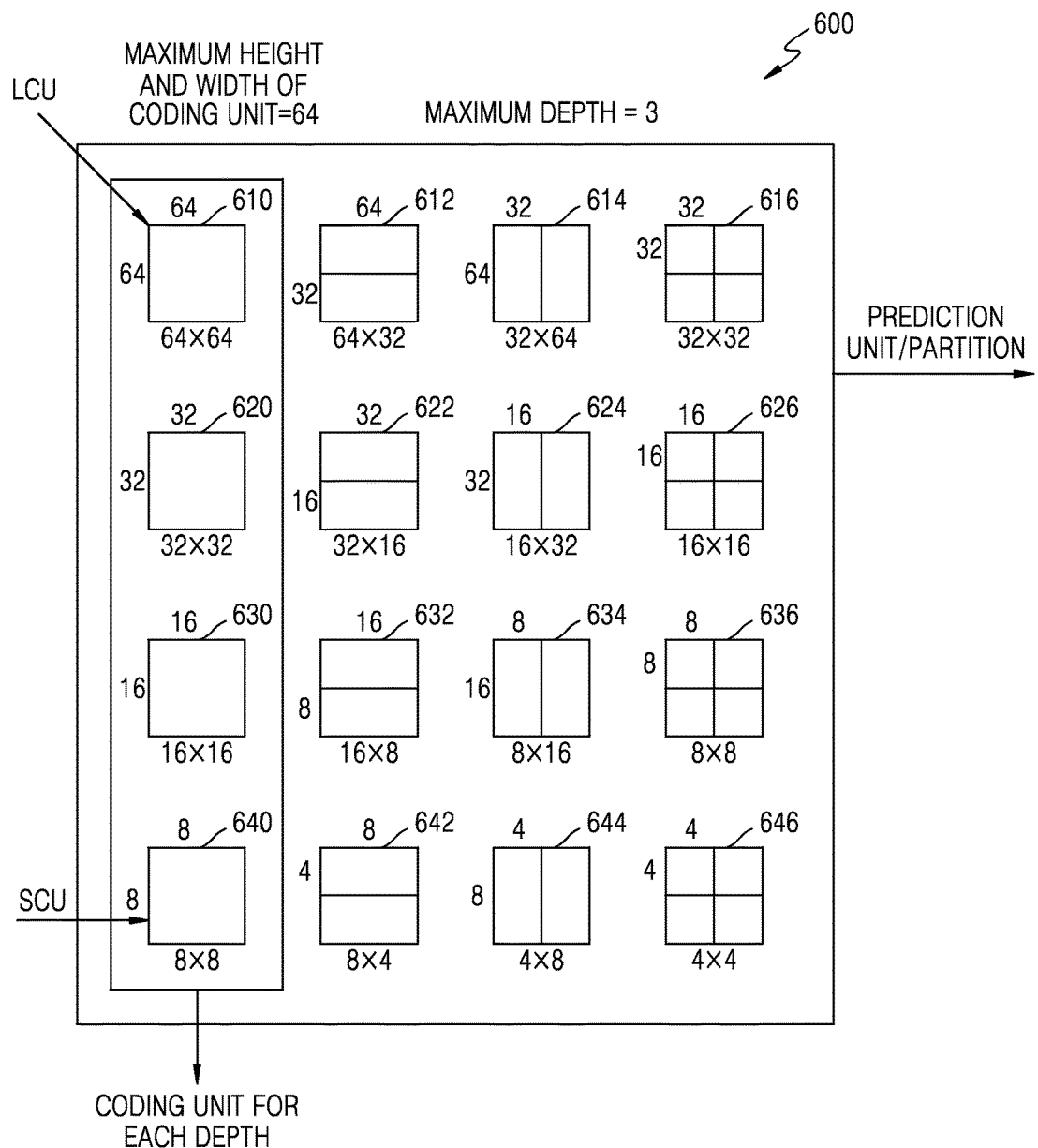
FIG. 13 is a diagram illustrating deeper coding units according to depths, and partitions, according an embodiment of the present invention.

FIG. 13 is a diagram illustrating deeper coding units according to depths, and partitions, according to one or more embodiments.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to one or more embodiments, the maximum height and the maximum width of the coding units are each 64, and the maximum depth is 3. In this case, the maximum depth refers to a total number of times the coding unit is split from the LCU to the SCU. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a LCU in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is an SCU.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine a depth of the LCU 610, the coding unit determiner 120 of the video encoding apparatus 100 performs encoding for coding units corresponding to each depth included in the LCU 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the LCU 610 may be selected as the depth and a partition mode of the LCU 610.

Figure 14:
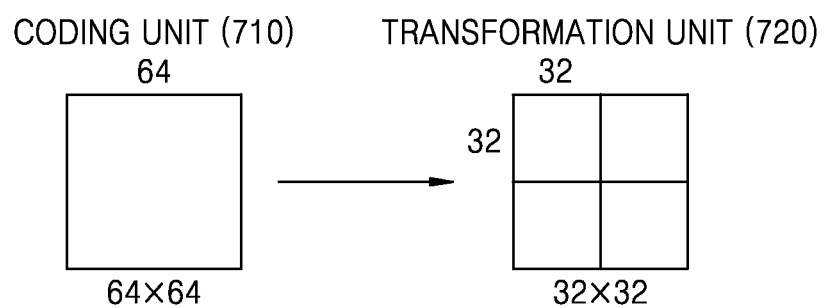
FIG. 14 is a diagram for describing a relationship between a coding unit and transformation units, according to an embodiment of the present invention.

FIG. 14 is a diagram for describing a relationship between a coding unit 710 and transformation units 720, according to one or more embodiments.

The video encoding apparatus 100 or the video decoding apparatus 200 encodes or decodes an image according to coding units having sizes smaller than or equal to a LCU for each LCU. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
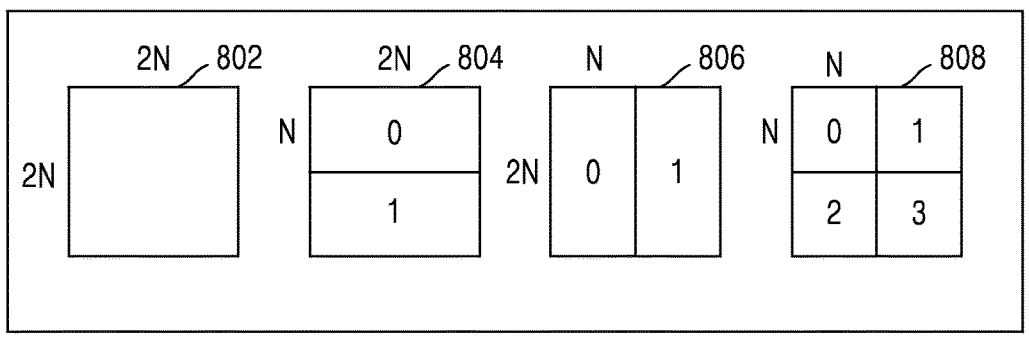
FIG. 15 is a diagram for describing encoding information of coding units corresponding to a depth, according to an embodiment of the present invention.
Figure 15:
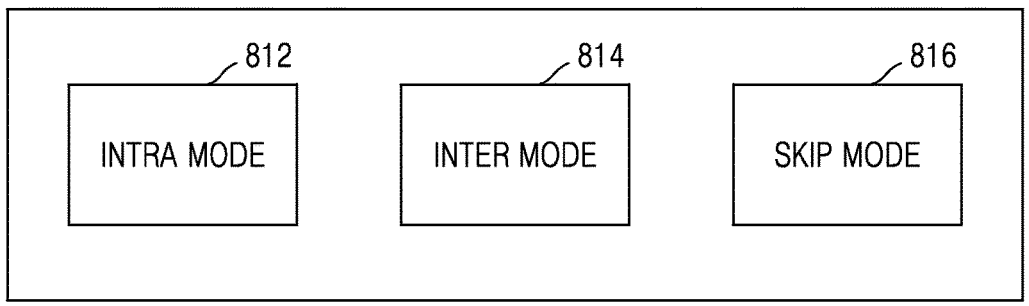
Figure 15:
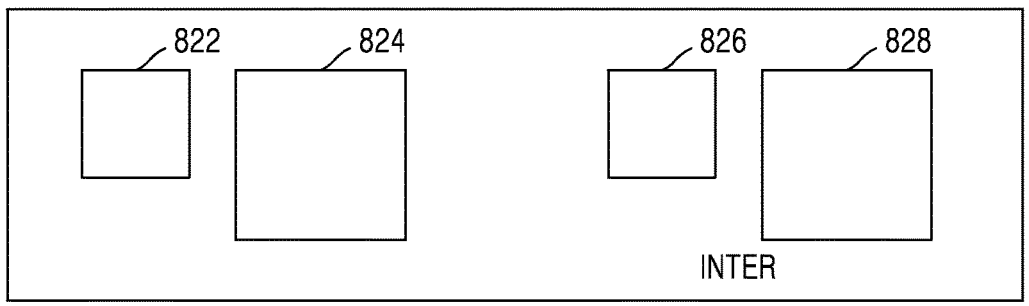

FIG. 15 is a diagram for describing encoding information of coding units corresponding to a depth, according to one or more embodiments.

The outputter 130 of the video encoding apparatus 100 may encode and transmit information 800 about a partition mode, information 810 about a prediction mode, and information 820 about a size of a transformation unit for each coding unit corresponding to a depth, as splitting information.

The information 800 indicates information about a mode of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition mode is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 16:
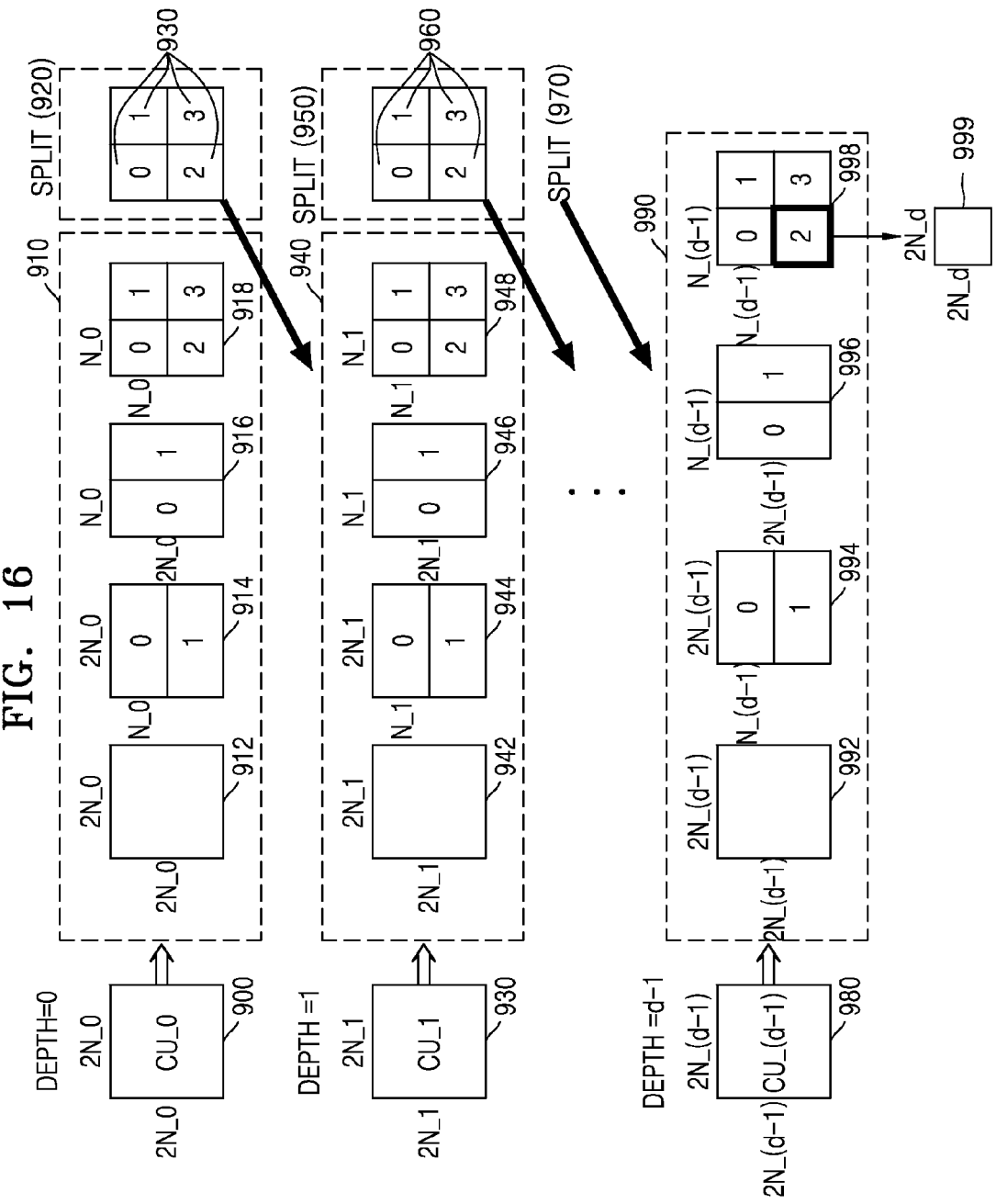
FIG. 16 is a diagram of deeper coding units according to depths, according to an embodiment of the present invention.

FIG. 16 is a diagram of deeper coding units according to depths, according to one or more embodiments.

Splitting information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0× N_0, a partition mode 916 having a size of N_0×2N_0, and a partition mode 918 having a size of N_0×N_0. FIG. 16 only illustrates the partition modes 912 through 918 which are obtained by symmetrically splitting the prediction unit 910, but a partition mode is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 912 through 916, the prediction unit 910 may not be split into a lower depth.

If the encoding error is the smallest in the partition mode 918, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and splitting information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes 992 through 998 to search for a partition mode having a minimum encoding error.

Even when the partition mode 998 has the minimum encoding error, since a maximum depth is d, a coding unit CU_(d−1) having a depth of d−1 is no longer split to a lower depth, and a depth for the coding units constituting a current LCU 900 is determined to be d−1 and a partition mode of the current LCU 900 may be determined to be N_(d−1)×N_(d−1). Also, since the maximum depth is d and an SCU 980 having a lowermost depth of d−1 is no longer split to a lower depth, splitting information for the SCU 980 is not set.

A data unit 999 may be a 'minimum unit' for the current LCU. A minimum unit according to one or more embodiments may be a square data unit obtained by splitting an SCU 980 by 4. By performing the encoding repeatedly, the video encoding apparatus 100 may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 1 through d, and a depth having the least encoding error may be determined as a depth. The depth, the partition mode of the prediction unit, and the prediction mode may be encoded and transmitted as information about an encoding mode. Also, since a coding unit is split from a depth of 0 to a depth, only splitting information of the depth is set to 0, and splitting information of depths excluding the depth is set to 1.

The image data and encoding information extractor 220 of the video decoding apparatus 200 may extract and use the information about the depth and the prediction unit of the coding unit 900 to decode the partition 912. The video decoding apparatus 200 may determine a depth, in which splitting information is 0, as a depth by using splitting information according to depths, and use splitting information of the corresponding depth for decoding.

Figure 17:
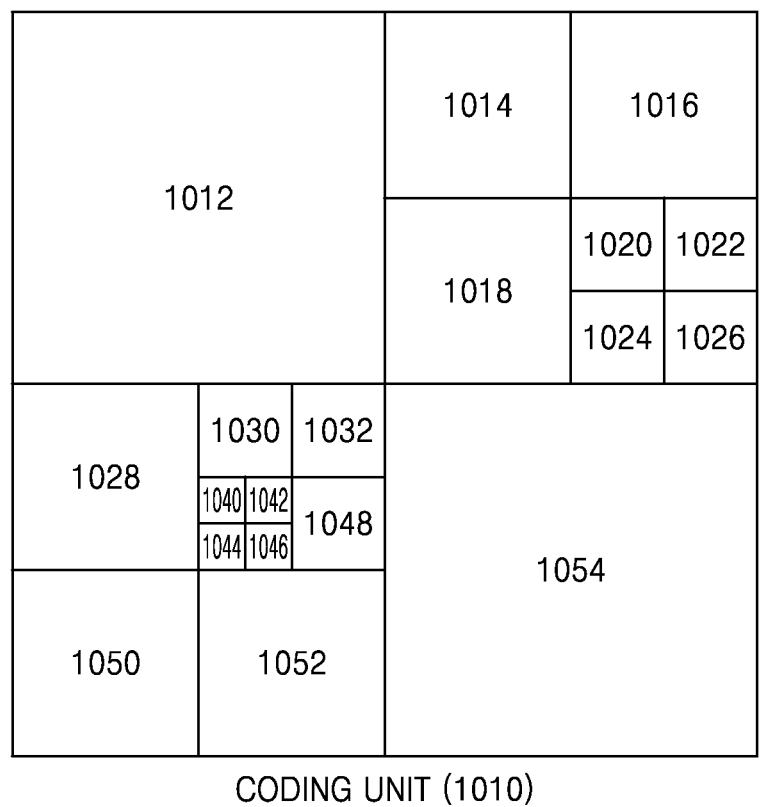
FIGS. 17 through 19 are diagrams for describing a relationship between coding units, prediction units, and transformation units, according to an embodiment of the present invention.
Figure 18:
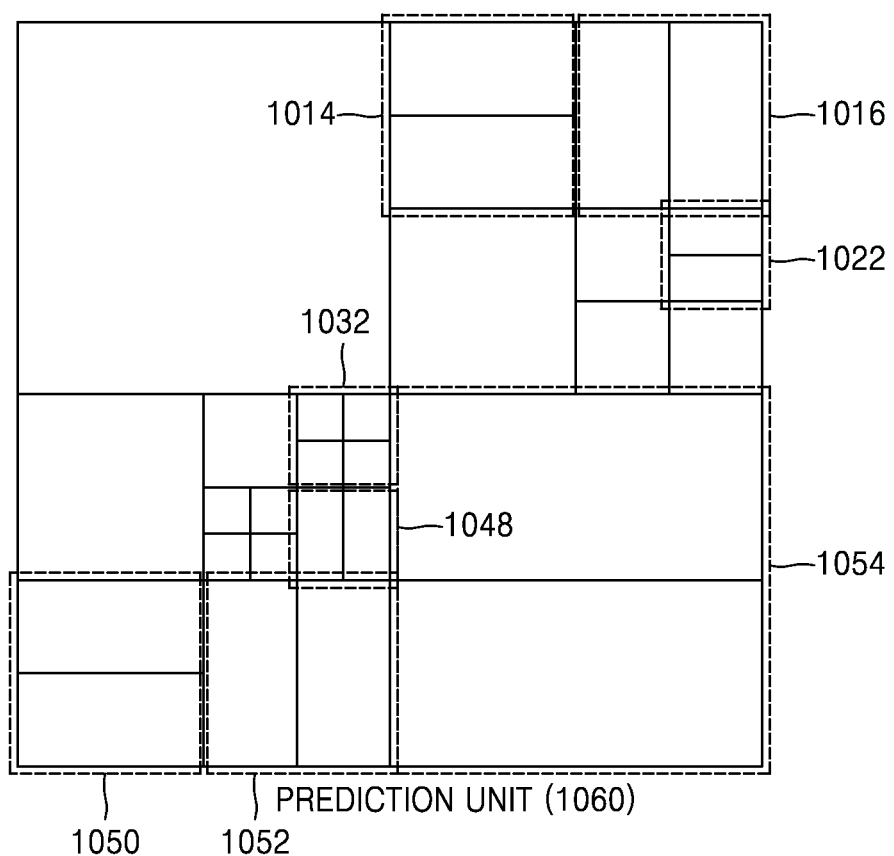
Figure 19:
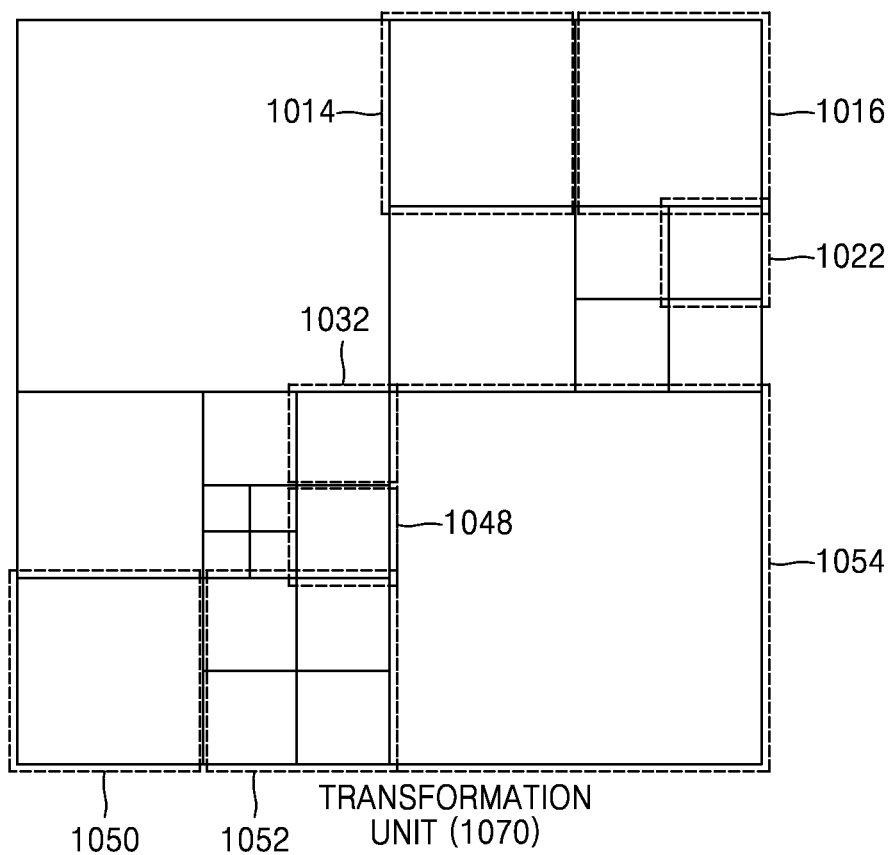

FIGS. 17 through 19 are diagrams for describing a relationship between coding units 1010, prediction units 1060, and transformation units 1070, according to one or more embodiments.

The coding units 1010 are coding units having a tree structure, corresponding to depths determined by the video encoding apparatus 100, in a LCU. The prediction units 1060 are partitions of prediction units of each of the coding units 1010, and the transformation units 1070 are transformation units of each of the coding units 1010.

When a depth of a LCU is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. In other words, partition modes in the coding units 1014, 1022, 1050, and 1054 have a size of 2N×N, partition modes in the coding units 1016, 1048, and 1052 have a size of N×2N, and a partition mode of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a LCU to determine an optimum coding unit, and thus coding units having a recursive tree structure may be obtained. Encoding information may include splitting information about a coding unit, information about a partition mode, information about a prediction mode, and information about a size of a transformation unit. Table 1 shows the encoding information that may be set by the video encoding and decoding apparatuses 100 and 200.

TABLE 1

| Splitting information 0 (Encoding on Coding Unit having Size of 2N × 2N and Current Depth of d) | | | | | Splitting information 1 |
|---|---|---|---|---|---|
| Prediction Mode | Partition mode | | Size of Transformation Unit | | Repeatedly Encode |
| Intra Inter Skip (Only 2N × 2N) | Symmetrical Partition mode | Asymmetrical Partition mode | Splitting information 0 of Transformation Unit | Splitting information 1 of Transformation Unit | Coding Units having Lower Depth of d + 1 |
| | 2N × 2N | 2N × nU | 2N × 2N | N × N (Symmetrical Type) | |
| | 2N × N | 2N × nD | | | |
| | N × 2N | nL × 2N | | N/2 × N/2 (Asymmetrical Type) | |
| | N × N | nR × 2N | | | |

The outputter 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Splitting information indicates whether a current coding unit is split into coding units of a lower depth. If splitting information of a current depth d is 0, a depth, in which a current coding unit is no longer split into a lower depth, is a depth, and thus information about a partition mode, prediction mode, and a size of a transformation unit may be defined for the depth. If the current coding unit is further split according to the splitting information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1

The size of the transformation unit may be set to be two types in the intra mode and two types in the inter mode. In other words, if splitting information of the transformation unit is 0, the size of the transformation unit may be 2N×2N, which is the size of the current coding unit. If splitting information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure may include at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a LCU may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
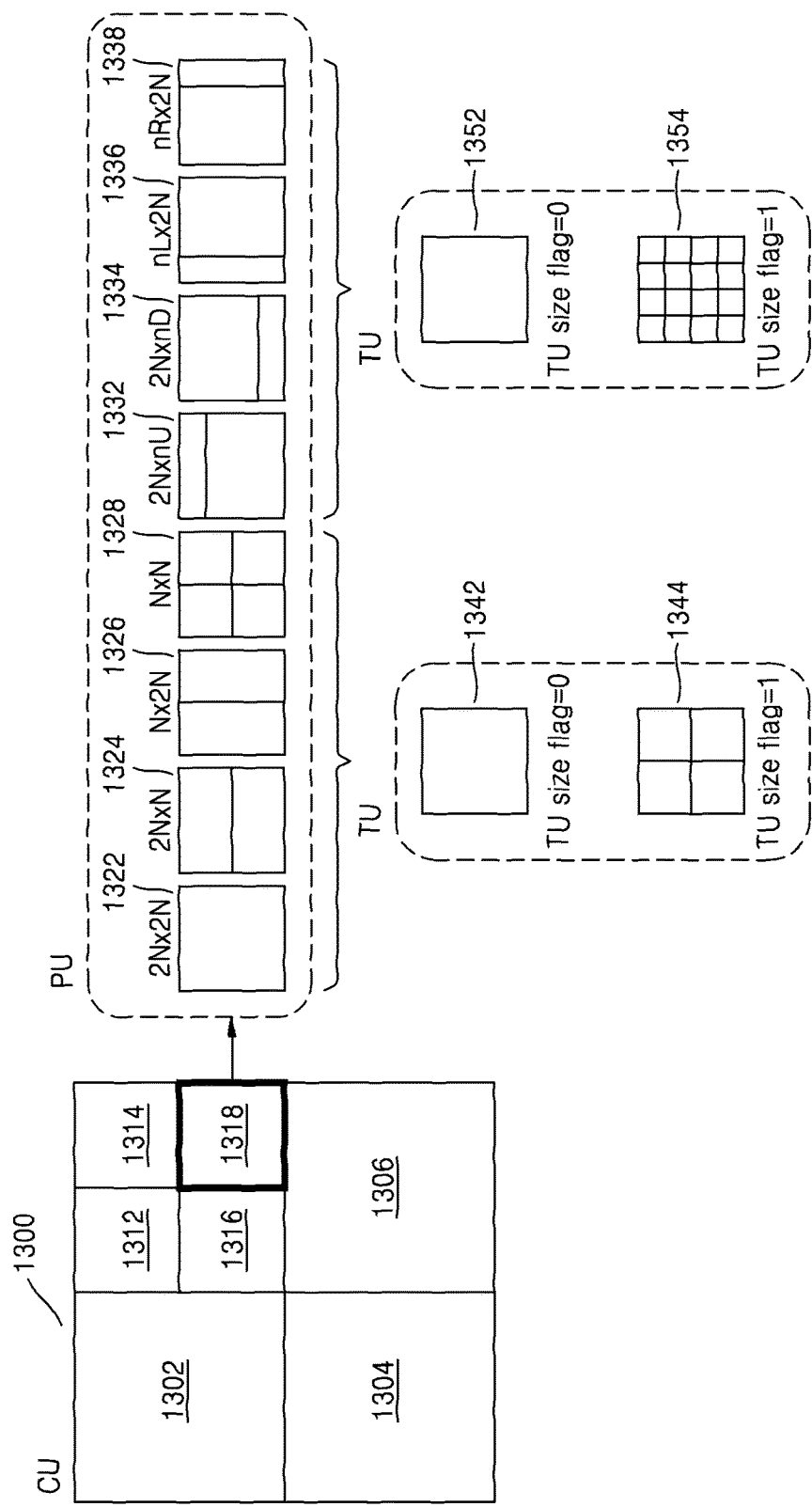
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 1.

A LCU 1300 includes coding units 1302, 1304, 1306, 1312, 1314, 1316, and 1318 of depths. Here, since the coding unit 1318 is a coding unit of a depth, splitting information may be set to 0. Information about a partition mode of the coding unit 1318 having a size of 2N×2N may be set to be one of a partition mode 1322 having a size of 2N×2N, a partition mode 1324 having a size of 2N×N, a partition mode 1326 having a size of N×2N, a partition mode 1328 having a size of N×N, a partition mode 1332 having a size of 2N×nU, a partition mode 1334 having a size of 2N×nD, a partition mode 1336 having a size of nL×2N, and a partition mode 1338 having a size of nR×2N.

Splitting information (TU size flag) of a transformation unit is a type of a transformation index. The size of the transformation unit corresponding to the transformation index may be changed according to a prediction unit type or partition mode of the coding unit.

For example, when the partition mode is set to be symmetrical, i.e. the partition mode 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition mode is set to be asymmetrical, i.e., the partition mode 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 19, the TU size flag is a flag having a value or 0 or 1, but the TU size flag is not limited to 1 bit, and a transformation unit may be hierarchically split having a tree structure while the TU size flag increases from 0. Splitting information (TU size flag) of a transformation unit may be an example of a transformation index.

In this case, the size of a transformation unit that has been actually used may be expressed by using a TU size flag of a transformation unit, according to one or more embodiments, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to one or more embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the embodiments are not limited thereto.

According to the video encoding method based on coding units having a tree structure as described with reference to FIGS. 8 through 20, image data of the space domain is encoded for each coding unit of a tree structure. According to the video decoding method based on coding units having a tree structure, decoding is performed for each LCU to reconstruct image data of the space domain. Thus, a picture and a video that is a picture sequence may be reconstructed. The reconstructed video may be reproduced by a reproducing apparatus, stored in a storage medium, or transmitted through a network.

The embodiments of the present invention can be written as computer programs and can be implemented in general-use digital computers that execute the programs using a computer-readable recording medium. Examples of the computer-readable recording medium include storage media such as magnetic storage media (e.g., ROM, floppy disks, hard disks, etc.) and optical recording media (e.g., CD-ROMs, or DVDs).

For convenience of description, the video encoding method according to adjustment of a sample offset, which is described above, will be referred to as a 'video encoding method according to the one or more embodiments'. In addition, the video decoding method according to adjustment of a sample offset, which is described above, will be referred to as a 'video decoding method according to the one or more embodiments'.

Also, a video encoding apparatus including the video encoding apparatus 40, the video encoding apparatus 100, or the image encoder 400, which is described above, will be referred to as a 'video encoding apparatus according to the one or more embodiments'. In addition, a video decoding apparatus including the video decoding apparatus 10, the video decoding apparatus 200, or the image decoder 500, which is described above, will be referred to as a 'video decoding apparatus according to the one or more embodiments'.

A computer-readable recording medium storing a program, e.g., a disc 26000, according to one or more embodiments will now be described in detail.

Figure 21:
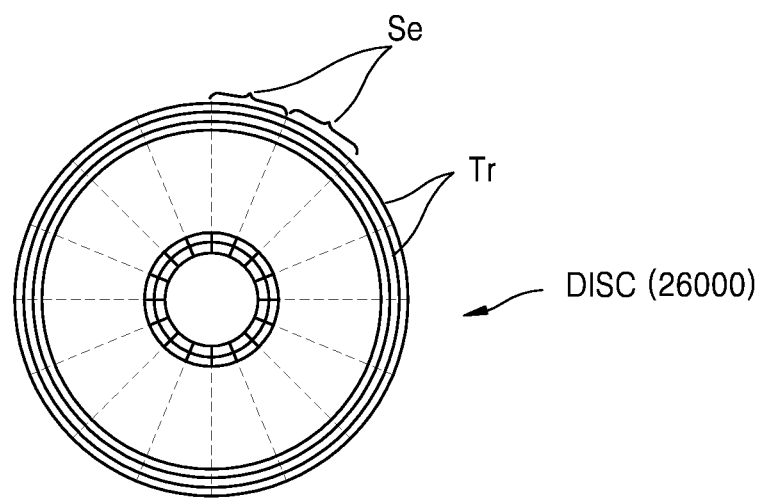
FIG. 21 is a diagram of a physical structure of a disc in which a program is stored, according to an embodiment of the present invention.

FIG. 21 is a diagram of a physical structure of the disc 26000 in which a program is stored, according to one or more embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantization parameter determination method, the video encoding method, and the video decoding method described above may be assigned and stored.

A computer system embodied using a storage medium that stores a program for executing the video encoding method and the video decoding method as described above will now be described with reference to FIG. 22.

Figure 22:
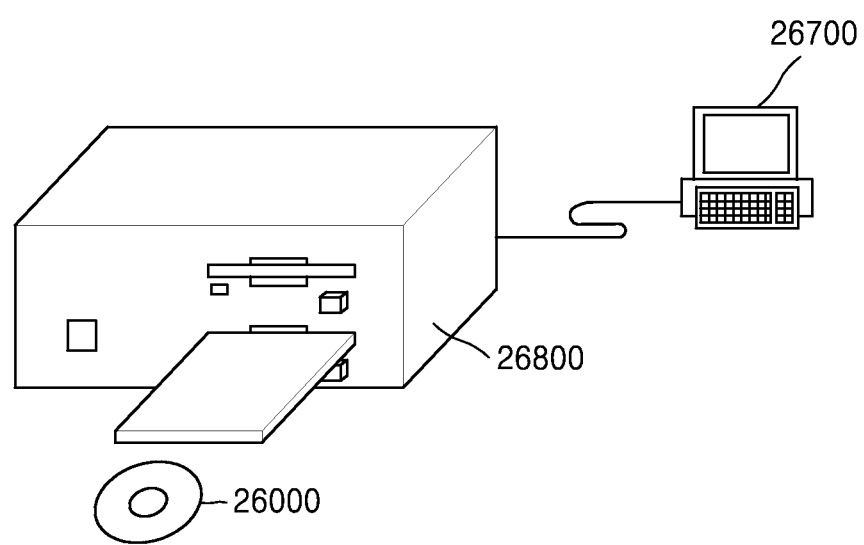
FIG. 22 is a diagram of a disc drive for recording and reading a program by using a disc.

FIG. 22 is a diagram of a disc drive 26800 for recording and reading a program by using the disc 26000. A computer system 26700 may store a program that executes at least one of a video encoding method and a video decoding method according to one or more embodiments, in the disc 26000 via the disc drive 26800. To run the program stored in the disc 26000 in the computer system 26700, the program may be read from the disc 26000 and be transmitted to the computer system 26700 by using the disc drive 26700.

The program that executes at least one of a video encoding method and a video decoding method according to one or more embodiments may be stored not only in the disc 26000 illustrated in FIG. 21 or 22 but also in a memory card, a ROM cassette, or a solid state drive (SSD).

A system to which the video encoding method and a video decoding method described above are applied will be described below.

Figure 23:
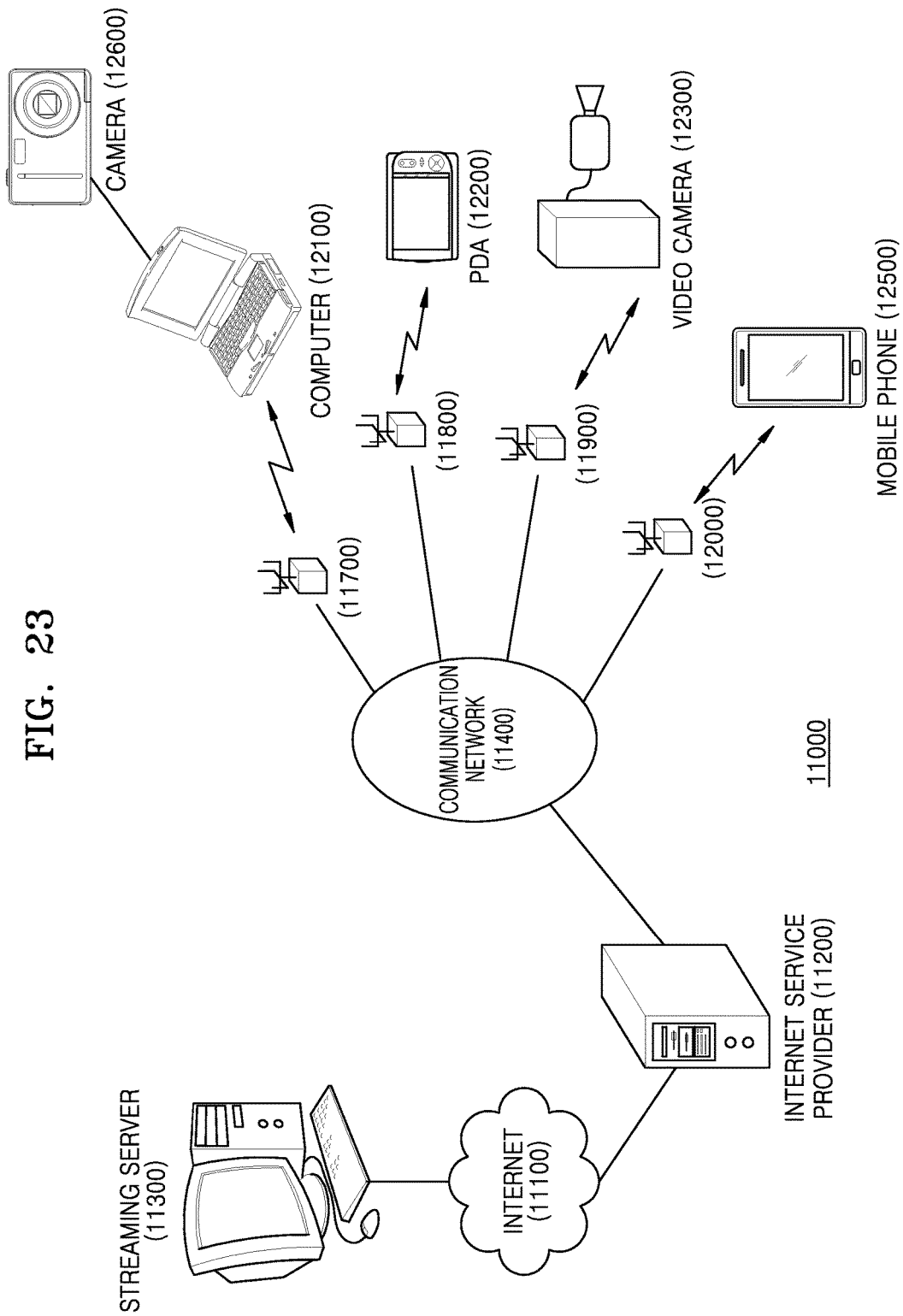
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
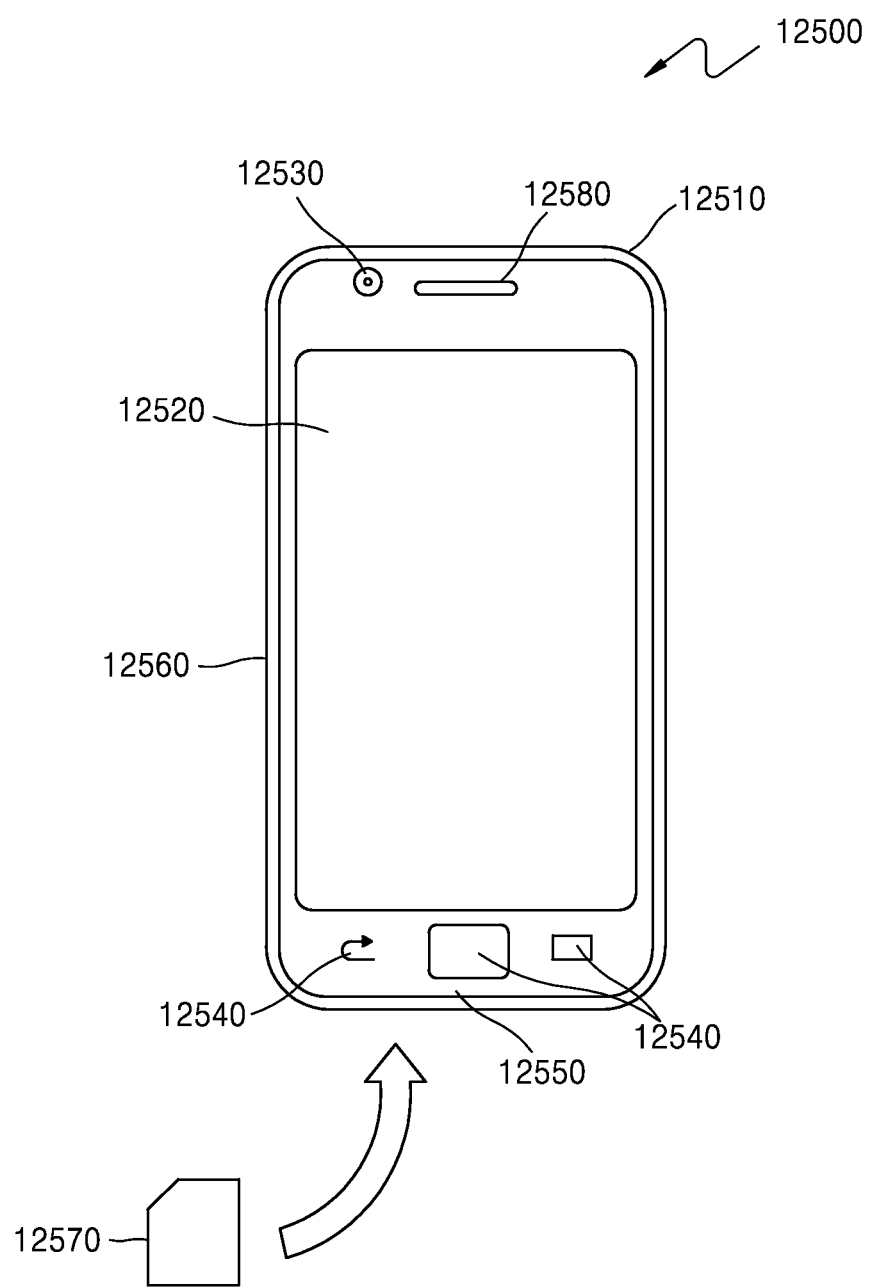
FIGS. 24 and 25 are diagrams respectively of an external structure and an internal structure of a mobile phone to which a video encoding method and a video decoding method are applied, according to an embodiment of the present invention.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300.

Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to one or more embodiments.

The mobile phone 12500 included in the content supply system 11000 according to one or more embodiments will now be described in greater detail with referring to FIGS. 24 and 25.

FIG. 24 illustrates an external structure of the mobile phone 12500 to which a video encoding method and a video decoding method are applied, according to one or more embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 14, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound outputter, and a microphone 12550 for inputting voice and sound or another type sound inputter. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
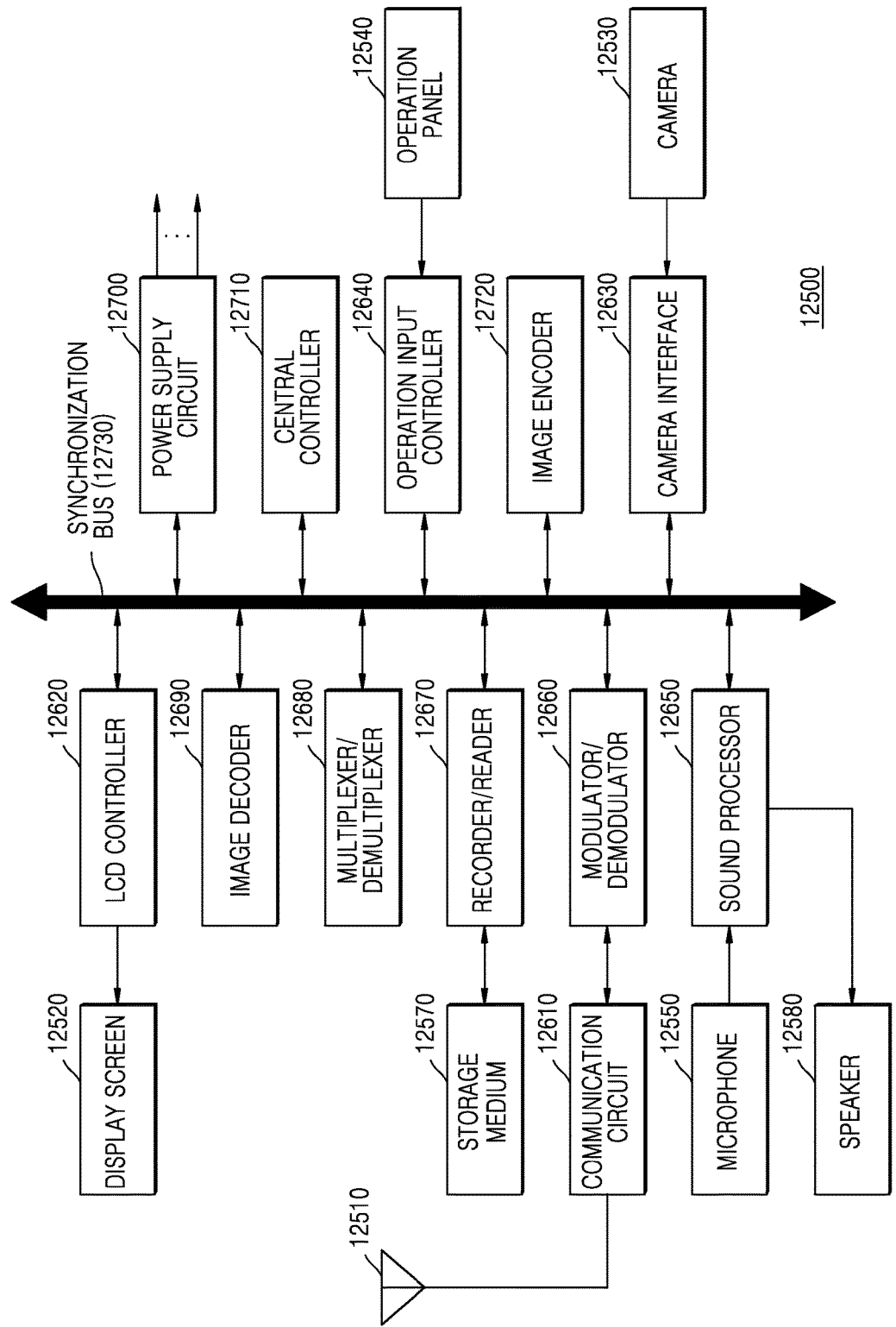

FIG. 25 illustrates an internal structure of the mobile phone 12500, according to one or more embodiments. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 under control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulator/demodulator 12660 and the communication circuit 12610, and may be transmitted via the antenna 12510.

When a text message, e.g., email, is transmitted in a data communication mode, text data of the text message is input via the operation panel 12540 and is transmitted to the central controller 12710 via the operation input controller 12640. Under control of the central controller 12710, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the above-described video encoding method according to the one or more embodiments. The image encoder 12720 may transform the image data received from the camera 12530 into compressed and encoded image data based on the above-described video encoding method according to the one or more embodiments, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulator/demodulator 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoder 12690 may correspond to that of the above-described video decoding method according to the one or more embodiments. The image decoder 12690 may decode the encoded video data to obtain reconstructed video data and provide the reconstructed video data to the display screen 12520 via the LCD controller 12620, by using the above-described video decoding method according to the one or more embodiments.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to one or more embodiments, may be a transceiving terminal including only the video encoding apparatus, or may be a transceiving terminal including only the video decoding apparatus.

Figure 26:
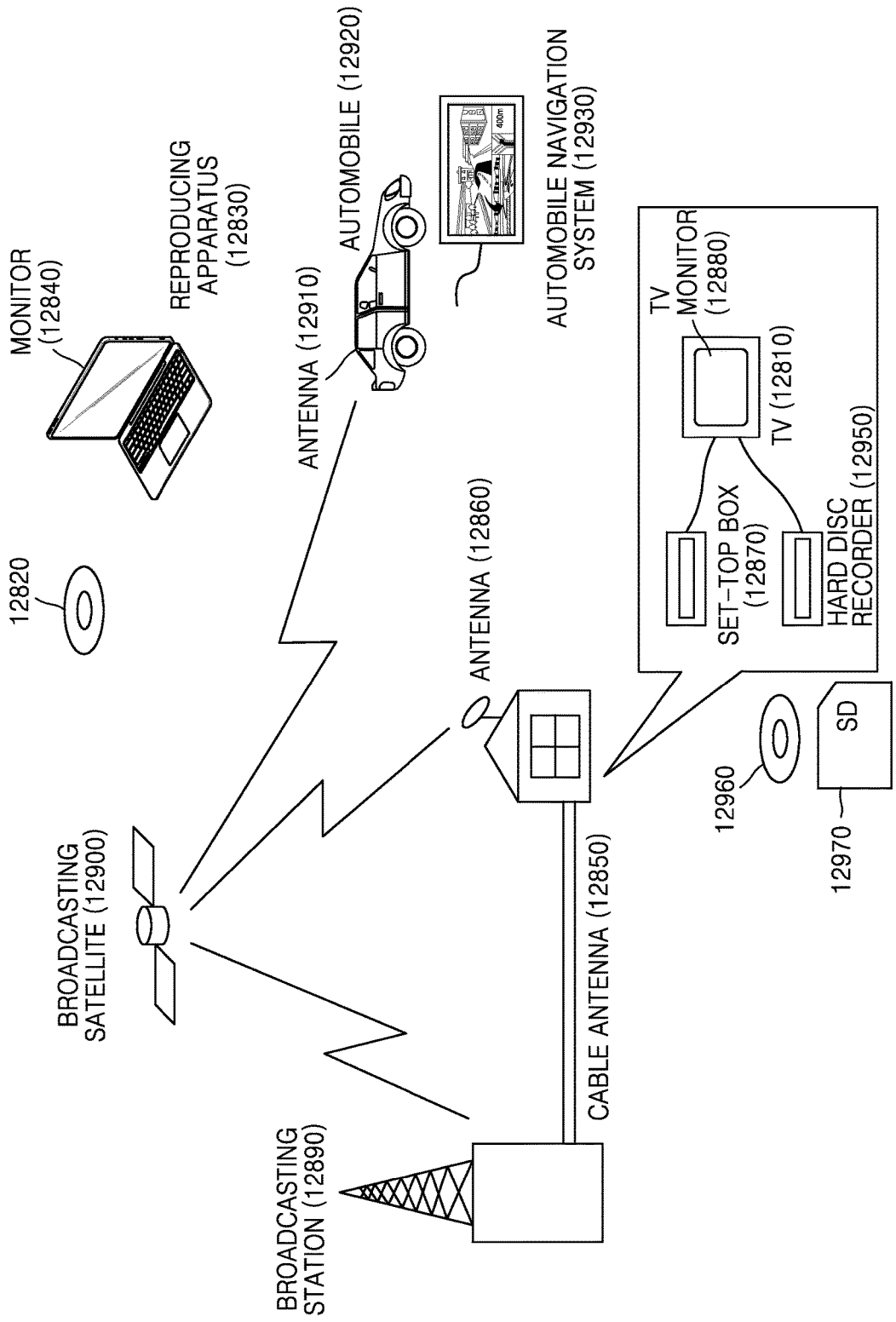
FIG. 26 is a diagram of a digital broadcast system to which a communication system is applied, according to an embodiment of the present invention.

A communication system according to the one or more embodiments is not limited to the communication system described above with reference to FIG. 24. For example, FIG. 26 illustrates a digital broadcasting system employing a communication system, according to one or more embodiments. The digital broadcasting system of FIG. 26 may receive a digital broadcast transmitted via a satellite or a terrestrial network by using a video encoding apparatus and a video decoding apparatus according to one or more embodiments.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via an antenna 12860. In every house, an encoded video stream may be decoded and reproduced by a TV 12810, a set-top box 12870, or another device.

When a video decoding apparatus according to one or more embodiments is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to one or more embodiments may be installed. Data output from the set-top box 12870 may also be reproduced on a TV monitor 12880.

As another example, a video decoding apparatus according to one or more embodiments may be installed in the TV 12810 instead of the set-top box 12870.

An automobile 12920 that has an antenna 12910 may receive a signal transmitted from the satellite 12900 or the wireless base station 11700. A decoded video may be reproduced on a display screen of an automobile navigation system 12930 installed in the automobile 12920.

A video signal may be encoded by a video encoding apparatus according to one or more embodiments and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to one or more embodiments, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 26. For example, the computer 12100 and the TV 12810 may not include the camera 12530, the camera interface 12630, and the image encoder 12720 of FIG. 26.

FIG. 27 is a diagram illustrating a network structure of a cloud computing system using a video encoding apparatus and a video decoding apparatus, according to one or more embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above. As another example, the user terminal may include a video encoding apparatus as described above. Alternatively, the user terminal may include both the video decoding apparatus and the video encoding apparatus as described above.

Various applications of a video encoding method, a video decoding method, a video encoding apparatus, and a video decoding apparatus according to the one or more embodiments described above have been described above with reference to FIGS. 21 to 27. However, methods of storing the video encoding method and the video decoding method in a storage medium or methods of implementing the video encoding apparatus and the video decoding apparatus in a device, according to various embodiments, are not limited to the embodiments described above with reference to FIGS. 21 to 27.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. A video decoding method comprising:
obtaining a disparity vector having components in sub-pixel unit for interlayer prediction between images belonging to a reference layer of a first view and a current layer of a second view;
determining a position of an integer pixel of a depth map image included in the reference layer corresponding to a position of one of an integer pixel and a sub-pixel, wherein the position is indicated by the disparity vector having components in the sub-pixel unit from a current pixel of a color image included in the current layer; and
decoding the color image of the current layer by using depth-related information related to a value in the depth map image on a candidate area of the depth map image included in the reference layer corresponding to the determined position of the integer pixel of the depth map image included in the reference layer.

2. The video decoding method of claim 1, wherein the determining the position of the integer pixel comprises:
determining an integer disparity vector corresponding to the obtained disparity vector; and
determining a position of an integer pixel of the depth map image included in the reference layer indicated by the obtained integer disparity vector from the current pixel of the current layer.

3. The video decoding method of claim 2, wherein the determining the integer disparity vector comprises determining the integer disparity vector through a rounding operation on sub-pixel components of x and y components of the obtained disparity vector.

4. The video decoding method of claim 2, wherein the determining the integer disparity vector comprises:
determining a disparity vector value from the obtained disparity vector;
adding a predetermined value to the obtained disparity vector value; and
shifting the predetermined value-added value to the right by predetermined bits in a bit-shift operation.

5. The video decoding method of claim 1, wherein the current pixel is a pixel at a predetermined position of a current block.

6. The video decoding method of claim 5, wherein the pixel at the predetermined position is a pixel at a predetermined position among an upper left end, a lower left, an upper right, a lower right, and a center of the current block.

7. The video decoding method of claim 1, wherein the candidate area of the depth map image included in the reference layer is a coding unit or a prediction unit in the depth map image.

8. A video encoding method comprising:
determining a disparity vector having components in sub-pixel unit for interlayer prediction between images belonging to a reference layer of a first view and a current layer of a second view;
determining a position of an integer pixel of a depth map image included in the reference layer corresponding to a position of one of an integer pixel and a sub-pixel, wherein the position is indicated by the determined disparity vector having components in the sub-pixel unit from the position of a current pixel of a color image included in the current layer; and
encoding the color image of the current layer by using depth-related information related to a value in the depth map image on a candidate area of the depth map image included in the reference layer corresponding to the determined position of the integer pixel of the depth map image included in the reference layer.

9. A video decoding apparatus comprising:
a disparity vector obtainer configured to obtain a disparity vector having components in sub-pixel unit for interlayer prediction between images belonging to a reference layer of a first view and a current layer of a second view;
an integer pixel position determiner configured to determine a position of an integer pixel of a depth map image included in the reference layer corresponding to a position of one of an integer pixel and a sub-pixel, wherein the position is indicated by the disparity vector having components in the sub-pixel unit obtained from a position of a current pixel of a color image included in the current layer; and
a decoder configured to decode the color image of the current layer by using depth-related information related to a value in the depth map image on a candidate area of the depth map image included in the reference layer corresponding to the determined position of the integer pixel of the depth image included in the reference layer.

10. A video encoding apparatus comprising:
- a disparity vector determiner configured to determine a disparity vector having components in sub-pixel unit for interlayer prediction between images belonging to a reference layer of a first view and a current layer of a second view;
- an integer pixel position determiner configured to determine a position of an integer pixel of a depth map image included in the reference layer corresponding to a position of one of an integer pixel and a sub-pixel, wherein the position is indicated by the determined disparity vector having components in the sub-pixel unit from a position of a current pixel of a color image included in the current layer; and
- an encoder configured to encode the color image of the current layer by using depth-related information related to a value in the depth map image on a candidate area of the depth map image included in the reference layer corresponding to the determined position of the integer pixel of the depth image included in the reference layer.

11. A non-transitory computer-readable medium having recorded thereon a computer-readable program for implementing the method of claim 1.

* * * * *